(12) United States Patent
Wieder

(10) Patent No.: US 11,247,374 B1
(45) Date of Patent: Feb. 15, 2022

(54) CORE LIFTER WITH REPLACEABLE BREAKAWAY LIFTER BLADE COUPLING ARRANGEMENT

(71) Applicant: Klaus A. Wieder, Helenville, WI (US)

(72) Inventor: Klaus A. Wieder, Helenville, WI (US)

(73) Assignee: Accura-Tec Inc., Helenville, WI (US)

( * ) Notice: Subject to any disclaimer, the term of this patent is extended or adjusted under 35 U.S.C. 154(b) by 0 days.

(21) Appl. No.: 16/413,596

(22) Filed: May 15, 2019

Related U.S. Application Data

(63) Continuation-in-part of application No. 15/590,000, filed on May 8, 2017, now Pat. No. 11,123,908.

(60) Provisional application No. 62/332,594, filed on May 6, 2016.

(51) Int. Cl.
  *B29C 45/44* (2006.01)
  *B29C 33/44* (2006.01)
  *B29C 45/36* (2006.01)

(52) U.S. Cl.
  CPC .......... *B29C 45/4435* (2013.01); *B29C 33/44* (2013.01); *B29C 45/36* (2013.01); *B29C 2045/363* (2013.01)

(58) Field of Classification Search
  CPC ..... B29C 45/4435; B29C 45/44; B29C 33/44; B29C 45/36
  See application file for complete search history.

(56) References Cited

U.S. PATENT DOCUMENTS

| | | | | |
|---|---|---|---|---|
| 3,802,014 A | * | 4/1974 | Sieben | B21J 13/14 470/43 |
| 4,854,849 A | * | 8/1989 | Sudo | B29C 45/4435 425/556 |
| 5,137,442 A | * | 8/1992 | Starkey | B29C 33/442 249/66.1 |
| 5,316,467 A | * | 5/1994 | Starkey | B29C 33/442 249/66.1 |
| 5,551,864 A | * | 9/1996 | Boskovic | B29C 45/4435 425/556 |
| 5,773,048 A | * | 6/1998 | Ramsey | B29C 45/4435 425/556 |

(Continued)

FOREIGN PATENT DOCUMENTS

| | | |
|---|---|---|
| ES | 2238881 | 9/2005 |
| JP | 2007283746 | 11/2007 |

(Continued)

*Primary Examiner* — Matthew J Daniels
*Assistant Examiner* — Wayne K. Swier
(74) *Attorney, Agent, or Firm* — Boyle Fredrickson S.C.

(57) ABSTRACT

A core lifter having a lifter bar assembly formed of an elongate lifter bar with a replaceable lifter bar extension coupling carrying a coupling ball pivotably, rotatably, and translationally coupled to a lifter base fixed to an ejector plate of a plastic injection molding apparatus, the bar extension coupling removably coupled to the bar by a coupling joint configured to automatically self-align the bar relative to the base and mold in which the bar extends in a direction generally orthogonal to a lengthwise extent of the bar. Bar extension coupling is formed of an extension link having one end carrying the ball and an opposite end slidably coupled to an end of the bar by coupling joint. A preferred extension link is of breakaway sacrificial construction and slidably attached to the bar via a coupling joint that is a floating dovetail joint.

19 Claims, 21 Drawing Sheets

(56) References Cited

U.S. PATENT DOCUMENTS

| | | | | |
|---|---|---|---|---|
| 5,814,357 A * | 9/1998 | Boskovic | ............ | B29C 45/4435 |
| | | | | 264/318 |
| 6,491,513 B1 * | 12/2002 | Schneider | ........... | B29C 45/4435 |
| | | | | 425/438 |
| 6,537,053 B1 * | 3/2003 | Watkins | ................. | B29C 43/42 |
| | | | | 249/68 |
| 6,655,952 B1 * | 12/2003 | Kraft | ................... | B29C 45/4435 |
| | | | | 264/318 |
| 2017/0355118 A1 * | 12/2017 | Starkey | .................. | B29C 45/72 |

FOREIGN PATENT DOCUMENTS

| | | |
|---|---|---|
| JP | 3235618 | 10/2017 |
| KR | 2007 0091463 | 9/2007 |

* cited by examiner

CORE LIFTER WITH REPLACEABLE BREAKAWAY LIFTER BLADE COUPLING ARRANGEMENT

CROSS-REFERENCE

This application is a continuation-in-part of and claims priority under 35 U.S.C. § 120 in U.S. application Ser. No. 15/590,000, which in turn claims priority under 35 U.S.C. § 119(e) in U.S. Provisional Patent Application No. 62/332, 594, filed May 6, 2016, the entirety of each of which is hereby expressly incorporated herein by reference.

FIELD

The present invention is directed to a core lifter for a molding apparatus and more particularly to a core lifter better able to pivotably, rotationally and translationally self-align relative to the molding apparatus during operation of the molding apparatus.

BACKGROUND

In a plastic molding apparatus, e.g., plastic injection mold, a core is an additional component of a mold of a plastic molding apparatus that is used to form a three-dimensionally contoured feature in a plastic molded part that cannot be otherwise formed by or in the cavity or cavities of the mold or mold halves of the plastic molding apparatus used to make the plastic part. In forming such a feature in a plastic part, the core is disposed within the mold cavity to form the feature during molding of the part but then moved out of the way when molding is completed to enable the plastic part to be removed.

When forming certain types of features, particularly undercuts, into a plastic molded part, a core lifter is used to position the core within the mold cavity where the core will form the desired feature, e.g., undercut, during molding of the rest of the part. After molding of the part is finished, the core lifter moves the core out of the way so the core will not interfere with part removal by the lifter thereby causing the core to clear the feature formed by the core in the molded part. While such a core lifter can be configured so the core is a separate component that is then mounted or otherwise attached, most core lifters are configured with the core formed as an integral part of the core lifter.

Core lifters are commonly used in plastic molding apparatuses that preferably are plastic injection molding apparatuses to help form an internal undercut in a plastic part being molded. Core lifters do so by helping to enable a movable core of a mold of the plastic injection molding apparatus used to form the internal undercut to be moved out of the way after the undercut-containing plastic part has been formed. Core lifters also help enable the plastic part to be ejected from the plastic injection molding apparatus in readying the plastic injection molding apparatus to form another substantially identical undercut-containing plastic part. Such core lifters for plastic injection molding apparatuses are connected to the core and typically actuated by the ejection system of the plastic injection molding apparatus to move the core into position during closing of the molds of the plastic injection molding apparatus and to move the core out of position during ejection of the plastic part formed with the undercut produced by the core.

In the past, custom core lifters were commonly used in plastic injection molding apparatuses that were made of a core blade or lifter bar seated at a predetermined angle by mounting one end of the blade or bar at a fixed angle to a coupling which slidably moved linearly along a support mounted to ejection plates of the ejector system. In order to custom design custom core lifters, a mold designer needed to take into account the amount of undercut needed, the horizontal displacement required, as well as the distance the ejector system that the particular plastic injection molding apparatus must travel during plastic part molding in determining the necessary angle for the lifter. Quite often such custom design core lifters were one time or one off designs that were not only expensive to make but which could not be used in other molds, even molds relatively similar to the one for which they were custom designed.

U.S. Pat. No. 5,316,467 is directed to a core lifter that is intended to be of universal construction having a core blade, e.g., lifter bar, which is pivotally mounted to a coupling fixed to a separate support that attaches to the ejector system. The end of the lifter bar has a heel with a pair of flat sides and a bottom with a partially spherical convex surface that is received in a curved dovetail of the coupling equipped with a cooperating partially spherical convex surface. While the core lifter disclosed in the '467 is an improvement over a prior unsuccessful attempt at making such a universal core lifter disclosed in parent, U.S. Pat. No. 5,132,442, it too still suffers from considerable drawbacks.

While the '467 core lifter does allow an angle of the core blade or lifter bar to be varied relative to an axis transverse to the coupling dovetail that also extends transversely through the flat sides of the heel of the bar, the range of angular adjustment typically is too limited to prevent the bar from binding and/or the core lifter from otherwise failing during mold operation. While the '467 core lifter does permit some angular adjustment relative to the transverse axis, it typically offers less, if any, angular adjustment relative to an axis longitudinal to the coupling dovetail that also extends longitudinally through the lifter bar heel, which often is too limited to prevent binding and core lifter failure during mold operation.

Just as bad, if not worse, is the fact that the gaps between each flat side of the heel and adjacent flat dovetail sidewall can provide too much play thereby allowing the lifter bar to move too much in a side-to-side direction during molding, which can cause the core to be improperly positioned in the mold during molding. This can not only cause defective parts to be molded, but also can lead to binding and core lifter failure if the excessive play allows the lifter bar to displace too far to one side or the other. Frequently exacerbating these problems is the fact that the heel cannot move strictly in a side-to-side direction in the dovetail because the cooperating spherical surfaces cause the lifter bar to pivot about the longitudinal axis. Since the lifter bar heel cannot move side-to-side within the dovetail of the coupling without also pivoting, core misalignment and binding can and do occur with the '467 core lifter.

While the core lifters disclosed in U.S. Pat. No. 5,316,467 have enjoyed substantial commercial success, improvements nonetheless remain desirable. For example, there are times that present day core lifters end up becoming misaligned during mold closing or during part ejection. Depending on how bad the misalignment is or becomes over time, binding can even occur which requires costly stoppage to fix and which can still result in the very mold damage they were intended to prevent.

U.S. Pat. No. 5,551,864 is directed to another type of core lifter equipped with a core blade attached to arms of a blade support that linearly rides in a track or gib fixed to the ejector blade by a pin and an angle-fixing dowel that fixes the angle of inclination of the blade relative to the support and track or gib. In another embodiment, the arms of the blade support are used to set the fixed angle of inclination of the core blade. Because the angle of inclination of the core blade is fixed, unfortunately the angle of inclination of the blade cannot change during mold operation to accommodate changes in mold misalignment due to thermal distortion, debris, mold wear and the like.

U.S. Pat. No. 5,814,357 attempts to improve upon the '864 patent by the blade support being attached to an elongate blade retainer that attaches to the core blade by a pin and which spaces it far enough away from the blade support and track or gib to enable changing of the core blade without disassembling the mold down to the ejector plate. While the coupling end of the blade retainer is rounded and is received in a semicircular socket of an arcuate blade support, the blade retainer is attached to the blade support by a screw that fixes the angle of inclination of the blade retainer and core blade with the blade support received in the track or gib. As with the '864 core lifter, the angle of inclination of the core blade of the '357 core lifter also is not adjustable during mold operation. As with the '864 core lifter, other than the blade support being able to linearly ride back and forth in the track or gib, no mold misalignment or real time angular adjustment of the core blade is provided.

As a result of at least these deficiencies in the '467 core lifter, the '864 core lifter, the '357 core lifter, and other commercially available core lifters suffering from similar drawbacks, it is further believed that none of these prior art core lifters are fully articulating in any direction and therefore lack any ability to self-align. As a result of such an inability of prior art core lifters to self-align during assembly, installation, and use during molding, core misalignment and mislocation, core lifter binding, and core lifter failure occur far more commonly than believed.

SUMMARY

The present invention is directed to an automatically self-aligning core lifter for a molding apparatus, preferably a plastic injection molding apparatus, where the lifter has a lifter bar assembly formed of an elongate lifter bar with a replaceable lifter bar extension coupling carrying a coupling ball pivotably, rotatably, and translationally coupled to a lifter base fixed to an ejector plate of the molding apparatus. The replaceable lifter bar extension coupling is removably attached to the lifter bar by a coupling joint configured permit relative movement between the lifter bar and the lifter bar extension coupling in a direction generally orthogonal to a lengthwise extent of the lifter bar during opening and closing of mold halves of the molding apparatus during molding apparatus operation advantageously automatically self-aligning the lifter bar relative to the lifter base and molding apparatus to which the lifter base is fixed in or along a direction generally orthogonal to a lengthwise extent of the lifter bar.

The lifter base has an elongate slot through which part of the lifter bar outwardly extends with the slot in communication with a generally cylindrical channel defining a bearing race in which the coupling ball is slidably, pivotably, and rotationally received enabling lifter bar self-alignment by being able to (i) vary a lifter bar release angle, i.e., forward angle, of the lifter bar by enabling the bar to pivot forwardly or rearwardly relative to the base, (ii) vary a lifter bar sideways angle, i.e., side-to-side pivot angle, of the lifter bar enabling the bar to pivot in a sideways direction relative to the base, (iii) swivel about a central longitudinal axis of the lifter bar, and (iv) translate or move relative to the base along a lengthwise extent of the channel and slot. In a preferred embodiment, a core lifter of the present invention is self-aligning by permitting (i), (ii), (iii) and/or (iv) substantially simultaneously in real time during opening and closing of mold halves during molding apparatus operation. A self-aligning core lifter of the present invention is not only configured to automatically adjust misalignment(s) via (i), (ii), (iii) and/or (iv) substantially simultaneously in real time during opening and closing of mold halves during molding apparatus operation, but also to translationally self-align the bar relative to the base and part of the mold via the coupling joint along a direction generally orthogonal to a lengthwise extent of the bar.

A core lifter of the present invention is configured for use in a molding apparatus that preferably is a plastic injection molding apparatus having a pair of mold halves that move relative to one another to open and close during each molding cycle and an ejector plate assembly with an ejector plate in operable cooperation with the core lifter for reciprocating the core lifter during each cycle of molding apparatus operation. The core lifter has a core lifter base fixed to one part of the molding apparatus that preferably is part of the ejector plate assembly, such as an ejector plate of the ejector plate assembly. The core lifter also has a lifter bar assembly that includes an elongate lifter bar that can be in the form of an elongate blade of generally rectangular cross section or a generally cylindrical rod. The lifter bar is disposed in operable cooperation with another part of the molding apparatus preferably by extending through a lifter bar passageway formed in one or both mold halves. The lifter bar assembly also includes a coupling carried by the lifter bar that couples the lifter bar to the lifter base permitting relative motion or relative movement therebetween.

The coupling is received in a channel formed in the base that defines a bearing race which enables the coupling ball to slidably move or translate within the channel or race relative to the base to automatically self-align or automatically adjust the position of the lifter bar by moving or translating the lifter bar relative to one or both molds and the lifter base to help compensate for lifter bar misalignment by such movement or translation. The coupling preferably is or includes a coupling ball having a rounded or spherical outer bearing surface that is received in an elongate channel formed in the lifter base can be of circular cross section and which can and preferably does form a generally cylindrical bearing race. The coupling ball preferably is pivotably, rotatively and slidably received in the generally cylindrical channel and is configured to permit pivotable rotational, and slidable translation movement of the lifter bar relative to the lifter base and the ejector plate to which the lifter base is fixed or anchored.

A core lifter bar of the present invention has a coupling joint between the lifter bar and coupling that removably attaches the coupling to the lifter bar and which is configured to facilitate self-alignment by enabling relative movement between the lifter bar and coupling independent any self-alignment relative movement provided by the coupling being operably coupled to the lifter base. Where the coupling is or includes coupling ball, the coupling joint enables replacement of the coupling, preferably the coupling ball, by removably attaching the lifter bar to the coupling, preferably to the coupling ball. The coupling joint preferably is a floating coupling joint that permits relative translational movement between the lifter bar and the coupling, preferably coupling ball, independent of (i), (ii), (iii) and (iv) during molding apparatus operation.

In a preferred embodiment, the coupling joint is a breakaway coupling joint configured to fail when the coupling, including coupling ball, is subjected to a stress or force less than a stress or force that would cause failure of the lifter bar or binding of the lifter bar in the molding apparatus. Such a breakaway coupling joint preferably is configured to permit removal of the coupling, including coupling ball, from the lifter bar, such as to allow replacement of the coupling, including coupling ball, such as after sacrificial or breakaway failure, damage or becoming too worn. A preferred breakaway coupling joint is formed or configured with at least one and preferably a preferably of failure regions configured to induced controlled failure when the stress or force reaches a threshold stress or force, preferably a yield stress or ultimate stress, at or below which the lifter bar can fail or bind in the molding apparatus. In another preferred embodiment, breakaway coupling joint is configured to controllably fail when the stress or force reaches a threshold of at least three-fourths the stress or force at which the lifter bar fails or binds. In a preferred embodiment the breakaway coupling joint also is a floating coupling joint that more preferably is a floating dovetail joint with a male tongue formed in an end of the lifter bar and a tongue-receiving female groove formed in the coupling carrying coupling bar that is operatively coupled to the lifter base in the manner described above.

A preferred coupling is a lifter bar extension coupling formed of a lifter bar extension link having one end carrying coupling ball and an opposite end configured to form part of coupling joint, e.g., breakaway coupling joint, with a respective adjoining end of the lifter bar. A preferred lifter bar extension link has an arched coupling ball support with a concave ball seat to which the coupling ball is fixed via an adherent material that is brazing material or preferably solder. Such a preferred lifter bar extension link also has a pair of spaced apart dovetail tongue-receiving female groove defining arms with a failure region formed therein that preferably is or includes a controlled failure initiation region at respective bottom corners of the dovetail groove formed by the arms that cause the arm to controllably crack or break when the aforementioned threshold stress or force has been met or exceeded. Such a breakaway dovetail joint also is a floating joint because the male tongue of the lifter bar and tongue-receiving groove are formed with a clearance fit that preferably is a sliding fit enabling self-aligning relative movement therebetween to occur in a direction generally orthogonal to a lengthwise extent of the lifter bar. Such a breakaway floating dovetail joint advantageously enables self-aligning misalignment adjustment between the lifter bar and the lifter base and the part of the mold, e.g., ejector plate or ejector plate assembly, to which the lifter base is anchored or fixed by permitting slidable relative movement therebetween in a direction generally orthogonal to the lengthwise extent of the lifter bar, lifter blade or lifter rod.

In a preferred embodiment, the molding apparatus is a plastic injection molding apparatus with a pair of mold halves through which part of the lifter bar extends, one of the mold halves movable relative to the other one of the mold halves during opening and closing cycling of the mold halves during molding apparatus operation, wherein the lifter bar has a detent receiver formed therein, and further including a detent in operable communication with one of the mold halves and the lifter bar engaging the detent receiver to prevent rotation of the lifter bar relative to the mold halves during opening and closing of the mold halves during mold apparatus operation. The lifter bar is an elongate generally cylindrical rod and the detent is a key that preferably is an anti-rotation key that preferably prevents rotation of the lifter bar rod during opening and closing cycling of the mold halves and corresponding reciprocating movement of the ejector plate assembly during molding apparatus operation. In one such preferred embodiment, a tubular guide or bearing sleeve is carried by or anchored to one of the mold halves in a manner where the sleeve moves substantially in unison with the one of the mold halves with a portion of the lifter rod telescopingly received through the sleeve and reciprocatingly guided by the sleeve during mold cycling and reciprocation of the ejector plate assembly.

These and other objects, features and advantages of this invention will become apparent from the following detailed description of the invention and accompanying drawings.

DRAWINGS

Preferred exemplary embodiments of the invention are illustrated in the accompanying drawings in which like reference numerals represent like parts throughout and in which.

Figure 9:
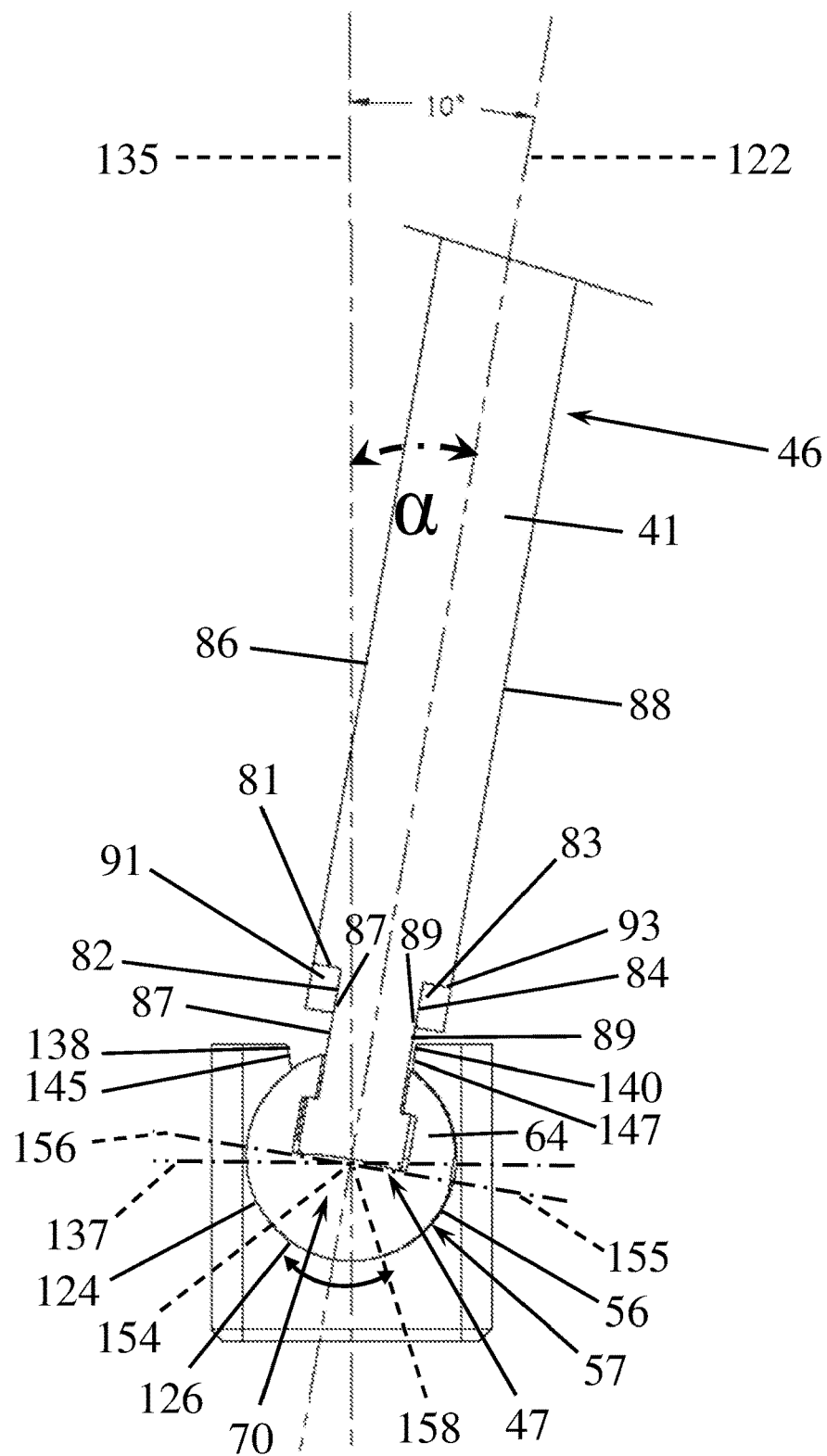
FIG. 9 is a front elevation view of a core lifter assembly of the present invention depicting side-to-side angular adjustment or self-alignment of an angular range of up to ±10 degrees about a first axis extending along a longitudinal centerline of the bearing raceway that also extends through a center of the ball of the coupler assembly.
Figure 11:
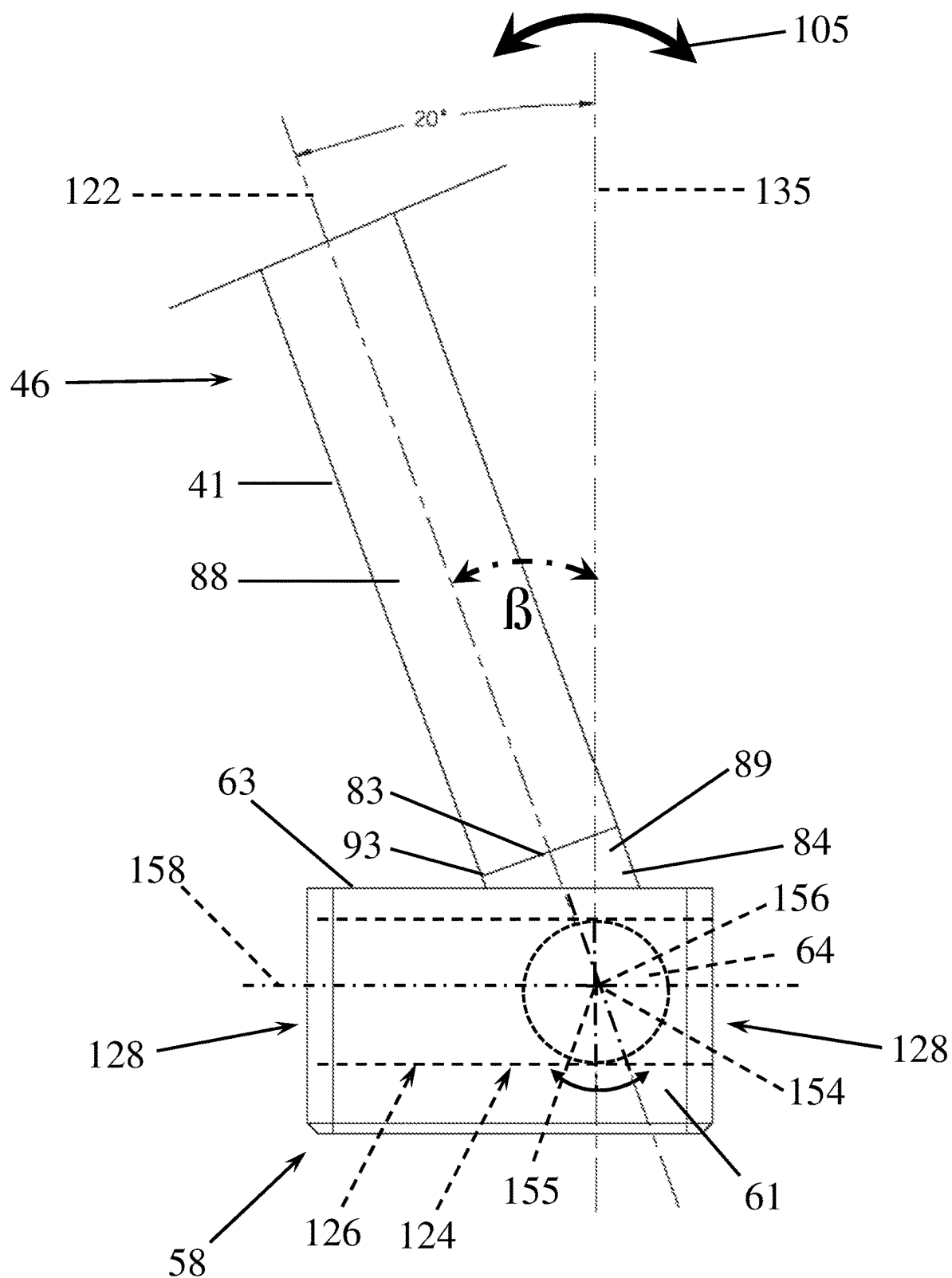
Figure 12:
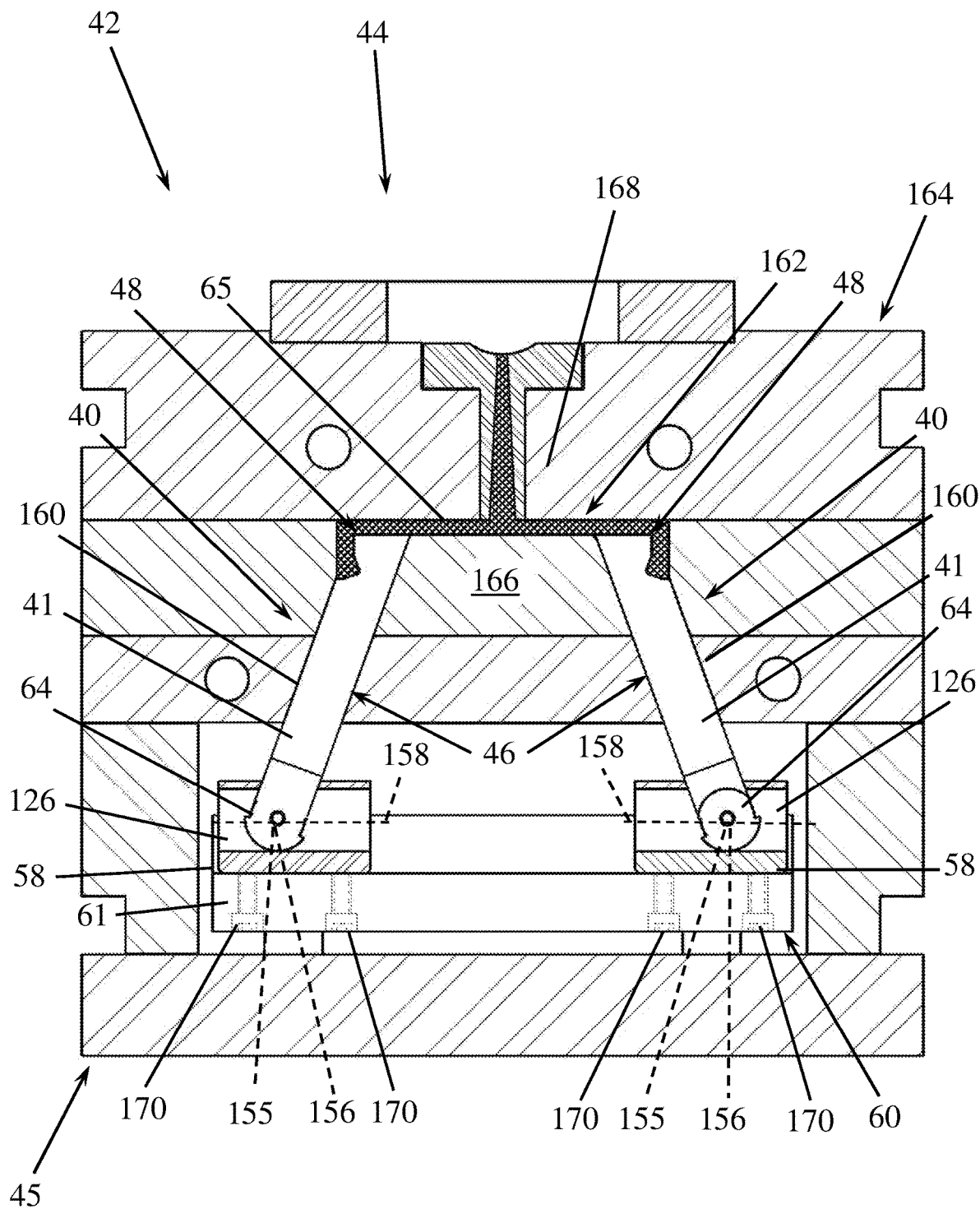
Figure 13:
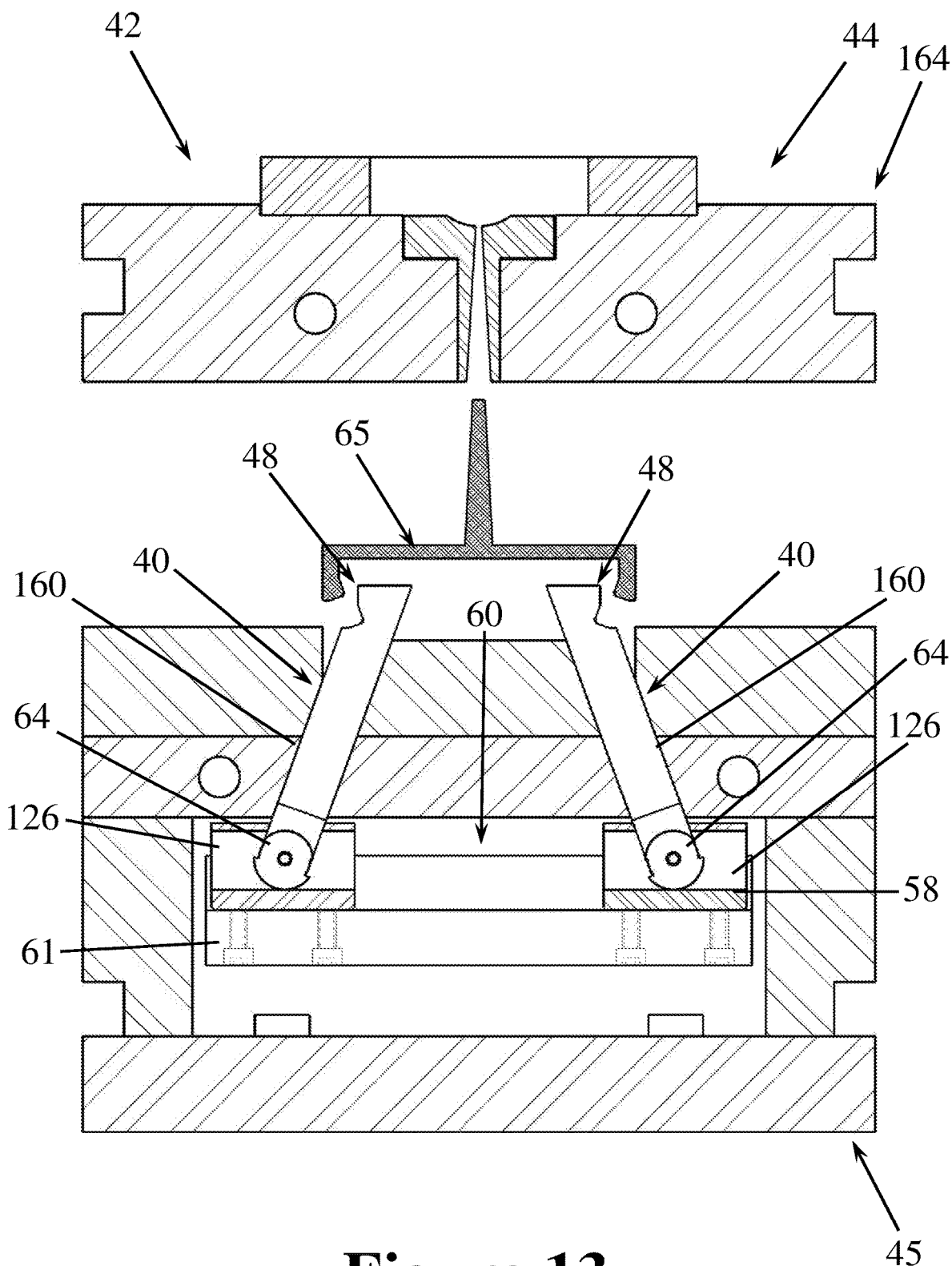
Figure 14:
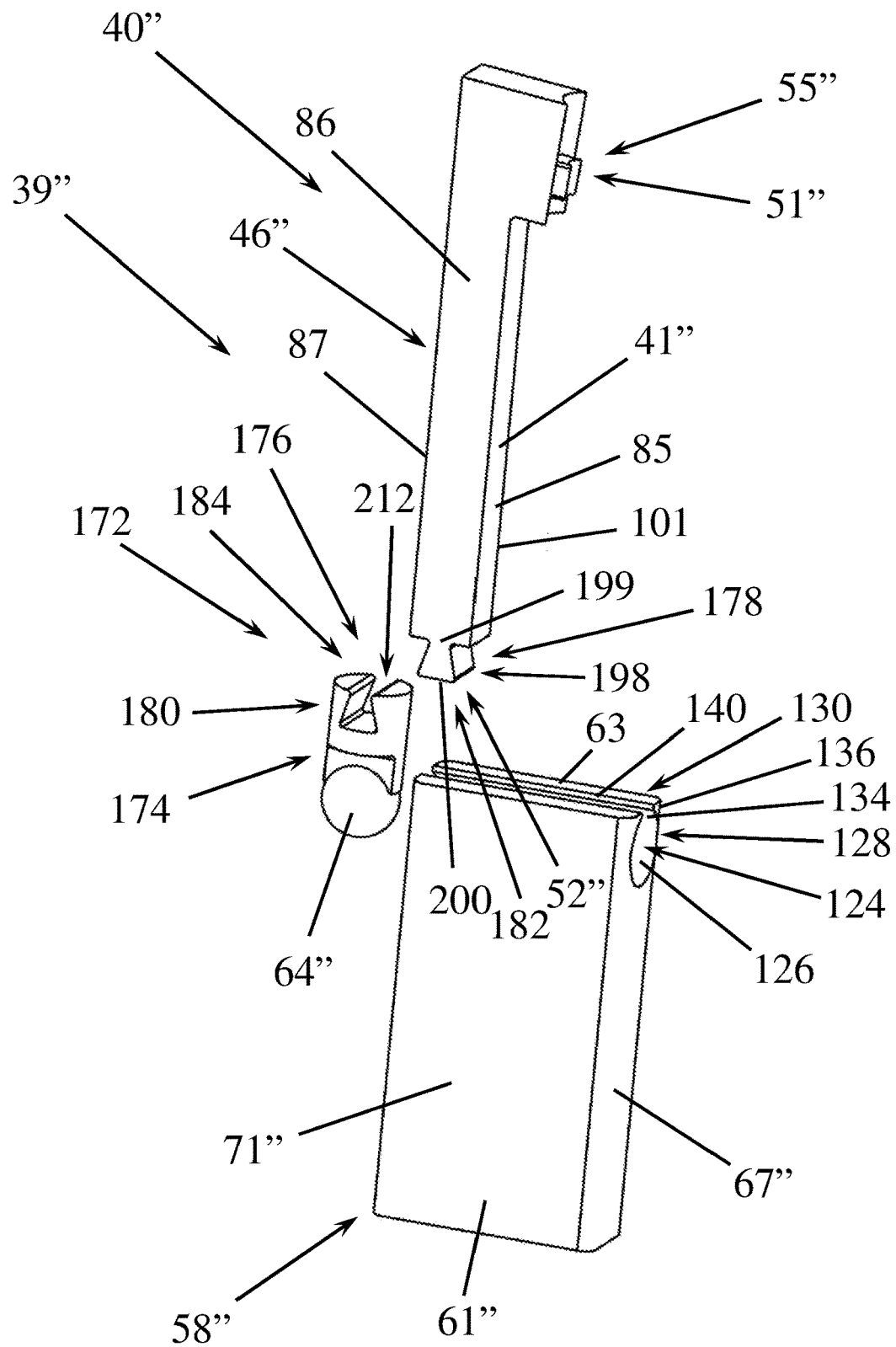
Figure 15:
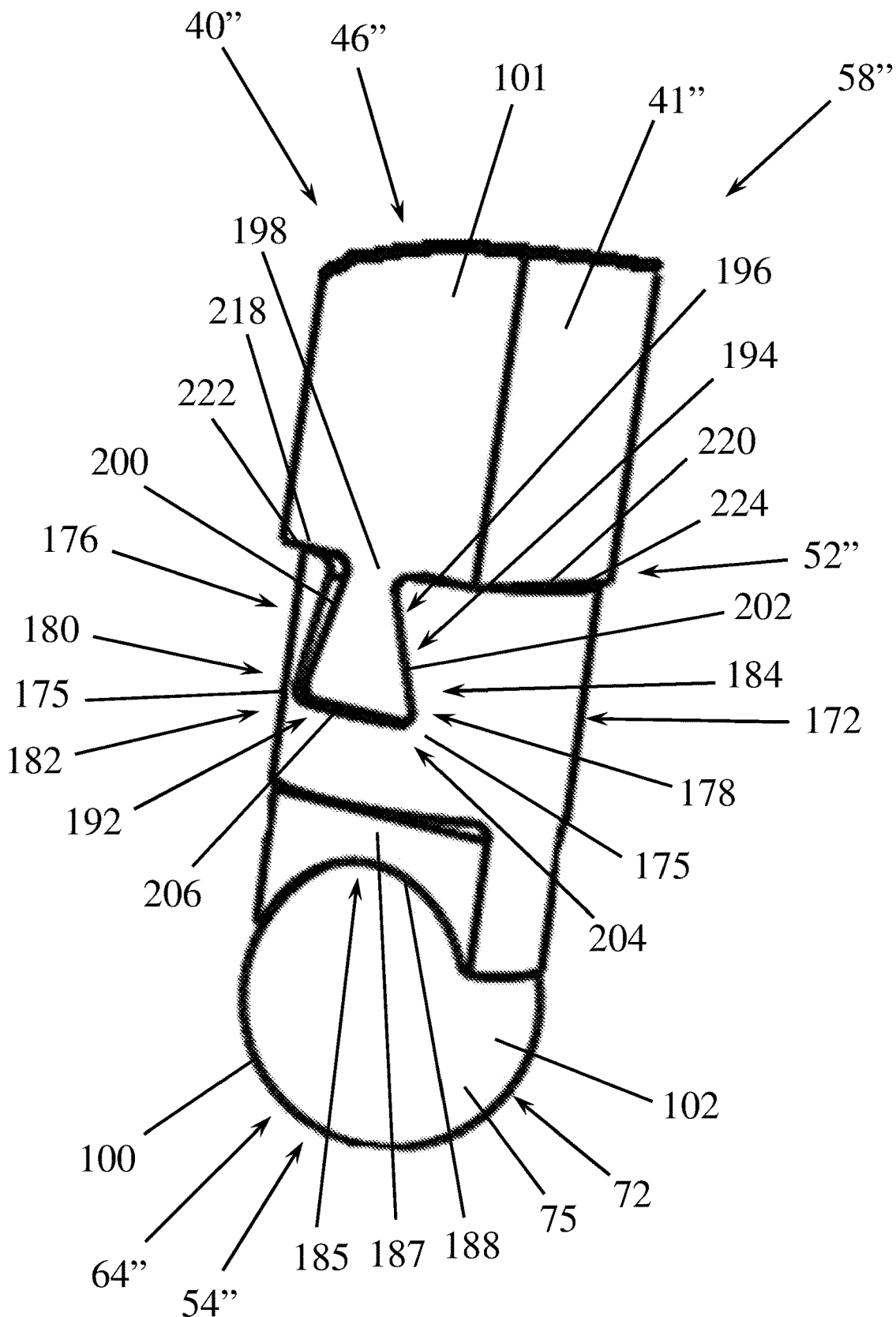
Figure 16:
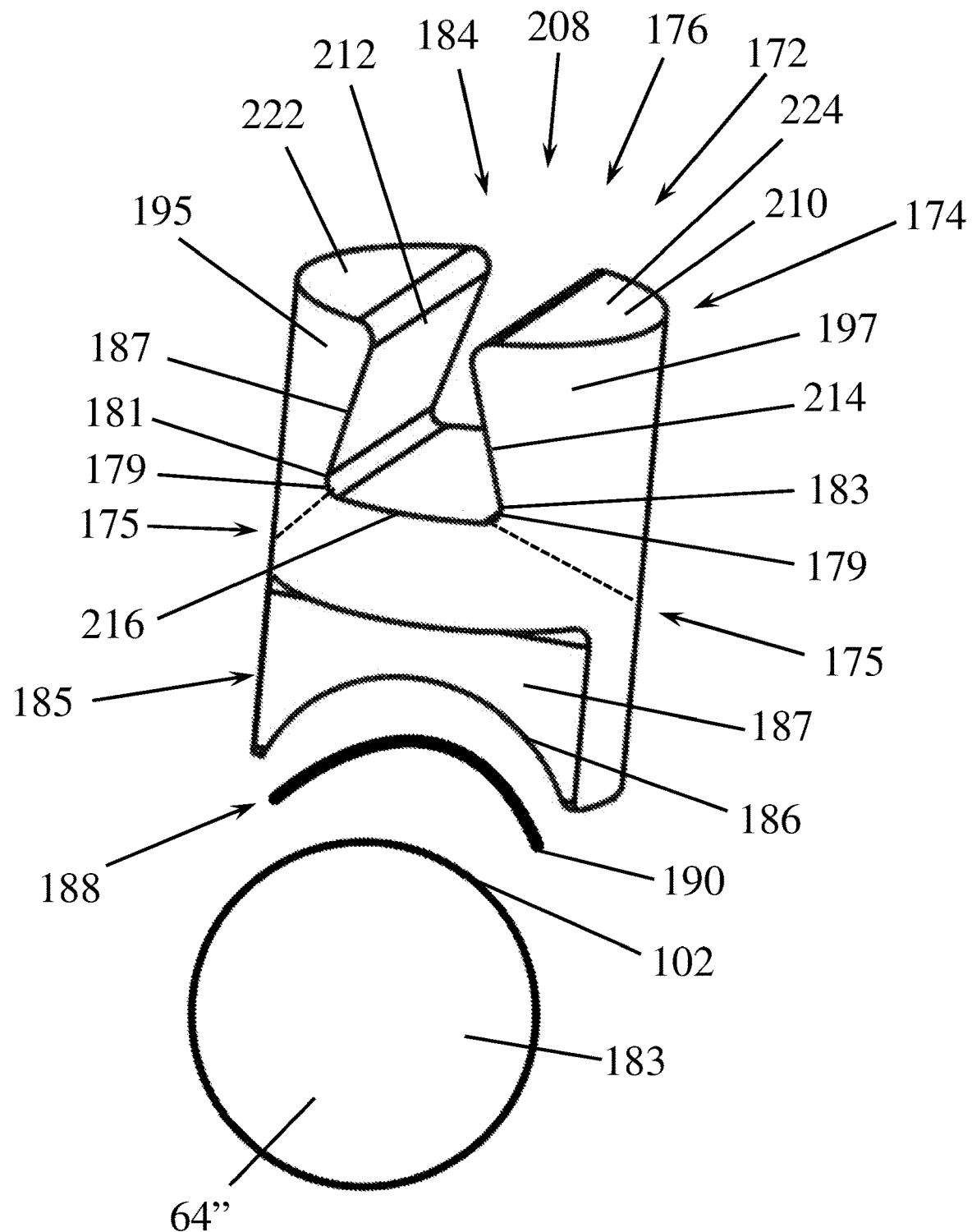
Figure 17:
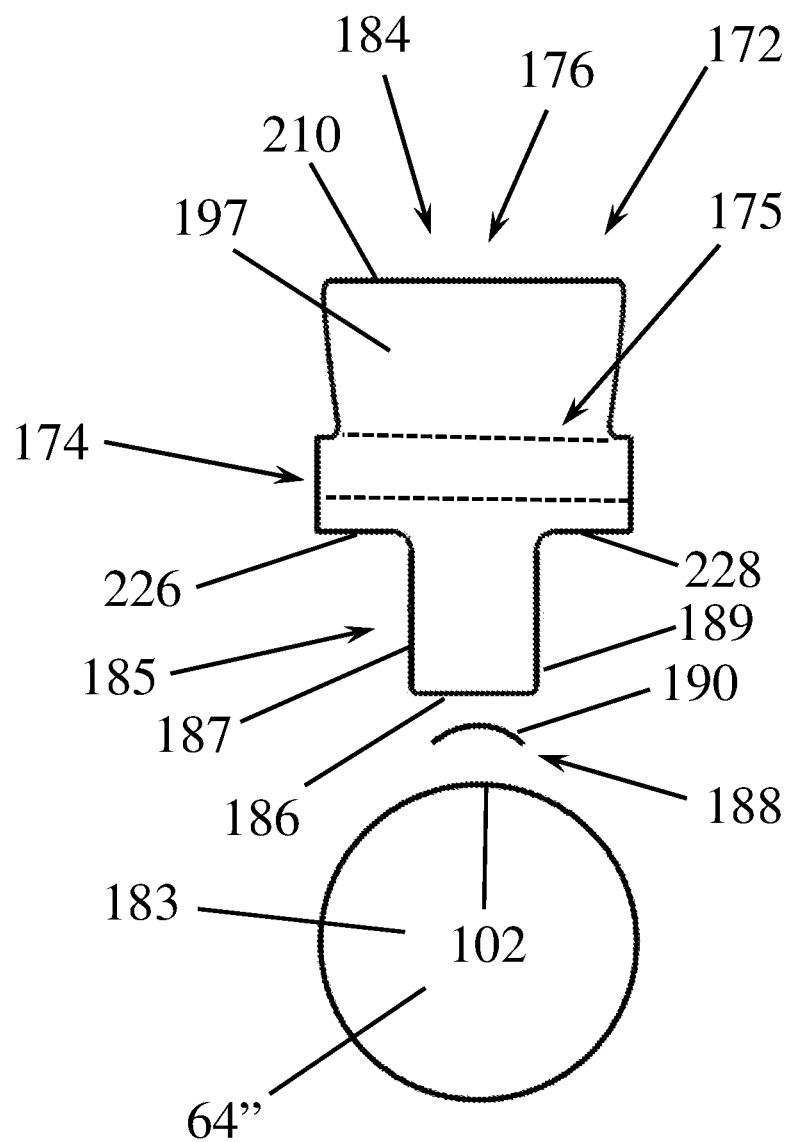
Figures 18A, 18B:
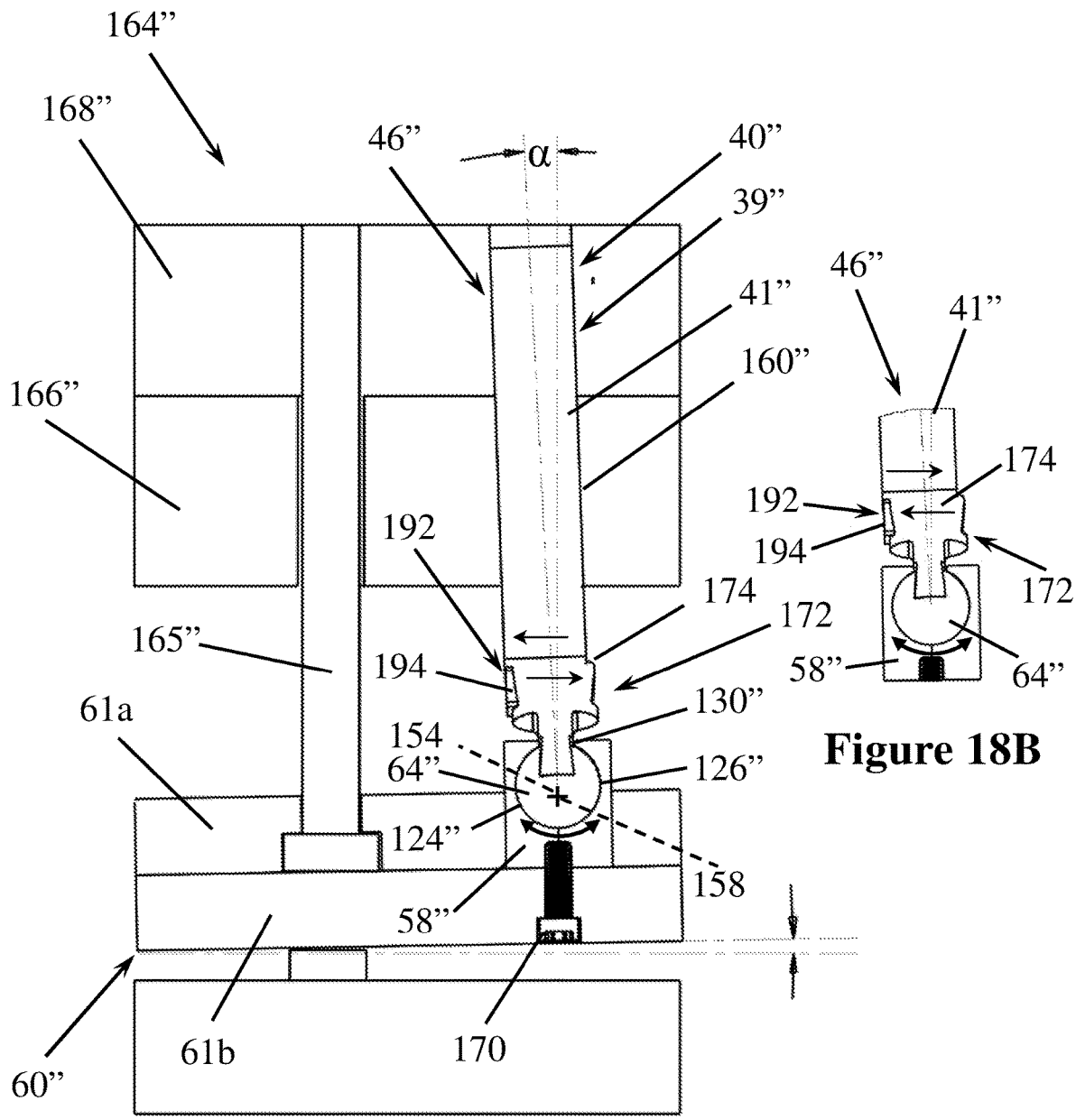
Figure 19:
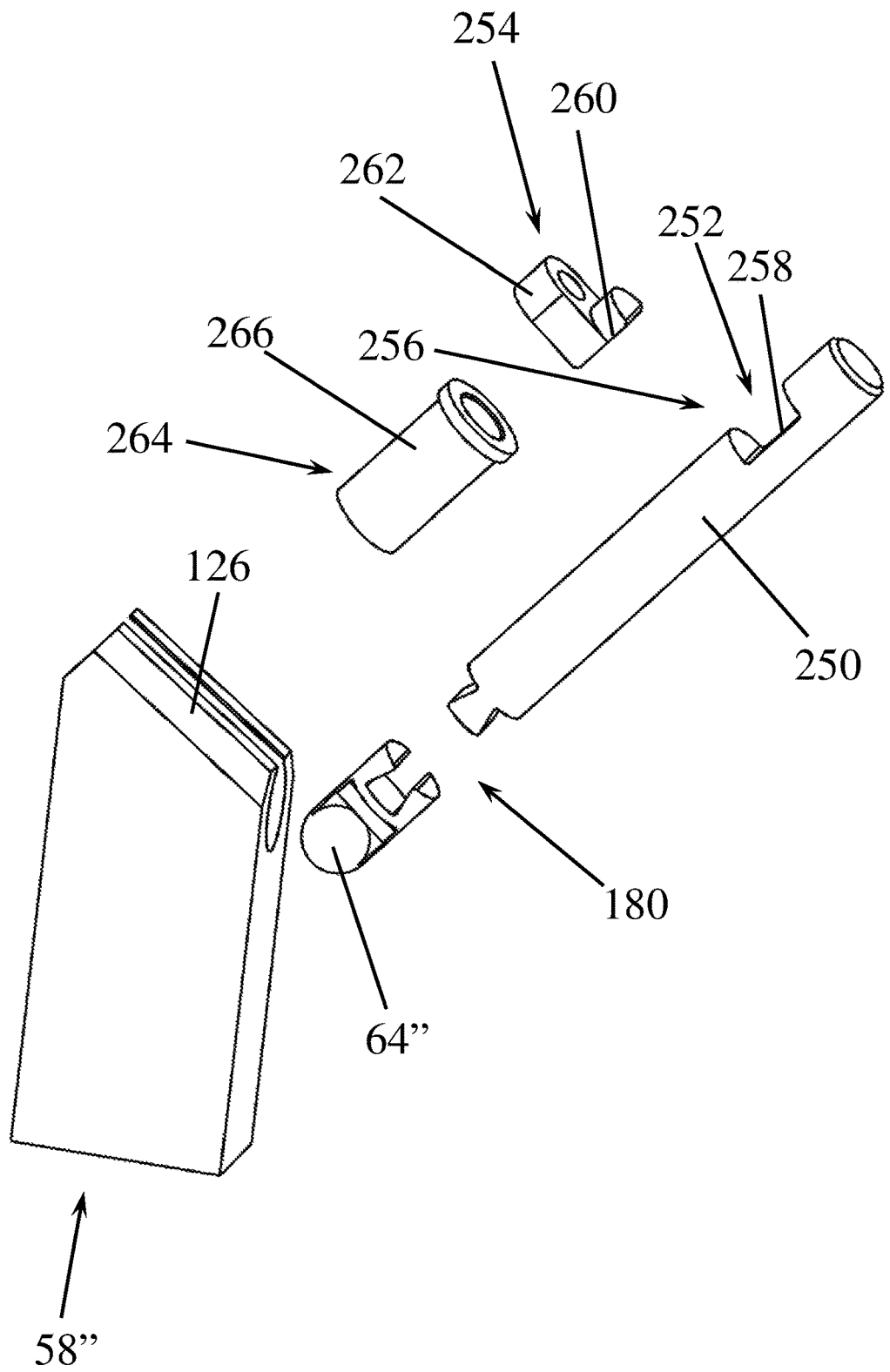
Figure 20:
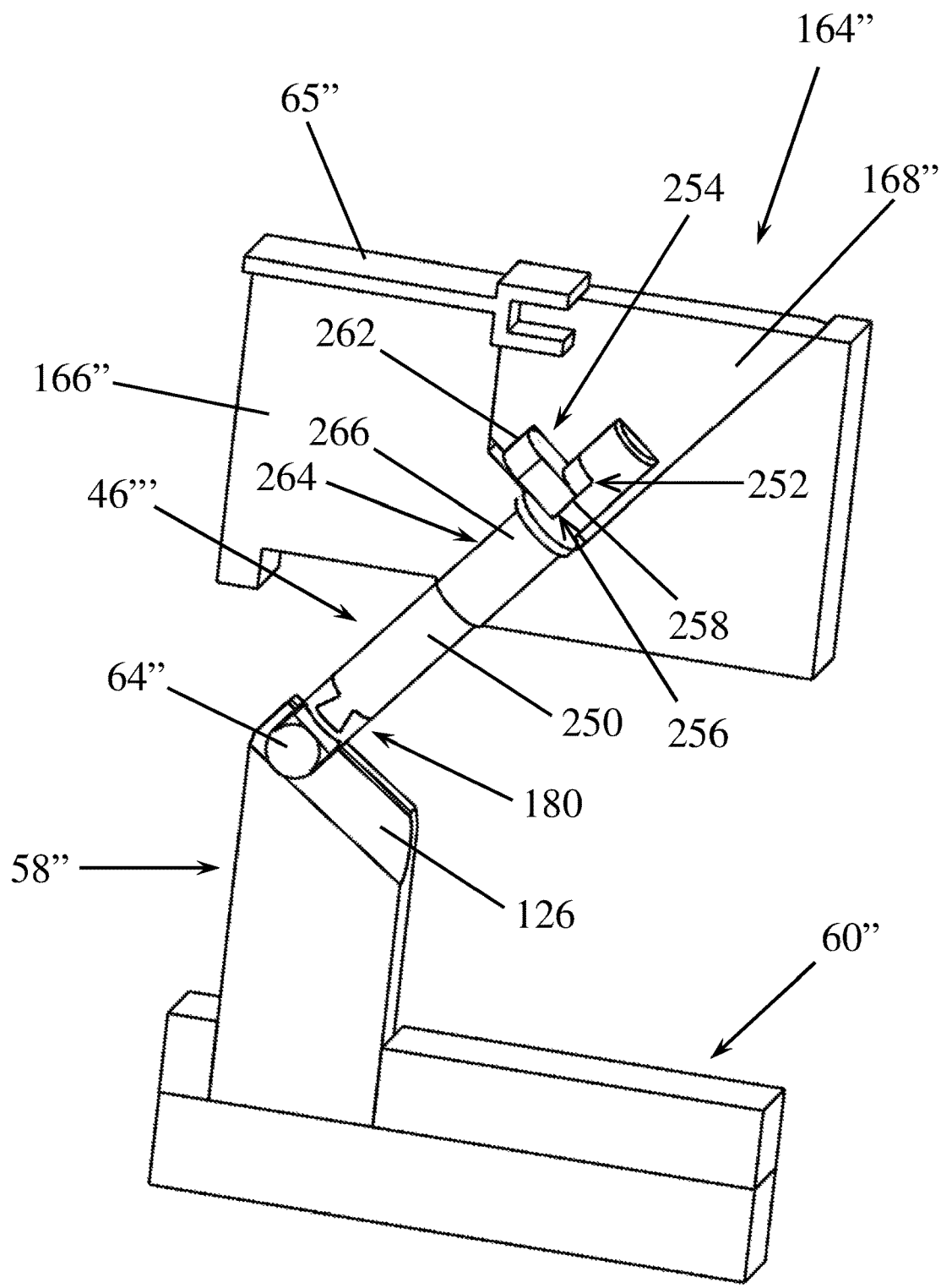
Figure 21:
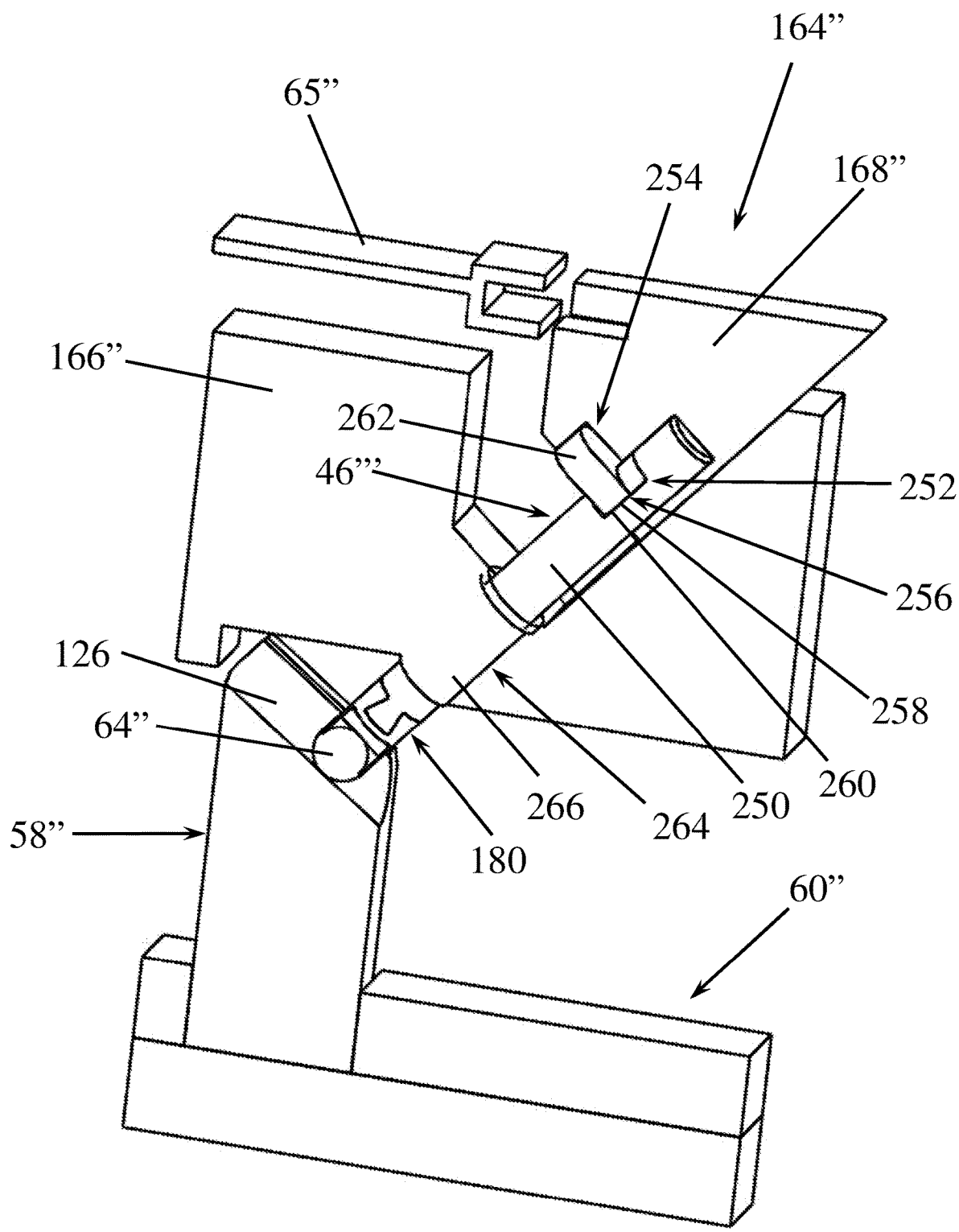

FIG. 11 is a front elevation view of the core lifter assembly of FIG. 9 depicting fore-aft angular adjustment or self-alignment of an angular range of up to ±20 degrees about a second axis extending transversely to the longitudinal centerline of the bearing raceway that also extends through a center of the ball of the coupler assembly where the second axis is translatable along the bearing raceway;

FIG. 12 illustrates use and operation of a plurality of core lifter assemblies of the present invention installed in a molding apparatus with the mold closed forming a plastic part where a molding end of each core lifter apparatus forms an internal undercut in the plastic part being molded;

FIG. 13 illustrates use and operation of the plurality of core lifter assemblies during ejection of the formed plastic part where the core blade or lifter bar of each core lifter assembly is able to adjust or align by being able to translate in a side-to-side direction, in a fore-aft direction longitudinally along the raceway, in a side-to-side direction generally transversely relative to the raceway, rotatively in a fore-aft direction, and/or rotatively in a side-to-side direction during mold closing and mold opening;

FIG. 14 is an exploded perspective view of another preferred embodiment of a self-aligning angle, tolerance and misalignment compensating core lifter assembly employing a core lifter bar assembly with a core lifter bar removably attached via a breakaway floating coupling joint to a lifter bar extension coupler carrying a coupling ball received in a core lifter base;

FIG. 15 is an enlarged fragmentary perspective view of the lifter bar or blade slidably coupled to a blade extension coupling link of the lifter bar extension coupler that carries the coupling ball;

FIG. 16 is an exploded enlarged front perspective view of a preferred embodiment of the lifter bar extension coupler;

FIG. 17 is an exploded side elevation view of the lifter bar extension coupler of FIG. 16;

FIG. 18A is a front elevation view of part of plastic injection molding machine or assembly with a fragmentary front elevation view of part of the core lifter assembly of FIG. 14 with arrows depicting floating or sliding relative movement in one direction between the lifter bar or blade and the lifter bar extension link, coupling ball fixed to the link, and core lifter base in which the coupling ball is slidably, pivotably and rotatively received;

FIG. 18B is a fragmentary front elevation view of part of the core lifter assembly of FIG. 14 with arrows depicting in an opposite direction floating or sliding relative movement between the lifter bar or blade and the lifter bar extension link, coupling ball and core lifter base;

FIG. 19 is an exploded perspective view of another embodiment of a core lifter bar assembly equipped with a lifter bar that is a generally cylindrical rod having a detent formed in it in which an anti-rotation key is received preventing lifter bar rod rotation and a tubular lifter bar rod guide sleeve that telescopes over part of the lifter bar rod to slidably telescopically guide the lifter bar rod during reciprocation during mold cycling;

FIG. 20 is a fragmentary perspective view of part of a mold assembly of a plastic injection molding machine equipped with the core lifter bar assembly of FIG. 19 depicting the core lifter bar in a retracted or molding position and the mold in a closed or molding position illustrating a molded component with a feature, e.g., undercut, being molded; and FIG. 21 is a fragmentary perspective view of the part of the mold assembly of FIG. 20 depicting the core lifter bar in an extended or part ejecting position and the mold in an open or part ejecting position illustrating ejection of the molded component or part.

Before explaining one or more embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

FIGS. 1-13 illustrate a preferred embodiment of a core lifter 40 of the present invention for use in a molding apparatus 42, which preferably is a formable material molding apparatus 44, and which more preferably a plastic molding apparatus 45, such as the plastic injection molding apparatus 45 depicted in FIGS. 12 and 13, which advantageously is configured to angularly adjust, including to provide angular alignment compensation, during molding apparatus operation that preferably also is a core lifter 40 of self-aligning construction in that the core lifter 40 also is pivotable along a plurality of axes while also being able to provide side-to-side tolerance compensation during molding apparatus operation. Such a core lifter 40 constructed in accordance with the present invention is able to more smoothly operate in a wider range of molding apparatuses and under a greater range of operating conditions while lasting longer thereby advantageously facilitating smoother molding apparatus operation leading to increased molding apparatus uptime.

With reference to FIGS. 1-11, the core lifter 40 is a core lifter assembly 39 composed of a core blade or lifter bar 46 with an elongate substantially straight lifter bar blade 41 equipped with a actuator end 55 at one end that is or includes a three dimensionally contoured feature-molding core 48 carried by the blade 41. The lifter bar 46 has a pivotable, slidable, rotatable, and translatable coupling arrangement 50 disposed at an opposite end of the blade 41 that is a coupling end 52 of the bar 46 or blade 41 preferably configured to provide at least a plurality of, preferably at least a plurality of pairs of, i.e., at least three, (a) angular adjustment, (b) pivotable adjustment, (c) fore-and-aft axial translatable adjustment, and/or (d) transverse side-to-side adjustment producing a core lifter 40 in accordance with the present that is at least partially self-aligning and/or tolerance compensating, and which preferably is substantially completely self-aligning and/or tolerance compensating. As is discussed in more detail below, the coupling arrangement 50 preferably includes a core lifter bar coupling head 57 carried by the blade 41 at or adjacent the coupling end 52 with the core lifter bar coupling head 57 having a shape or contour complementary to a core lifter bar coupling receiver 56 of a core lifter base 58 in which the coupling head 57 is movably, preferably slidably, received.

The lifter bar coupling receiver 56 preferably is elongate recessed into the base 58 with the receiver 56 extending longitudinally or in a lengthwise direction relative to the base 58. The base 48 preferably is formed of an elongate body 61 that is generally rectangular both in a lengthwise direction and transverse direction of the base 48. The lifter bar coupling receiver 56 can and preferably does extend longitudinally substantially the length of the body 61 of the base 58.

In a preferred embodiment, the lifter bar coupling receiver 56 has a cross-section or cross-sectional contour or shape that is substantially complementary to a shape or contour, preferably a peripheral shape or peripheral contour, of the coupling head 57 enabling the head 57 to be movably received in the receiver 56 thereby movably coupling the lifter bar 46 and core 48 to the base 58. With the base 58 preferably fixed to part of the molding apparatus 42, preferably an ejector plate or ejector plate assembly of the apparatus 42, receipt of the head 57 in the receiver 56 movably couples the lifter bar 46 and core 48 to the base 58 in a manner permitting the head 57 to translate along the receiver 56 enabling the bar 46 to substantially simultaneously move in a generally linear direction relative to the base 58 during mold cycling during molding apparatus operation.

Figure 3:
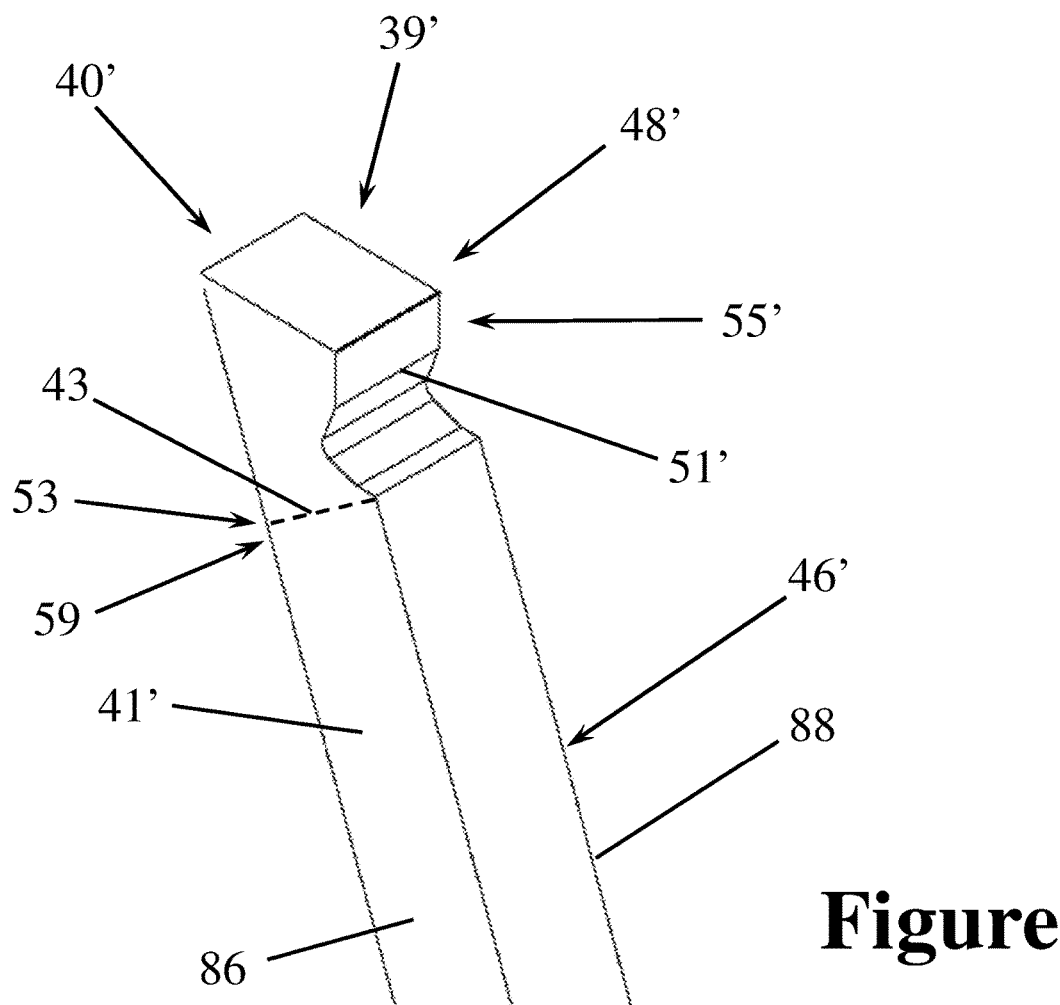
FIG. 3 is a perspective exploded view of the core lifter bar and coupler assembly of FIGS. 1 and 2.
Figure 3:
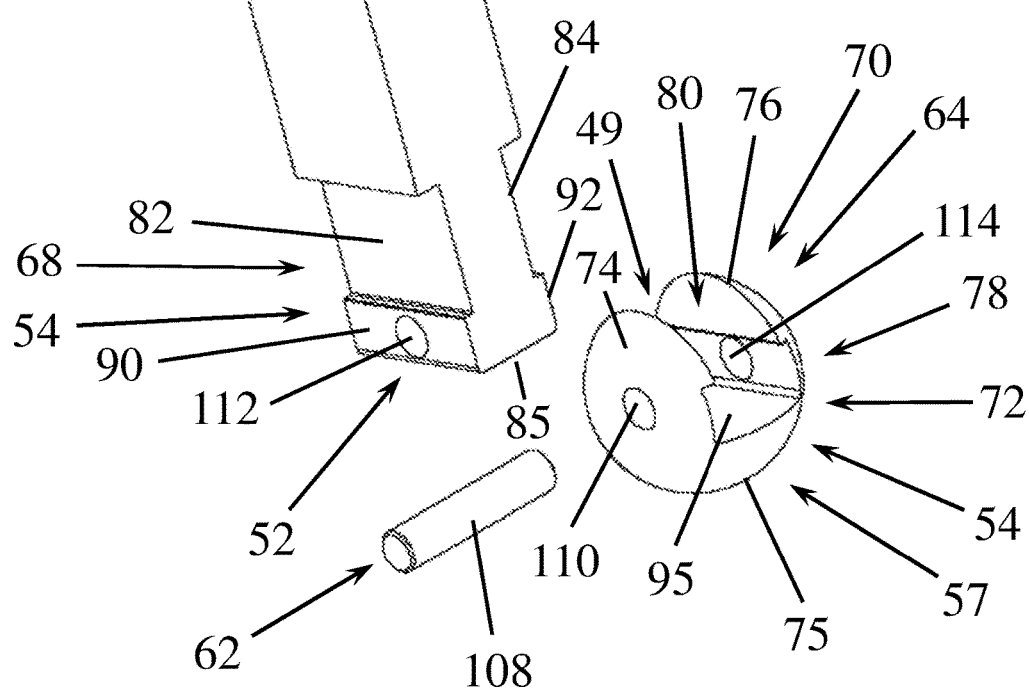

While the three-dimensionally contoured molding end 55 of the lifter bar 46 preferably is integrally shaped or formed to provide a core 48 with a core molding face 51, which can be and preferably is a three-dimensionally contoured molding face 51, which forms or molds a correspondingly three-dimensionally shaped feature in the part being molded (not shown), it is contemplated that a core lifter 40' of the present invention can further be configured to have a replaceable three-dimensionally contoured molding end 55' with a removable or replaceable core 48', such as depicted in FIG. 3, which is a component separate from the blade 41' of the lifter bar 46' that is attached or mounted to a core-mounting end 53 of such a removable core carrying lifter bar blade 41' during assembly of a lifter bar 46' in making of such a removable core carrying core lifter 40'. FIG. 3 shows a dashed or phantom line 43 delineating where the separate core 48' engages with the core-mounting end 53 of the blade 41' of the core lifter bar 46' of such a core lifter 40' of the present invention that is constructed and arranged and/or configured to removably accept one of at least a plurality of different cores 48' having a plurality of different three-dimensionally contoured molding faces 51', lengths, widths, depths, sizes or shapes.

With continued reference to FIG. 3, separate core 48' is of removable construction, which can be and preferably is of replaceable construction, and which can be and preferably is three-dimensionally contoured to removably or releasably engage with a core-mounting end 53 of the blade 41' of the lifter bar 46' to removably attach the core 48' to the blade 41' of the bar 46' with the core-mounting end 53 preferably being complementarily three-dimensionally contoured such that a releasable core attachment joint 59 is formed at dashed or phantom line 43 in FIG. 3 between the core 48' and the end of the blade 41' of the lifter bar 46' when the core 48' is attached thereto. In a preferred embodiment, the core 48' and core-mounting end 53 of the blade 41' are complementarily three-dimensionally contoured to produce a core attachment joint 59 of snap-fit construction that enables the core 48' to be snapped onto the core-mounting end 53 of the lifter bar blade 41' during assembly of lifter bar 46' and to be snapped off from the core-mounting end 53 of the blade 41' during removal of the core 48' from blade 41' of the bar 46' of the core lifter 40'.

A core 48' and core lifter 40' with a lifter bar 46' having a lifter bar blade 41' with a core-mounting end 53 configured to enable attachment and detachment of core 48' thereby advantageously enables a plurality of different cores 48' having a molding face 51 with plurality of different three-dimensional shapes, three-dimensional contours, and/or sizes to be interchangeably used with the same or single core lifter 40' of the invention. In a preferred embodiment, such a core 48' and core lifter 40' of the present invention with a lifter bar 46' having a blade 41' with such a core-mounting end 53 configured to form, provide or produce a core-attachment joint 59 that enables removable or releasable mounting of the core 48' to the core-mounting end 53 of the blade 41' of the lifter bar 46' advantageously enables cores 48' having a plurality of differently shaped or three-dimensionally contoured molding faces 48' to be interchangeably mounted, e.g., attached to and detached from the core-mounting end 53 of the blade 41' of the lifter bar 46', to the same single core lifter 40'.

With continued reference to FIG. 3, separate core 48' is of removable construction, which can be and preferably is of replaceable construction, and which can be and preferably is of toollessly attachable and/or of toollessly removable construction, with a preferred embodiment of such a core 48' of the invention being a component separate from lifter bar blade 41' and lifter bar 46' of core lifter 40' with the lifter bar blade 41' of the lifter bar 46' having a core-mounting end 53 configured to form a core attachment joint 59 that enables the core 48' to be toollessly attached to the core-mounting end 53 of the blade 41' of bar 46' and/or toollessly detached from the mounting end of the blade 41' of bar 46'. In one such preferred embodiment, in accordance with that discussed above, the core 48' and core-mounting end 53 of the blade 41' of the lifter bar 46' of core lifter 40' is configured to form a core attachment joint 59 of snap-fit construction that is constructed and arranged or otherwise configured to enable the core 48' to be toollessly snapped onto the core-mounting end 53 of the blade 41' of the lifter bar 46' and toollessly snapped off or from the core-mounting end 53 of the blade 41' of bar 46'. Although not shown in FIG. 3, where the core-attachment joint 59 is of snap-fit construction, the core-mounting end 53 of the blade 41' of lifter bar 46' of core lifter 40' has a three-dimensionally contoured portion that snap-fittingly engages with a substantially complementary three-dimensionally contoured portion of the core 48' forming a snap-fit attachment joint 59 therebetween thereby enabling the core 48' to be snapped onto and/or snapped off of the core-mounting end 53 of the blade 41' of bar 46' of core lifter 40' preferably without the use of any tools (e.g., "tool-less" joint 59) or fasteners ("fastener-less" joint 59).

Such a removable core-carrying core lifter 40' configured for attachment of a core 48' during core lifter assembly advantageously produces a core lifter 40' of universal construction further in accordance with the present invention that is adaptable and even customizable by advantageously enabling removable and/or replaceable attachment of cores 48' having different shapes, sizes, and other three-dimensional molding face contours and configurations tailor made for the particular molding application, part or component being molded, and/or molding apparatus in which the custom-tailored or custom-shaped core 48' and removable core-carrying core lifter 40' are installed. In other words, a core lifter 40' constructed in accordance with the present invention like that depicted in FIG. 3 with a lifter bar 46' having a lifter bar blade 41' with a core-mounting end 53 configured to receive a removable or replaceable core 48', preferably via snap-fit attachment, enables cores 48' with a molding face 51' having at least a plurality of different shapes, three-dimensional contours, lengths, widths, depths, thicknesses, and/or sizes to be removably attached thereto in producing a highly customizable or configurable core lifter 40' of the invention with a core 48' customized for the particular molding application, part being molded, and/or molding apparatus. Such a core lifter 40' configured to removably receive such a separate core 48' advantageously not only enables the core 48' to be replaced due to wear and/or tear without having to replace the rest of the core lifter 40', but which also enables such a core lifter 40' of the present invention to be used in the same molding apparatus with a plurality of differently shaped, contoured, or sized cores 48' used with either the same mold or different molds depending on the application and/or part being molded.

With reference once again to FIGS. 1 and 2, the coupling arrangement 50 is formed of (a) a pivotable, translatable and transversely adjustable ball-and-socket coupler 54 disposed at the coupling end 52 of the lifter bar 46 with the coupler 54 preferably formed of or otherwise including the coupling head 57, and (b) an axially translatable ball-and-socket coupler receiver 56 of an elongate core lifter base 58 that operably couples with the coupler 54, preferably coupling with the head 57, thereby coupling the lifter bar 46 to the base 58 in a manner that enables at least one of, and preferably at least a plurality of translation, pivoting and/or tolerance-compensating adjustment of the coupler 54, preferably also the coupling head 57 and at least part of the lifter bar 46, relative to the coupler receiver 56 and base 58 during mold cycling during molding apparatus operation. In a preferred embodiment of the coupling arrangement 50, the coupler 54, preferably with or including the coupling head 57, releasably couples with the base 58 by being received by the coupler receiver 56 thereby operatively coupling the coupler 54, preferably with or including the coupling head 57, and the lifter bar 46 to the base 58 in a manner that enables translation, pivoting and tolerance-compensating adjustment of the coupler 54, preferably also the coupling head 57, and at least part of the lifter bar 46, relative to the coupler receiver 56 and base 58 during mold cycling during molding apparatus operation.

Figure 1:
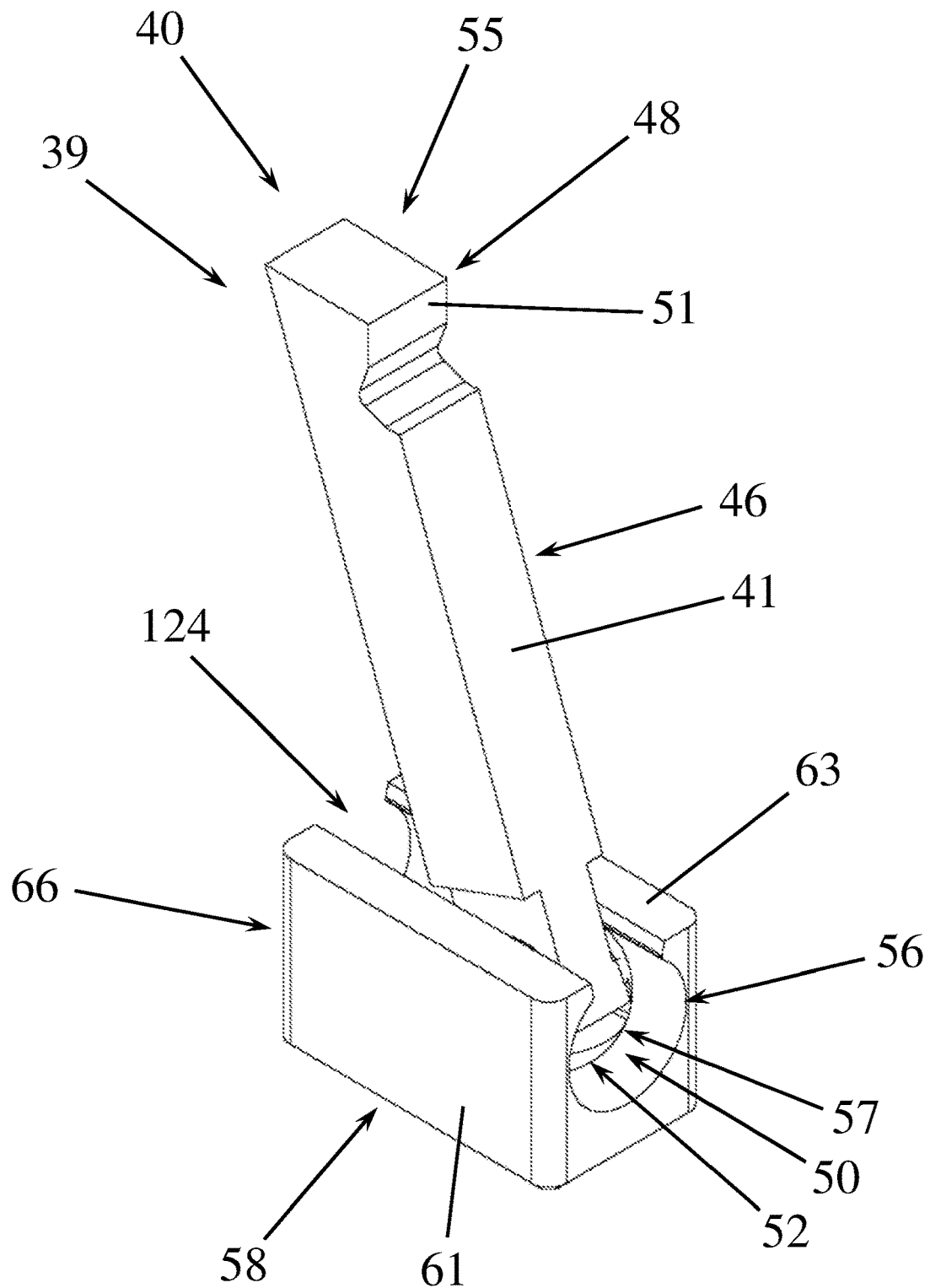
FIG. 1 is a perspective view of a first preferred embodiment of a self-aligning core lifter assembly of the present invention.
Figure 2:
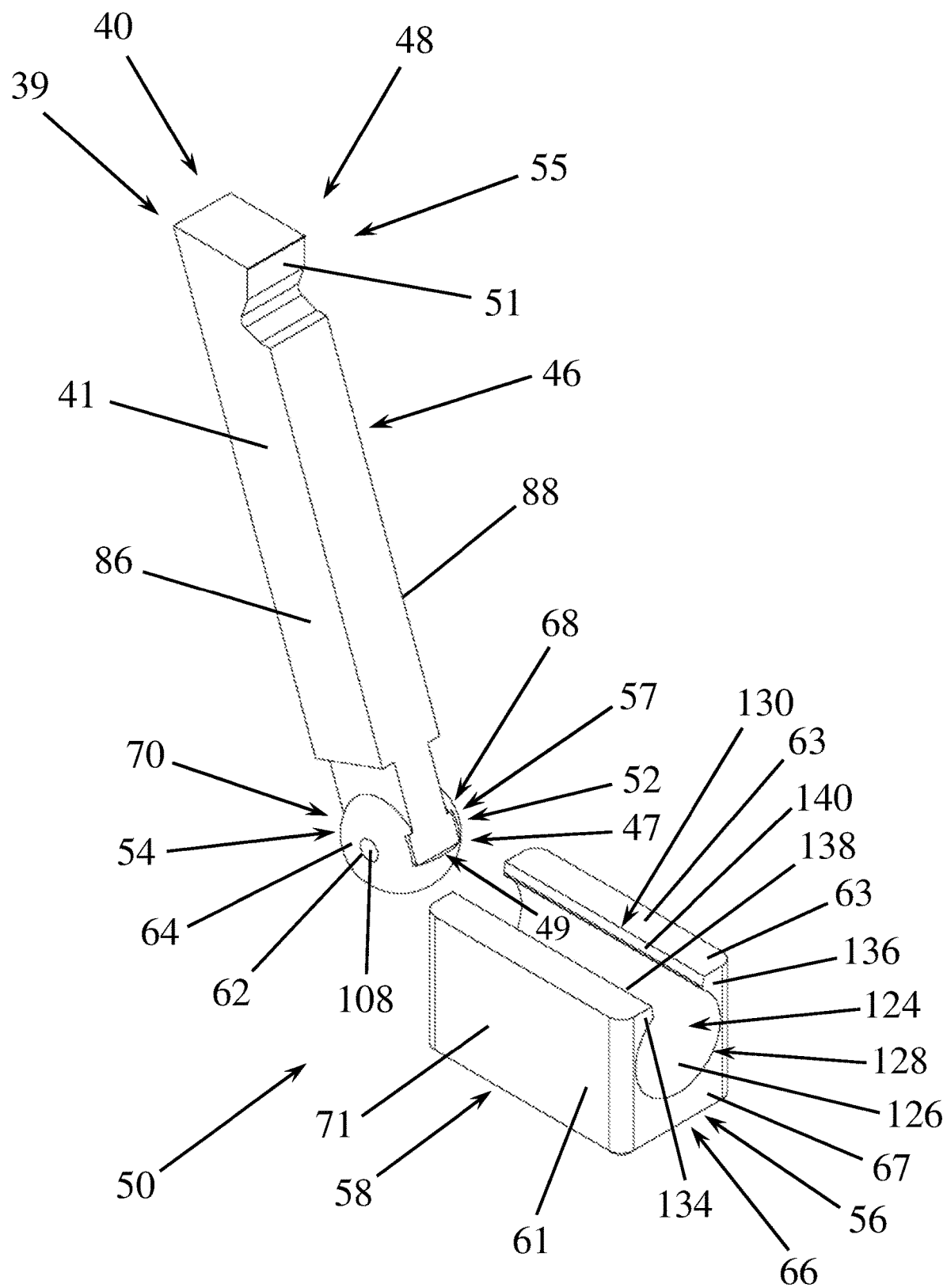
FIG. 2 is a perspective exploded view of a core lifter bar and coupler assembly with a core lifter bar having a lifter bar coupler disposed at its free end that is pivotably, rotationally, and translationally received in a channel formed in a core lifter base anchored to part of the mold and which has an slot in which part of the core lifter bar slidably rides.

In the preferred embodiment depicted in FIGS. 1 and 2, the coupling head 57 of the lifter bar 46 is slidably and rotatively received in the coupler receiver 56 of a core lifter base 58 fixed to an ejector plate or ejector plate assembly of the molding apparatus 42 enabling the lifter bar 46, including its actuator end 55 and/or core 48 carried thereby, to pivot, rotate, and translate relative to or about the base 58 during installation, use and operation of the core lifter 40 during molding apparatus operation. With continued reference to FIGS. 1 and 2, the coupling head 57 is or includes a ball-and-socket type coupler 54 of the lifter bar 46, which preferably is carried or otherwise attached to the lifter bar blade 41, which is slidably, pivotably and/or rotatively received in the coupling receiver 56 formed in the base 58 enabling the lifter bar 46, including core 48, to translate, pivot and/or rotate relative to the base 58 thereby advantageously helping to keep the core lifter 40 from binding during mold cycling during operation of molding apparatus 42. As discussed in more detail below, tolerance compensation can be provided between the coupling head 57 of the lifter bar 46 and lifter bar coupling head receiver 56 of the base 58 in a manner that provides some play therebetween, which can and preferably advantageously does help prevent the core lifter 40 from binding during mold cycling during molding apparatus operation.

With additional reference to FIGS. 12 and 13, one or more such core lifters 40 constructed in accordance with the present invention are assembled and installed in a molding apparatus 42 that preferably is a formable-material molding apparatus 44 and which more preferably a plastics injection molding apparatus 45, with the core lifter base 58 of each core lifter 40 attached, such as by one or more fasteners, to part of the molding apparatus 42 for movement of the base 58 substantially in unison therewith during molding apparatus operation in producing one or more molded parts. In the preferred embodiment shown in FIGS. 12 and 13, the base 58 of each core lifter 40 is removably attached by one or more fasteners, e.g., screws or bolts, to an ejector plate assembly 60 or ejector plate 61 of the molding apparatus 42 substantially immovably fixing or grounding the core lifter base 58 thereto. When the base 58 of each core lifter 40 is fixed or grounded to an ejector plate assembly 60 or ejector plate 61 of the molding apparatus 42, the base 58 of the core lifter 40 moves substantially in unison with the ejector plate 61 of the ejector plate assembly 60 during each molding cycle of molding apparatus operation.

As is also depicted in FIGS. 12 and 12, the elongate lifter bar 46 of each core lifter 40 used in the molding apparatus 42 extends through a corresponding angled lifter guide slot 160 also referred to as a primary release direction slot, into a mold cavity 162 formed in a mold 164 that can (a) have a bottom mold or bottom mold half 166, (b) have a top mold or top mold half 168, or (c) be formed by mating bottom and top halves 166 and 168 of the mold 164 when cycled closed by the molding apparatus 42 during molding apparatus operation. As previously indicated, the base 58 of each core lifter 40 is fixed with fasteners 170 to a respective ejector plate 61 of an ejector plate assembly 60 of the molding apparatus 42 with the elongate bar 46 of each core lifter 40 extending upwardly through its respective guide slot 160 into cavity 162 of mold 164 in which the core 48 disposed at the free end of the lifter bar 46 of corresponding core lifter 40 is used to mold a complementarily shaped feature into the part 65 being molded in the cavity 162 during each molding cycle of opening and closing of the mold 164 during operation of the molding apparatus 42.

During opening and closing of the mold halves, the bar 46 of each core lifter 40 can and preferably does slidably ride and be guided in and by the lifter guide slot to guide movement of the core 48 in the mold cavity. In FIGS. 12 and 13, the bar 46 of each core lifter 40 of the molding apparatus 42 is slidably guided in a corresponding guide slot that extends into the mold cavity and is generally in line with the three-dimensional feature or undercut formed by the core 48 in the molded part. The portion of the lifter bar 46 that carries or is integrally formed with the core 48 extends into the mold cavity when the mold halves are closed to cause the core 48 to mold a feature of a shape complementary to the core 48 in the part being molded and which helps clear the molded part during ejection. An example of the construction of such a molding apparatus 42 that is a plastic injection molding apparatus 45 for which use of one or more core lifters 42 of the present invention is particularly well suited is shown and described in in U.S. Pat. No. 5,316,466, the entirety of which is expressly incorporated herein by reference.

Figure 6:
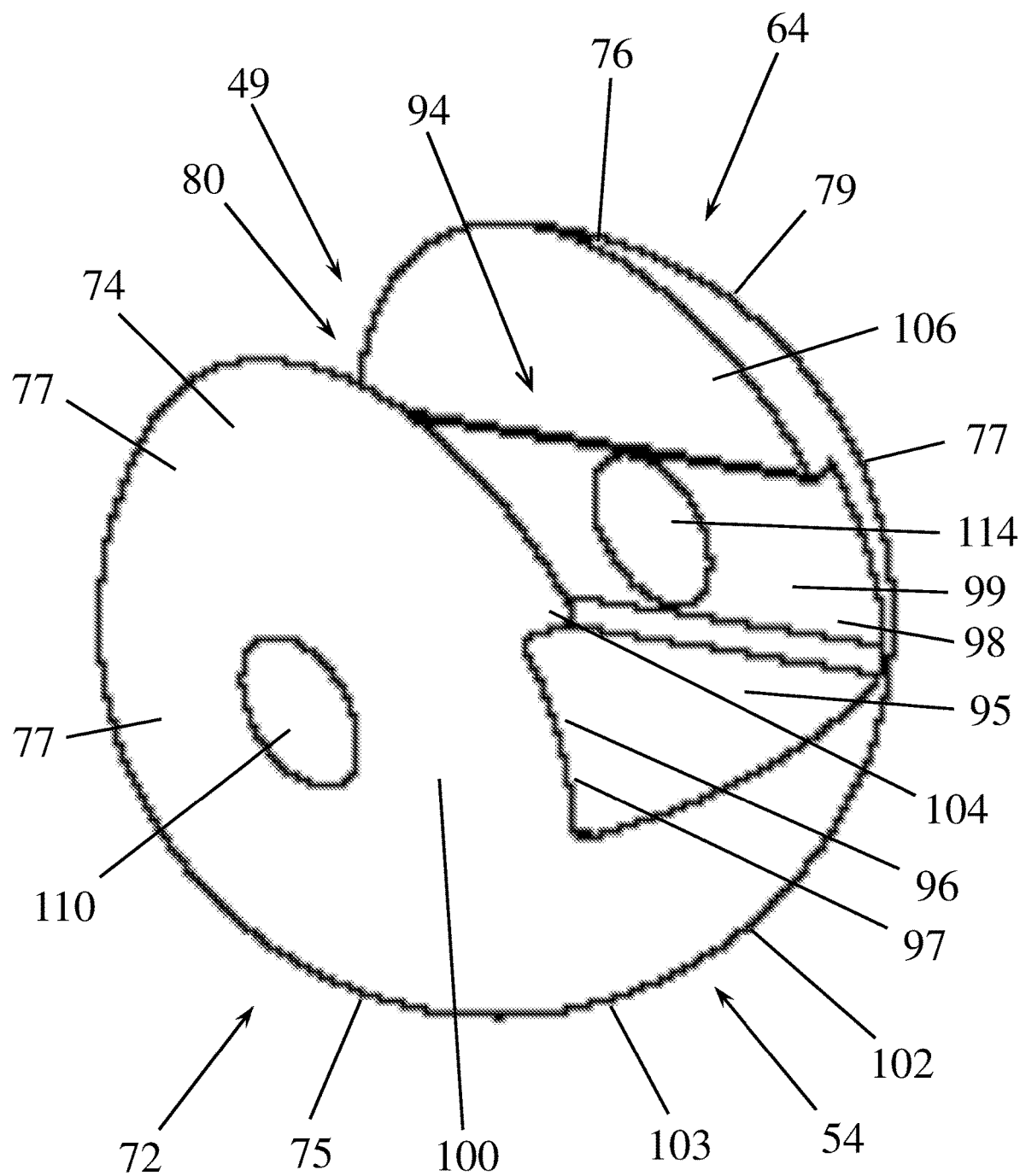
FIG. 6 is a fragmentary front elevation of the coupler ball adjustably mounted to a coupling head at a free end of the core blade or lifter bar forming a coupler assembly where play between the coupler ball and coupling head facilitates alignment and dynamic adjustment during core lifter assembly, core lifter installation, core lifter use, and mold operation.
Figure 7:
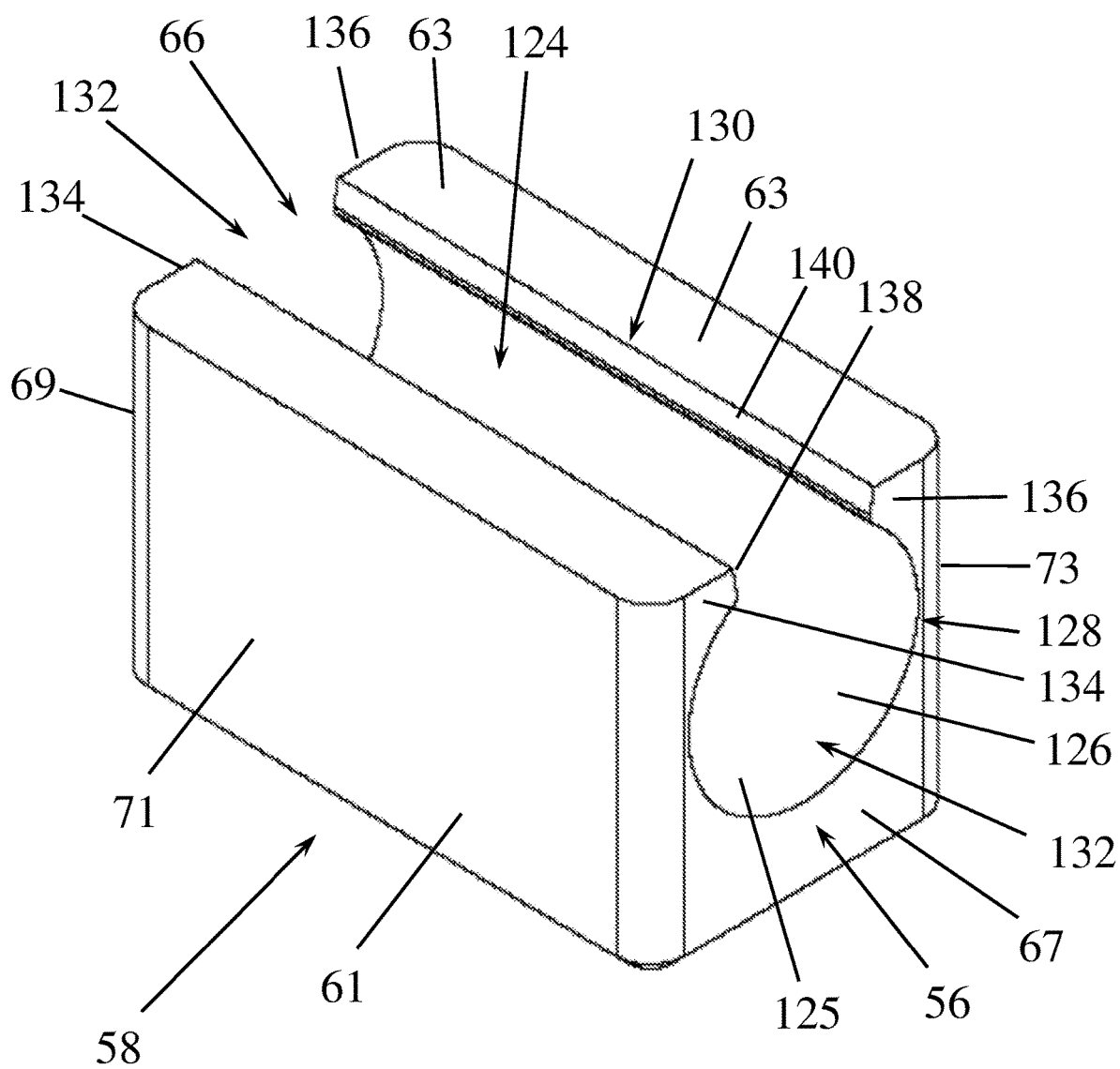
FIG. 7 is a perspective view of the core lifter base illustrating an elongate longitudinally extending bearing raceway in which the coupler ball of the coupler assembly is slidably, pivotably and rotatively received when assembly of the core lifter is completed.

With reference once again to FIGS. 2-5, the core lifter bar coupler 54 has its coupling head 57 disposed at a coupling end 52 of the core lifter bar blade 41 of the core lifter bar 46. FIG. 6 depicts a preferred coupling head 57 of the coupler 54 that is a generally round, preferably substantially spherical, core lifter bar coupling ball 64 which is shown in FIG. 6 detached from the blade 41 of the lifter bar 46 thereby illustrating in FIG. 6 the coupling ball 64 in more detail by showing the ball 64 all by itself. FIG. 7 shows in more detail the coupler receiver 56 of the core lifter base 58 that receives the core lifter bar coupling ball 64 when the core lifter bar 46 is assembled, preferably coupled, to the base 58 in a manner that permits slidable translation of the lifter bar 46 along the base 58 during molding apparatus operation. The base 58 of such a core lifter 40 of the present invention is shown all by itself in FIG. 7 with the core lifter bar 46 detached or disengaged to show the base 58, including its coupler receiver 56, in more detail.

Figure 8:
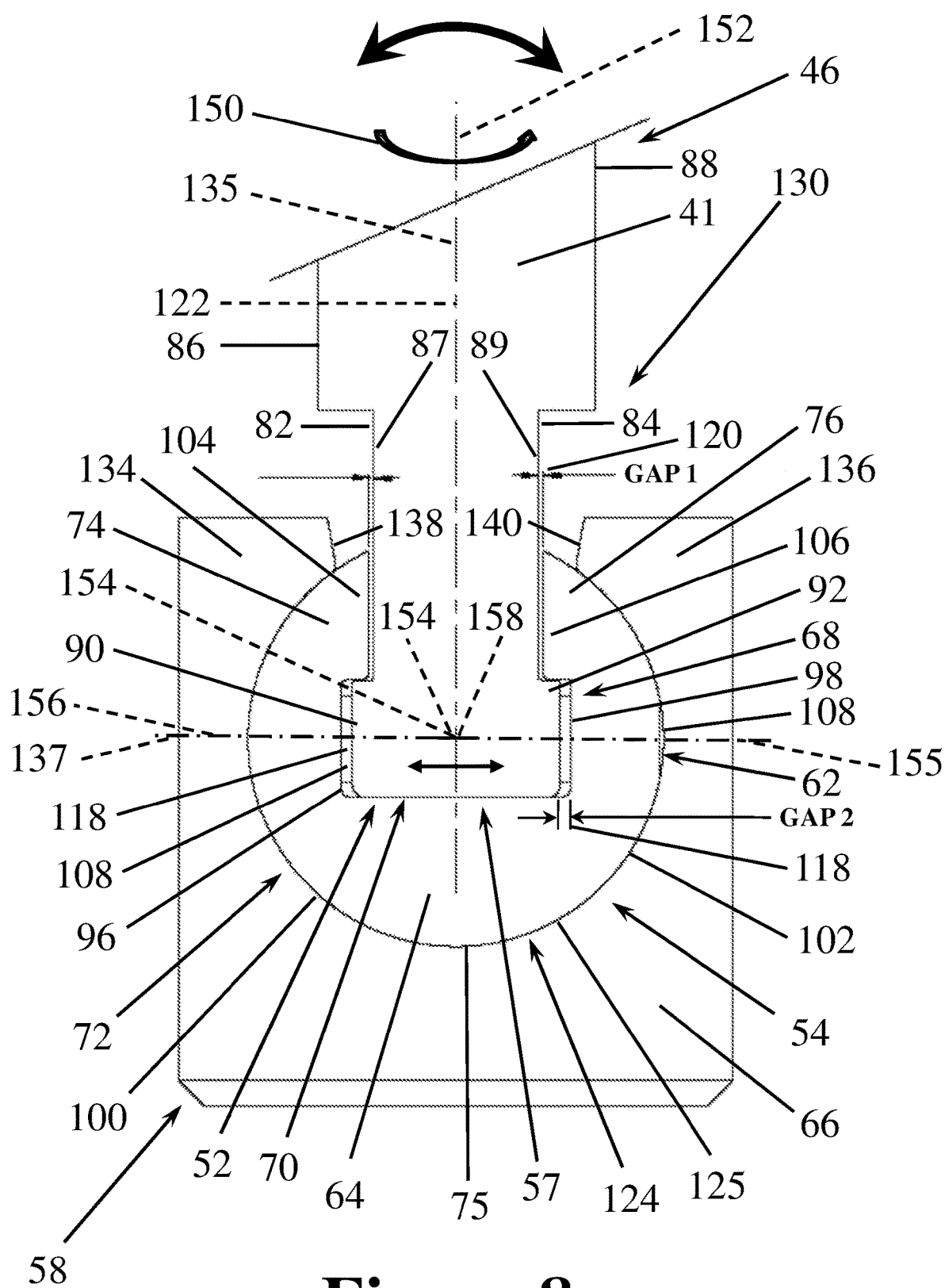
FIG. 8 is a fragmentary front elevation of the coupler ball adjustably mounted to a coupling head to form the core blade or lifter bar coupler assembly that is slidably, pivotable and rotatively received in the bearing raceway of the receiver of the core lifter base.

With additional reference to FIG. 8, the coupler receiver 56 preferably is, includes, is configured with, or is configured as an elongate generally straight core lifter bar guide shoe 66 integrally formed in the base 58 extending longitudinally along the base 58 that movably receives the core lifter bar coupling ball 64 thereby movably coupling the bar 46 and any core 48 carried by the bar 46 to the base 58 in a manner that slidably guides movement of the ball 64 and blade 41 of the bar 46 along the shoe 66 in a lengthwise direction relative to the base 58. In a preferred embodiment, the guide shoe 66 preferably is or includes an elongate longitudinally extending channel 124 formed in the base 58 that extends in a lengthwise direction of the base 58 along the base 58 and which has a cross-sectional-contour generally complementary to that of the coupling head 57 of the lifter bar 46. Where the coupling head 57 is or includes coupling ball 64, the guide shoe 66, including such an elongate longitudinally extending channel 124 of the shoe 66 formed in the base 58, preferably has a cross-sectional contour transverse to the direction of coupling ball translation relative to the base 58 that is substantially complementary to that of the coupling ball 64.

When the lifter bar coupling ball 64 is received in the core lifter bar guide shoe 66 in the manner depicted in FIGS. 1 and 8, the lifter bar 46 becomes movably coupled to the lifter base 58 enabling the ball 64 and blade 41 of the lifter bar 46 to translate preferably by sliding generally in a straight-line direction along the shoe 66 substantially along the length of the channel 124 of the shoe 66 while being slidably guided by the shoe 66 in a lengthwise direction relative to the base 58 in either direction along the shoe 66 during molding apparatus operation. As the coupled ball 64 translates generally in a straight line longitudinal or lengthwise direction relative to the base 58 during molding apparatus operation, so generally does the rest of the lifter bar 46, including the lifter bar blade 41 and core 48, because the bar 46 is operatively connected to the ball 64, such as in the manner depicted in FIG. 2, thereby enabling such movement, preferably via translation, of the bar 46 relative to the base 58, as well as relative to parts of the molding apparatus 42 to or in which the base 58 is fixed, during mold cycling during molding apparatus operation. To facilitate smooth and long lasting operation, the lifter bar coupling ball 64 preferably is made of a durable material that can be and preferably which also is reduced friction construction, such as a coupling ball 64 made of or from a round metal or metallic ball, e.g., a round or spherical steel ball bearing, of hardened construction. In a preferred embodiment, the lifter bar coupling ball 64 is made of or from a carbide ball with one such preferred coupling ball 64 being made of or from a round or spherical carbide ball bearing.

With specific reference to FIGS. 2-5, the lifter bar coupling ball 64 is disposed at an end of the blade 41 of the lifter bar 46 opposite the core 48 with the ball 64 slidably coupling with an elongate guide shoe 66 of the coupler receiver 56 formed in the base 58 enabling the ball 64 to at least translate or move in the guide shoe 66 relative to the base 58 in either direction along the base 58 along substantially the length of the guide shoe 66, including while being able to pivot, swivel, and/or rotate about at least one axis and preferably at least a plurality of axes relative to the base 58 (a) during self-adjustment, self-alignment, tolerance compensation, misalignment compensation, and/or misalignment adjustment of the core lifter 40 during assembly of the core lifter 40 and/or installation of the core lifter 40 in the molding apparatus 42, and (b) during cycling of the mold(s) of the molding apparatus 42 in which the core lifter 40 is installed during operation of the molding apparatus 42. As a result of the elongate substantially straight channel 124 of the guide shoe 66 having a generally transverse cross-section that is substantially complementary to or with a generally spherical shape of at least the portion of the coupling ball 64 that comes in contact with the channel 124, the coupling ball 64 and channel 124 of the shoe 66 forms a lifter bar guide arrangement along which the lifter bar 46 translates relative to the base 58 in a substantially straight line along the channel 124 and guide shoe 66 during core lifter self-adjustment, self-alignment, tolerance compensation, misalignment compensation, and/or misalignment adjustment in or along a fore-aft direction of the core lifter 40 in the longitudinal or lengthwise direction relative to the base 58.

The slidable movement of the guide ball 64 in the guide shoe 66 of a core lifter 40 of the present invention facilitates movement that preferably is self-aligning movement or self-adjusting movement of the lifter bar 46 relative to the guide shoe 66, relative to base 58, and relative to one or more parts of the molding apparatus 42 in a manner that advantageously prevents binding of the bar 46 or core 48 of the core lifter 40 with any part of the mold apparatus 42 during operation of the mold apparatus 42. Where the molding apparatus 42 is a plastic injection molding apparatus 45, slidable movement of the ball 64 in the channel 124 of the guide shoe 66 also facilitates movement of the blade 41 of the lifter bar 46 relative thereto, relative to base 58, and relative to one or more parts of the plastic injection molding apparatus 45 during mold closing, during injection molding of a plastic part 65 (FIGS. 12 and 13), and during mold opening, including during plastic part ejection during mold opening.

In the preferred core lifter embodiment shown in the drawing figures, the core lifter bar coupling ball 64 can be and preferably is attached to the coupling end 52 of the blade 41 of the lifter bar 46 by a ball coupling joint 47 formed between a three-dimensionally contoured coupling end 52 of the blade 41 and a three-dimensionally contoured lifter bar coupling end receiving socket 49 formed in the ball 64 that is configured to receive the three-dimensionally contoured coupling end 52. As discussed below in more detail, the coupling end 52 of the blade 41 of the lifter bar 46 and the coupling socket 49 formed in the ball 64 can form a ball coupling joint 47 where there is some play or tolerance compensation between the ball 64 and lifter bar coupling end 52 of the core lifter bar blade 41. In another preferred embodiment, the ball 64 is substantially immovably fixed to the end 52 of the blade 41 of the lifter bar 46 with the coupling joint 47 preferably configured in a manner that facilitates substantially immovable fixing of the ball 64 to the end 52 of the blade 41 of the bar 46.

Figure 4:
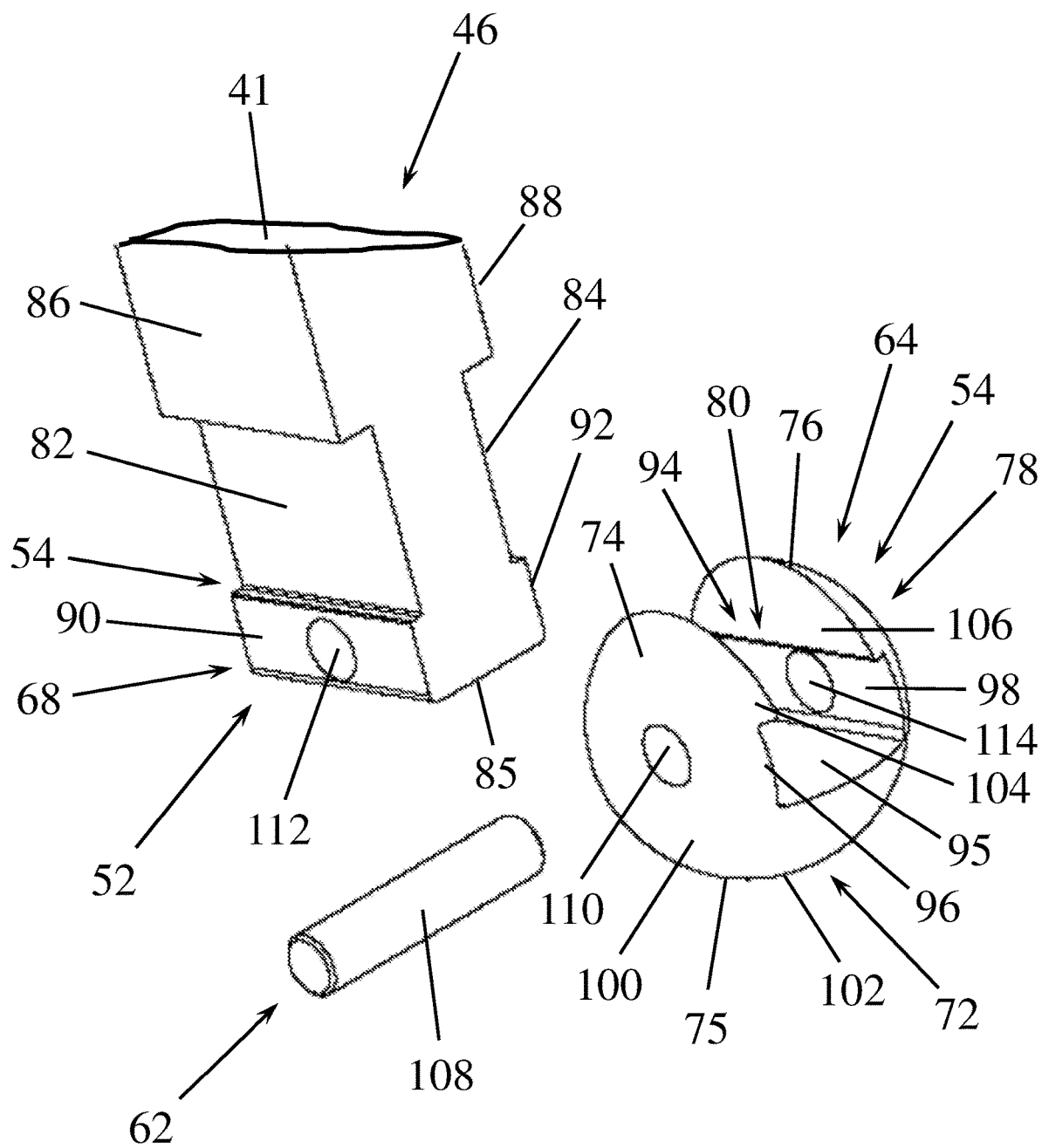
FIG. 4 is an enlarged fragmentary perspective view of the coupler assembly.
Figure 5:
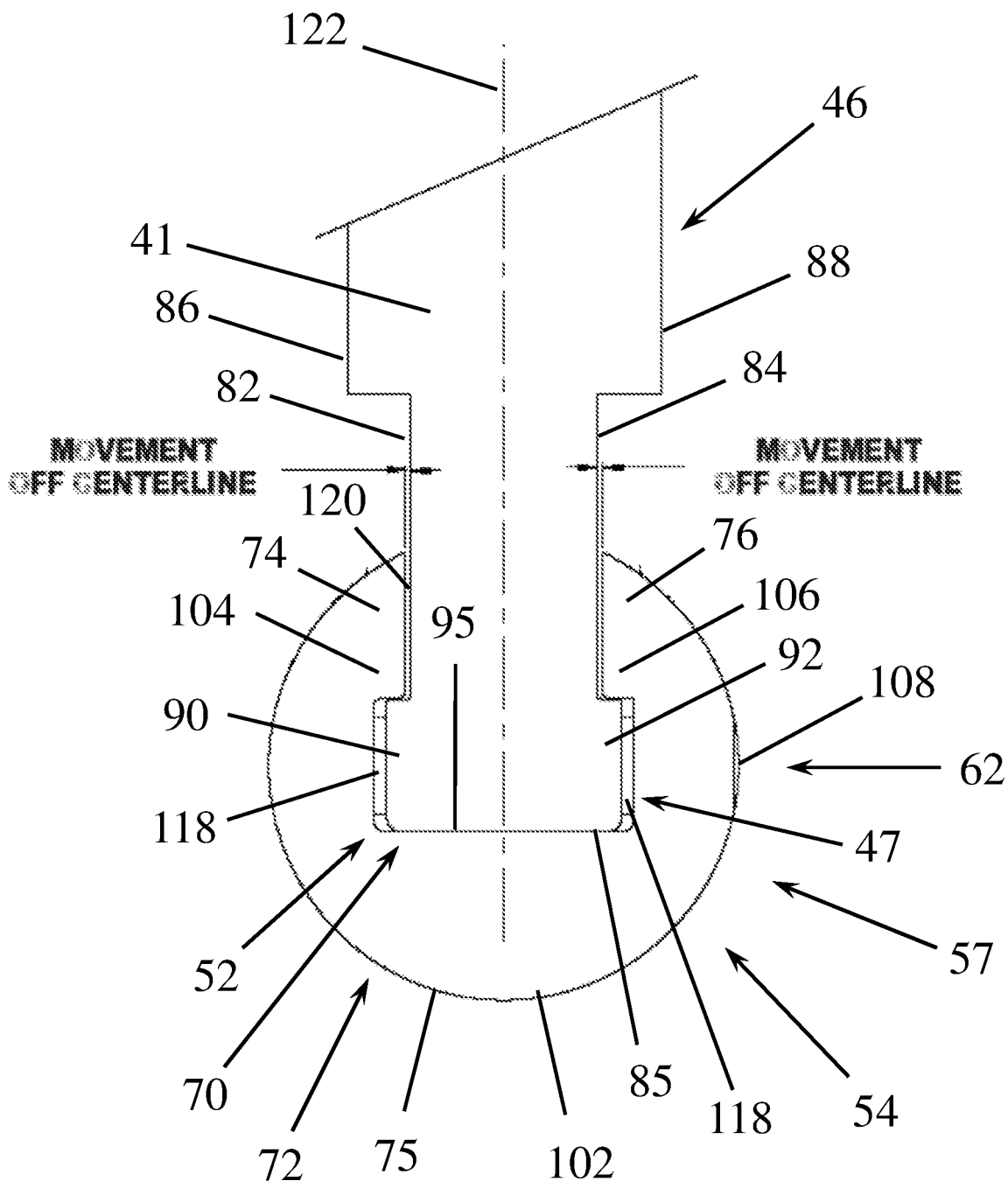
FIG. 5 is an enlarged perspective view of a coupler ball of the coupler assembly.

With continued reference to FIGS. 2-5, a retainer 62 can be used to help attach the coupling ball 64 to the end 52 of the blade 41 of the lifter bar 46, including when the ball 64 and lifter bar blade end 52 are configured to form a coupling joint 47 when engaged with one another in the manner depicted in FIG. 5. Where configured to help facilitate lifter bar and/or core alignment, adjustment or tolerance compensation, such a retainer 62 can be employed to help attach the ball 64 to the end 52 of the blade 41 of the bar 46 to form a tolerance-compensating coupling joint 47 but which preferably also is configured to enable or otherwise facilitate self-alignment, self-adjustment, tolerance compensation, misalignment compensation, and/or misalignment adjustment of the ball 64 relative to the coupling end 52 of the blade 41 thereby advantageously helping to facilitate self-alignment, self-adjustment, tolerance compensation, misalignment compensation, and/or misalignment adjustment of the lifter bar 46 and/or core 48 relative to the base 58 and/or some part of the molding apparatus 42 in which the core lifter 40 has been installed.

Such a coupling joint 47 formed between the ball 64 and coupling end 52 of the lifter bar blade 41 preferably is of releasable or detachable construction enabling detachment or disassembly of the ball 64 from the end 52 of the blade 41 enabling a worn ball 64 to be replaced with a new one, if desired. In the preferred embodiment depicted in FIGS. 2-5, a coupling joint 47 of releasable or detachable construction is formed with or using such a retainer 62 that is inserted into engagement with the ball 64 and coupling end 52 of the blade 41 to positively and securely attach the ball 64 to the blade 41 and which is a retainer 62 that is disengaged or otherwise removed from the ball 64 and coupling end 52 of the blade 41 to enable detachment of the ball 64. When detached, the ball 64 can be replaced with another ball 64, such as a new ball 64, one of a plurality of different types of balls having a plurality of different hardness's, outer surface contours, shapes, sizes and/or the like that is releasably and positively secured to the coupling end 52 of the blade 41 using the retainer 62.

Where the coupling joint 47 is a tolerance compensating joint formed between the ball 64 and coupling end 52 of the lifter bar blade 41, the ball 64 preferably is releasably or detachably mounted to the coupling end 52 of the blade 41 of the lifter bar 46 in a manner that also provides some play therebetween that allows or facilitates self-alignment, self-adjustment, tolerance compensation, misalignment compensation, and/or misalignment adjustment of the lifter bar 46 and/or core 48 relative to the base 58 and/or some part of the molding apparatus 42 in which the core lifter 40 has been installed, including during molding apparatus alignment. While it is contemplated that such a tolerance compensating joint 47 can be formed without the use of any retainer 62, the preferred embodiment of the joint 47 shown in FIGS. 2-5 employs a retainer 62 that preferably is of removable or detachable construction thereby also enabling removal and replacement of ball 64, if needed.

When the ball 64 is attached, coupled or otherwise mounted to the lifter bar blade 41 in forming such a tolerance compensating and releasable coupling joint 47, such as in the manner depicted in FIGS. 2-5, limited relative movement therebetween advantageously enables at least one of and preferably at least a plurality of angular adjustment and translation by permitting limited rotational and/or pivotable movement and/or limited translational movement between the ball 64 and lifter bar blade 41'. Such a tolerance compensating releasable coupling joint 47 that employs retainer 62 preferably is a tolerance compensating releasable coupling joint 47 that is configured to enable or otherwise facilitate alignment adjustment of the core 48 and bar 46 relative to the ball 64 and/or base 58 when the ball 64 is received in the guide shoe 66 of the base 58. In one such preferred embodiment, the joint 47 is configured to provide tolerance compensation by being configured to provide a very slight amount of play between the three-dimensionally contoured coupling end 52 of the lifter bar 46 and the socket 49 formed in the ball 64 because doing so advantageously facilitates self-alignment, self-adjustment, tolerance compensation, misalignment compensation, and/or misalignment adjustment of the lifter bar 46 and/or core 48 relative to the base 58 and/or some part of the molding apparatus 42 in which the core lifter 40 has been installed, including during molding apparatus operation.

Where a retainer 62 is employed, a preferred retainer 62 is an elongate generally cylindrical retainer pin 108 like that shown in FIG. 4 that extends through a pair of spaced apart arms 74, 76 of coupling socket 49 and through part of the lifter bar 46 at or adjacent the coupling end 52 of the bar 46 in the manner depicted in FIGS. 2 and 3. As shown in FIGS. 2-6 and 8, a preferred core lifter embodiment has the coupling ball 64 attached to the coupling end 52 of the blade 41 of the lifter bar 46 with such an elongate generally cylindrical retainer pin 108 in a manner that permits or allows some slight relative movement or play between the ball 64 and blade 41 of the bar 46, particularly at or adjacent the coupling end 52 of the blade 41 where the ball 64 is attached thereto. Where the ball 64 is attached at or to the coupling end 52 of the blade 41 of the bar 46 in a manner that permits some misalignment adjusting or tolerance compensating play, the ball 64 is attached, such as via retainer 62, preferably via retain pin 108, in a manner that can and preferably does permit some slight relative movement or play between the ball 64 and the blade 41 of the bar 46, particularly at or adjacent the end 52 of the blade 41 of the bar 46.

In another preferred embodiment, the coupling ball 64 is attached to the coupling end 52 of the blade 41 of the lifter bar 46 using a joint 47 of similar or substantially identical construction employing a method and arrangement of attachment that substantially immovably fixes the core lifter bar coupling ball 64 to the core lifter bar blade 41 in a manner that prevents relative movement between the ball 64 and blade 41 of the bar 46 during use and operation of such a core lifter 40, including during molding apparatus operation. In one such preferred embodiment, the coupling ball 64 is attached to the coupling end 52 of blade 41 with a retainer 62, such as a retainer pin 108, in a manner that substantially immovably fixes the ball 64 to the coupling end 52 of the blade 41 producing a lifter bar 46 having an immovably fixed lifter bar coupling ball 64 at the end of the bar 46 that movably couples with the base 58. In another such preferred embodiment, the ball 64 is affixed to the end 52 of the bar 46 in a manner that substantially immovably fixes the ball 64 to the bar 46. In another preferred embodiment, the coupling ball 64 and coupling end 52 of the lifter bar blade 41 are three dimensionally configured substantially as shown in FIGS. 2-6 and 8-9 but which lack or do not require any retainer 62 to produce such a joint 47 that substantially immovably mounts the ball 64 to the blade 41 of the lifter bar 46.

Even when the ball 64 substantially immovably mounted to the blade 41, such a joint of substantially immovable or fixed construction can be of a releasable or detachable configuration that enables the ball 64 to be detached or disengaged from the end 52 of the blade 41 of the lifter bar 46. In the preferred embodiment shown in the drawings where the joint 47 includes retainer 62, preferably retainer pin 108, removal of the retainer 62 preferably by removing the pin 108 from being engaged with the ball 64 and coupling end 52 of the core lifter bar blade 41 enables detachment or disengagement of the ball 64 from the blade 41.

Where the coupling ball 64 is attached at or to the end 52 of the lifter bar 46 in a manner that allows some relative movement therebetween, such as by being configured with some play therebetween, the ball 64 can be and preferably is attached by a retainer 62 to a lifter bar blade coupling head 68 formed at or in a free end, preferably the coupling end 52, of the blade 41 of the lifter bar 46 forming an alignment adjusting motion-limited lifter bearing knuckle joint 70 that can be and preferably is configured, e.g., dimensioned, so there is a limited amount of side-to-side play, preferably a predetermined amount of side-to-side play, movement off centerline (FIG. 6), GAP 1 or GAP 2 (FIG. 8) of at least 0.005 inches therebetween that facilitates alignment adjustment, e.g., automatic adjustment and/or self-alignment of the ball 64 relative to the lifter bar 46. The ball 64 and head 68 preferably are dimensioned to provide a predetermined amount of side-to-side play, movement off centerline, or GAP 1 of at least about 0.005 inches that enables side-to-side play or side-to-side alignment adjustment of ball 64 relative to head 68 (or vice versa). Depending on the size of the scalable core lifter 40, the ball 64 and head 68 of lifter bar blade 41 can be dimensioned and toleranced to produce a side-to-side play, movement off centerline, GAP 1 or GAP 2 of as much as 0.030 inches per side or a total of side-to-side play of 0.060 inches. In a preferred embodiment, such a core lifter 40 of the present invention is dimensioned and toleranced to have a side-to-side play, movement off centerline, GAP 1 of between 0.005 inch and 0.1 inch and preferably between about 0.005 inch and 0.060 inches.

By the ball 64 being mounted to the lifter bar blade coupling head 68 of the blade 41 of the lifter bar 46 in the manner depicted in FIG. 6, it allows the ball 64 to move side-to-side relative to the bar 46 independently of pivoting, rotation or swiveling as side-to-side adjustment permitted by such play occurs without changing the angle of pivot, swivel or rotation of the bar 46. Such side-to-side relative movement between the ball 64 and head 68 advantageously permits side-to-side adjustment of the bar 46 independent of swiveling, pivoting, or rotation of the bar 46 facilitating self-alignment and self-adjustment of the core lifter 40 during core lifter assembly, during core lifter installation into a molding apparatus 42, during core lifter use, and during molding apparatus operation.

With reference to FIGS. 4-6, the ball 64 is generally round and preferably substantially spherical with the coupling socket 49 formed of a lifter bar end receiving seat 80 recessed in the ball 64 that receives a free end of the lifter bar 46 that preferably is the coupling end 52 of the bar 46 during assembly of the bar 46 to the ball 64. As is best shown in FIG. 6, the lifter bar end receiving seat 80 preferably is formed of a channel 94 formed in the ball 64 between which is disposed a pair of spaced apart and generally parallel arms 74, 76 that bracket opposite sides of the portion of the coupling end 52 of the lifter bar 46 that is received in the channel 94 during assembly of the bar 46 to the ball 64.

Extending outwardly of the seat 80 and channel 94 and extending outwardly of or from the arms 74, 76 of the ball 64 is a rounded outer bearing cap 75 having a convexly rounded outer surface 100 that preferably is a generally round bearing surface 102 of the ball 64. When the ball 64 is received in the elongate longitudinally extending channel 124 of the core lifter bar guide shoe 66 of the receiver 56 when the lifter bar 46 is movably attached to the base 58, the rounded bearing surface 102 of the ball 64 movably, preferably slidably, bears against or contacts an internal bearing surface 125 that extends along the interior of the channel 124 of the shoe 66 of the receiver 56 formed in the base 58 substantially along the length of the channel 124 or shoe 66. In a preferred embodiment, the ball 64 preferably is a bearing, more preferably a substantially spherical ball bearing, which preferably is a hardened bearing, which more preferably is a carbide ball bearing, having a coupling socket 49 formed therein that is formed of a lifter bar end receiving seat 80 that is formed of a channel 94 defined between arms 74, 76.

Where the ball 64 is attached to the coupling end 52 of the lifter bar 46 in a manner that permits some relative movement therebetween, such as when the ball 64 and coupling end 52 are configured to have some play therebetween, the ball 64 can be and preferably is formed of a substantially round or substantially spherical ball bearing 72 with the coupling socket 49 formed of a recessed lifter bar end or lifter bar coupling head receiving seat 80 formed by a channel 94 formed through the bearing 72 or ball 64. As shown in FIG. 6, channel 94 is substantially straight and extends from and through one side of the bearing 72 or ball 64 to and through an opposite side of the bearing 72 or ball 64.

Where the ball 64 is attached to the coupling end 52 of the lifter bar 46 in a manner that permits some relative movement therebetween, a preferred ball 64 is formed of or from a generally U-shaped ball bearing 72 having an outer bearing cap 75 from which a pair of spaced apart and generally parallel hinge knuckle arms 74, 76 outwardly, preferably upwardly, extend defining a hinge knuckle yoke 78 with a recessed core lifter bar coupling head receiving seat 80 disposed between the knuckle arms 74, 76. Outer bearing cap 75 preferably is defined by a convexly rounded outer surface 100 that is a rounded outer bearing surface 102 that preferably is substantially smooth, preferably at least partially spherical, and which can be substantially spherical. As best shown in FIG. 5, this includes corresponding convexly rounded outer sides or side surfaces 77, 79 of knuckle arms 74, 76 of the ball 64 which are each at least partially spherical, preferably is substantially spherical, and preferably also substantially smooth. This also includes a convexly rounded bottom or bottom outer surface 103 of the ball 64 which also is at least partially spherical, preferably is substantially spherical, and preferably also substantially smooth.

When the ball-and-socket coupler 54 is received in the coupler receiver 56 of the core lifter base 58, the outer bearing surface 102 of the generally hemispherical outer bearing cap 75 of the U-shaped ball bearing 72 of the bar-coupling guide ball 64 of the lifter bearing knuckle joint 70 slidably rides along the receiver 56 in a manner that permits rotation, twisting, swiveling, and/or angular changes about at least a plurality of axes, preferably at least a plurality of pairs, i.e., at least three, of axes, and producing a core lifter 40 constructed in accordance with the present invention possessing at least a plurality of degrees of freedom, and preferably possessing at least a plurality of pairs, i.e., at least three, degrees of freedom that is substantially self-aligning.

When the ball 64 is received in the socket provided by receiver 56, the core lifter 40 can swivel 150, such as depicted in FIG. 8, about a swivel axis 152 of the core lifter bar 46 that extends longitudinally or lengthwise through the lifter bar 46 and a center 154, e.g., center point, of the ball 64 and which preferably also is substantially coincident with the longitudinal lifter bar axis 122. As is shown in FIG. 8, lifter bar blade swivel axis 152 extends longitudinally or lengthwise through the center or through a centerline of the blade 41 of the lifter bar 46 and through a point of the ball 64 that defines or is disposed at the center of the ball 64. In the preferred embodiment shown in FIG. 8, the center 154, e.g., center point, of the ball 64 is located in the channel 94 of the lifter bar receiving seat 80 of the lifter bar coupling socket 49 with the center 154 of the ball 64 being disposed in a portion of the lifter bar blade coupling end 52 or lifter bar blade coupling head 68 of the blade 41 of the lifter bar 46.

In a preferred embodiment, the center 154 of the ball 64 is the same as or substantially coincident with the geometric center or geometric center point, e.g., three-dimensional geometrical or three-dimensional center point, of the ball 64 if the ball 64 were a solid spherical ball, e.g., solid round ball or solid sphere. Such a center point or center 154 of the ball 64 is the location of the x, y, z point in or of the center of the ball 64 if the ball 64 was an uninterrupted round ball or uninterrupted sphere.

With continued reference to FIG. 8, the blade 41 and lifter bar 46 are oriented generally uprightly with the blade 41 of the bar 46 extending upwardly from the base 58 in a direction generally parallel to a vertical axis 135 of the base 58 that vertically bisects the base 58 and extends through the center 154 of the ball 64 generally perpendicular to a horizontal axis 137 of the base 58 that preferably bisects the channel 124 or bearing race 126 and extends through the center 154 of the ball 64 movably and rotatively captured in the channel 124 and bearing race 126. With the lifter bar 46, blade 41 and ball 64 oriented as shown in FIG. 9, the vertical axis 135 of the base 58 is substantially coincident with the longitudinal core lifter bar blade center axis 122 that also extends through the center 154 of ball 64.

The lifter bar blade coupling head 57 is disposed at or adjacent the coupling end 52 of the elongate and straight blade 41 of the lifter bar 46 that carries the ball 64 with the ball 57 preferably being coupled to the coupling head 57 at or adjacent the coupling end 52 of the bar 46, such as in the manner shown in FIGS. 2-6 and 8-9 and described in more detail elsewhere herein. As depicted in FIGS. 2-5 and 8-9 and discussed in more detail elsewhere herein, the coupling head 57 is a three-dimensionally contoured head disposed at or adjacent the coupling end 57 of the blade 41 of the lifter bar 46 that is configured for coupling with the ball 64 in a manner that securely and positively retains or mounts the ball 64 thereto.

Such a core lifter 40 constructed in accordance with the present invention can swivel 150 such that the blade 41 of the lifter bar 46 rotates about the swivel axis 152 extending through the bar 46 at least 10 degrees, preferably at least 20 degrees, and preferably between 20 degrees and 360 degrees. Because the ball 64 is round or spherical, the ball 64 preferably rotates substantially in unison with the blade 41 of the bar 46 about the swivel axis 152 when the bar 46 is swiveling relative to or about the longitudinal central base axis 135 and/or the longitudinal central lifter bar blade axis 122. In a preferred embodiment, core 48 and lifter bar 46 can swivel about the swivel axis 152 more than 360 degrees, e.g., can continuously swivel about the swivel axis 152. In a preferred embodiment for each of the above swivel angular extents, the blade 41 of the lifter bar 46 preferably rotates or spins about its central longitudinal axis 122 when swiveling about the swivel axis 152, such as when swiveling to self-align, automatically adjust, tolerance compensate, compensate for misalignment, and/or misalignment adjust during assembly of core lifter 40, during installation of core lifter 40 into molding apparatus 42, and/or during use and operation of the core lifter 40, including during mold cycling, part or component ejection, and/or the like during operation of molding apparatus 42. Where the blade 41 of the lifter bar 46 extends generally perpendicularly upwardly from the base 58 straight up from the base 58 in the manner depicted in FIG. 8, the swivel axis 152 preferably is substantially coincident with both the vertical central longitudinal base axis 135 and the central longitudinal lifter bar axis 122, such as is shown in FIG. 8.

With reference to FIGS. 5 and 8, the core lifter bar coupling head 68 is in the coupling end 52 of the lifter bar 46 that preferably is a generally I-formed shaped coupling head 68 with a pair of spaced apart transversely extending knuckle arm guide channels 82, 84 formed in opposite sides 86, 88 of the lifter bar 46 at or adjacent the coupling end 52 from which a respective coupling head guide rib 90, 92 extends outwardly at or adjacent the free end of the bar 46. With reference to FIGS. 4-8, the lifter bar blade coupling head receiving seat 80 formed in the ball 64 preferably is a generally transversely extending channel 94 of generally I-shaped cross-section having a pair of spaced apart, opposed and generally parallel guide slots 96, 98, each of which slidably receive and guide a corresponding rib 90, 92 of the lifter bar blade coupling head 68 during assembly of the lifter bearing knuckle joint 70. The seat 80 includes guide slots 96, 98, formed a distance below or radially inwardly of the outer surface 100 of the ball 64 which thereby also define a pair of opposed generally inturned coupler ball guide ribs 104, 106 slidably received in and guided by a corresponding one of the knuckle arm guide channels 82, 84 of the lifter bar blade coupling head 68 when coupling head ribs 90, 92 of the coupling head 68 are received in guide slots 96, 98 during assembly of the core lifter bearing knuckle joint 70.

With reference to FIGS. 1-6, the ball 64 engages and preferably covers the coupling head 68 of the lifter bar 46 and preferably fits like a cap over the coupling head 68 of the when the ball 64 is slid over the head 68 during assembly of the ball 64 to the coupling head 68 of the lifter bar 46 forming the core lifter bearing knuckle joint 70 with the outer bearing surface 102 of the portion of the ball 64 that defines the bearing cap 75 functioning as a bearing when the ball 64 is slidably disposed in the receiver 56 of the core lifter base 58. The coupling head 68 can and preferably does have an endwall 85 at its free end that overlies an endwall 95 of channel 94 formed in ball 64 and which can abut or stop against endwall 95 to limit relative motion between the ball 64 and head 68 when assembled together to form core lifter bearing knuckle joint 70. As depicted in FIGS. 3-6, lifter bar blade coupling head endwall 85 can be and preferably is generally flat or substantially planar and coupler ball channel endwall 95 can be and preferably also is generally flat or substantially planar.

If desired, the coupler ball 64 can be attached to the coupling head 68 of the blade 41 of the lifter bar 46 by a retainer 62 that can be and which preferably is a pin 108 that can be and which preferably is of elongate and generally cylindrical construction. In the preferred embodiment of a core lifter 40 of the present invention shown in the drawing figures, assembly of the core lifter bearing knuckle joint 70 preferably is completed by inserting the retainer 62, preferably pin 108, through a ball coupling retainer receiving bore 110 in one of the knuckle arms 74, through a ball coupling retainer receiving bore 112 in the coupling head 68, and through a ball coupling retainer receiving bore 114 in the other one of the knuckle arms 76 in the manner depicted in FIGS. 2-5 and 8-9 thereby forming knuckle joint 70 and coupling the ball 64 to the bar 46. Where the ball 64 is coupled by a retainer 64, such as retainer pin 108, to the coupling head 68 of the lifter bar 46 at the coupling end 57 of the bar 46, the ball coupling retainer receiving bores 110 and 114 of the ball 64 are through bores that are substantially coaxial with one another with one of the bores 110 extending completely through one arm 74 of the ball 64 and the other one of the bores 114 extending completely through the other arm 76 of the ball 64 as shown in FIG. 6. Where the ball 64 is coupled by a retainer 64, such as retainer pin 108, to the coupling head 68 of the lifter bar 46 at the coupling end 57 of the bar 46, the coaxial bores 110 and 114 can and preferably do extend through the ball 64 at or adjacent a centerline 155 of the ball 64 as depicted in FIG. 8 in a direction transverse or generally perpendicular to the longitudinal or lengthwise extent of the lifter bar 46 coupled thereto by retainer 64, e.g., by retainer pin 108. As disclosed in more detail elsewhere herein and depicted in FIGS. 8 and 9, except for the recessed seat 80, e.g., channel 94, of the coupling socket 49 formed in the ball 64, the ball 64 is round and preferably is substantially spherical.

Where the ball 64 is coupled by a retainer 64, such as retainer pin 108, to the coupling head 68 of the blade 41 of the lifter bar 46 at the coupling end 57 of the blade 41 of the bar 46, the ball coupling retainer receiving bore 112 of the lifter bar 46 can and preferably does extend through both guide ribs 90 and 92 of the coupling head 68 of the blade 41 of the lifter bar 46 at or adjacent the coupling end 57 of the blade 41 of the bar 46 in a direction generally transverse to the longitudinal or lengthwise direction of the bar 46, such as is shown in FIGS. 2-4, with the bore 112 preferably being generally centrally located in the middle of each rib 90, 92 of the bar 46. When the ball 64 is coupled to the head 68 of the blade 41 of the lifter bar 46 at the coupling end 57 thereof with the oppositely outwardly extending ribs 90 and 92 received in a corresponding one of the oppositely outwardly extending rib-receiving slots 96 and 98 formed in opposite sides of the channel 94 of the lifter bar blade coupling head receiving seat 80 formed in the ball 64 that defines the lifter bar coupling socket 49 of the ball 64, the ball 64 preferably is securely and positively coupled or attached to the lifter bar 46.

Where the ball 64 and bar 46 are coupled to one another, such as by or using a retainer 64, e.g., retainer pin 108, in a manner that permits some relative movement therebetween, such as by being configured with some play therebetween, the ball 64 is coupled with or attached to the coupling head 68 of the lifter bar 46 in a manner that permits some relative pivoting motion between the ball 64 and coupling head 68 of the bar 46 about a transverse pivot axis 156 generally transversely extending through the ball 64 in a direction that is (a) transverse or generally perpendicular to the bar 46 and the channel 124 or bearing race 126 of the guide shoe 66 of the receiver 56 in the base 58, (b) transverse or generally perpendicular to the longitudinal or lengthwise extent of the channel 124, bearing race 126, and base 58, and/or (c) transverse or generally perpendicular to the longitudinal or lengthwise extent of the lifter bar 46. Where the ball 64 is coupled to the lifter bar 46 by a retainer 64 that preferably is a retainer pin 108 in a manner that permits some relative movement therebetween, the pin 108 not only extends through at least part the ball 64 and the coupling head 68 of the blade 41 of the lifter bar 46 in a direction transverse or generally perpendicular to the longitudinal or lengthwise extent of the bar 46 in coupling the ball 64 to the bar 46, but the pin 108 (along with the coaxially aligned bores 110, 112 and 114 that receive the pin 108) can and preferably does define or function as the transverse pivot axis 156, such as depicted in FIGS. 8 and 9, about which the ball 46 can pivot at least slightly, preferably at least 1°, relative to the bar 46, its coupling end 57, and its coupling head 68, while the ball 64 is coupled to the bar 46, including during core lifter assembly, core lifter installation into a molding apparatus 42, during core lifter use, and during molding apparatus operation.

Where the ball 64 is coupled to the lifter bar 46 by a retainer 64 that preferably is a retainer pin 108 in a manner that permits some relative movement therebetween, the pin 108 extends through coaxial bores 110 and 114 in ball 64 and bore 112 in lifter bar 46 disposed between and coaxial with bores 110 and 114 in ball 64 while the outwardly extending ribs 90 and 92 of the coupling head 68 are respectively received in the rib-receiving slots 96 and 98 formed in the sides of the channel 94 of the coupling socket 49 in the ball 64 forming the hinge knuckle joint 70 between the ball 64 and head 68 of the blade 41 of the bar 46. The pin 108 (and coaxial bores 110, 112 and 114 that receive the pin 108) can and preferably does function as a pivot, i.e., the pin 108 is or defines the pivot, about which the ball 64 can pivot a limited amount relative to the head 68 of the bar 46 at or adjacent the coupling end 57 of the bar 46 in facilitating core lifter assembly, core lifter installation, core lifter use, core lifter operation and/or molding apparatus operation. In such a preferred embodiment, the pin 108 (and coaxial bores 110, 112 and/or 114 that receive the pin 108) can and preferably does define or extend along a transverse pivot axis 156 about which the ball 64 pivots or rotates relative to the head 68 of the bar 46 at or adjacent the coupling end 57 of the bar 46 in helping to provide tolerance compensation and/or alignment or misalignment adjustment during core lifter assembly, installation of core lifter 40 into a molding apparatus 42, and/or use of the core lifter 42 including during mold cycling during plastics injection molding operation of the molding apparatus 42. In at least one such embodiment, such as depicted in FIGS. 8 and 9, the pin 108 (and coaxial bores 110, 112 and/or 114 that receive the pin 108) can and preferably does define or extend along a transverse pivot axis 156 that also extends through the center 154 and/or transverse centerline 155 of the ball 64 in a direction transverse to the longitudinal or lengthwise direction of the bar 46 and which also is generally transverse to the channel 124 and bearing race 126 during normal use and operation of the core lifter 40 during normal use and operation of the molding apparatus 42. Where the pin 108 of such a core lifter embodiment defines the generally horizontally extending pivot axis 156 extending through the center 154 and/or along the transverse centerline 155 of the ball 64 transverse to the lifter bar 46 and base 58, the pin 108 defines the pivot about which the ball 64 can and preferably is able to pivot at least a limited amount relative to the head 68 of the blade 41 of the bar 46 during core lifter installation, core lifter use, and/or molding apparatus operation.

In one such preferred core lifter embodiment, the ball 64 is coupled to the lifter bar 46 by a retainer 64 that preferably is a retainer pin 108 in a manner that permits some relative movement therebetween, the ball 64 and coupling head 68 of the blade 41 of the bar 46 are configured to permit at least 1° of relative pivoting or relative pivotable movement between the ball 64 and head 68 of blade 41 of bar 46, e.g., permit the ball 64 to pivot or rotate 1° or ±0.5° about the head 68 of the lifter bar blade 41, but no more than 5°. In another such preferred embodiment, the ball 64 is coupled to the lifter bar 46 by a retainer 64 that preferably is a retainer pin 108 in a manner that permits some relative movement therebetween, the ball 64 and coupling head 68 of the blade 41 are configured to permit at least 0.5° of relative pivoting or relative pivotable movement between the ball 64 and head 68 of blade 41, e.g., permit the ball 64 to pivot or rotate at least 0.5° or at least ±0.25° about the transverse pivot axis 156 relative to the head 68 of the blade 41, but allows no more than 1°, e.g., no more than ±0.5°, relative pivoting or relative pivotable movement therebetween. In still another such preferred embodiment, the ball 64 is coupled to the lifter bar 46 by a retainer 64 that preferably is a retainer pin 108 in a manner that permits some relative movement therebetween, the ball 64 and coupling head 68 of the blade 41 are configured to permit at least 1° of relative pivoting or relative pivotable movement between the ball 64 and head 68 of blade 41, e.g., permit the ball 64 to pivot or rotate at least 1° or at least ±0.5° about the transverse pivot axis 156 relative to the head 68 of the blade 41, but allows no more than 2°, e.g., no more than ±1°, relative pivoting or relative pivotable movement therebetween. In yet another such preferred embodiment, the ball 64 is coupled to the lifter bar 46 by a retainer 64 that preferably is a retainer pin 108 in a manner that permits some relative movement therebetween, the ball 64 and coupling head 68 of the blade 41 are configured to permit at least 1° of relative pivoting or relative pivotable movement between the ball 64 and head 68 of lifter bar blade 41, e.g., permit the ball 64 to pivot or rotate at least 1° or at least ±0.5° about the transverse pivot axis 156 relative to the head 68 of the blade 41 of the bar 46, but allows no more than 3°, e.g., no more than ±1.5°, relative pivoting or relative pivotable movement therebetween. In a further such preferred embodiment, the ball 64 is coupled to the blade 41 of the lifter bar 46 by a retainer 64 that preferably is a retainer pin 108 in a manner that permits some relative movement therebetween, the ball 64 and coupling head 68 of the blade 41 of the bar 46 are configured to permit at least 1° of relative pivoting or relative pivotable movement between the ball 64 and head 68 of the blade 41 of the bar 46, e.g., permit the ball 64 to pivot or rotate at least 1° or at least ±0.5° about the transverse pivot axis 156 relative to the head 68 of the blade 41 of the bar 46, but allows no more than 5°, e.g., no more than ±2.5°, relative pivoting or relative pivotable movement therebetween.

To facilitate enabling at least some relative pivoting or rotation between the ball 64 and lifter bar blade coupling head 68, the head 68 and the ball 64 preferably are configured so that there is a space or gap between the lifter bar blade coupling head endwall 85 and coupler ball receiver channel endwall 95 as best depicted in FIG. 11. Where it is desired to increase the angular range that the ball 64 can rotate relative to the head 68 about axis 156, the spacing or distance between the lifter bar coupling head endwall 85 and lift bar blade coupling head receiving channel endwall 95 can be increased, or the head endwall 85 and channel endwall 95 can be substantially complementarily curved, e.g. have an arcuate-shape, relative to one another, if desired. In at least one preferred embodiment, the endwall 85 of the coupling head 68 formed at or adjacent the coupling end 57 of the blade 41 of the lifter bar 46 is curved and the endwall 95 of the channel 94 of the lifter bar blade head coupling socket 49 formed in the ball 64 also is curved, with the curved lifter bar coupling head endwall 85 and curved lift bar coupling head receiving channel endwall 95 being complementarily curved to facilitate relative rotation or pivoting between the lifter bar blade coupling head 68 and ball 64 pivotably coupled to the head 68.

Where configured to permit limited relative rotation therebetween, such a core lifter coupling ball 64 and lifter bar blade coupling head 68 are configured so their respective endwalls 85, 95 permit no greater than a 5 degree relative angular rotation therebetween, e.g., a 5 degree angular rotation range, about axis 156, preferably no greater than 2.5 degrees relative angular rotation therebetween, e.g., a 2.5 degree angular rotation range, about axis 156, and more preferably no greater than about a 1 degree relative angular rotation therebetween, e.g., a 1 degree angular rotation range, about axis 156. Where configured to permit such limited angular rotation between the ball 64 and lifter bar blade coupling head 68 about axis 156, such a core lifter bearing knuckle joint 70 configured to permit such relative angular or pivoting adjustment of the ball 64 and lifter bar blade coupling head 68 of such a core lifter 40 of the present invention advantageously helps facilitate self-alignment of the core lifter 40 during assembly of the ball 64 to the coupling head 68, installation of the core lifter 40 to the molding apparatus 62, as well as during core lifter use and molding apparatus operation.

Where it is desired to limit the amount of rotational play between the ball 64 and lifter bar blade coupling head 68, e.g. limit or prevent relative rotation therebetween, the ball 64 and head 68 can be configured so that the head endwall 85 and channel endwall 95 abut or stop against one another when the pin 108 is inserted attaching the ball 64 to the head 68. Where there is very little rotational play or even substantially no play, with the exception of side-to-side play therebetween discussed elsewhere herein, the lifter bar 46 and ball 68 preferably rotate, swivel, and move substantially in unison therewith during installation into molding apparatus 62, and/or during molding apparatus operation.

With reference to FIGS. 4-8, lifter bar blade coupling head 68 and core lifter ball 64 can be and preferably are configured with side-to-side spacing or a gap therebetween when coupled together that permits side-to-side relative movement therebetween when coupled together by permitting the ball 64 to move relative to head 68 a limited amount in a direction transverse to the longitudinal or lengthwise direction of the blade 41 of the lifter bar 46 advantageously helping facilitate automatic core lifter adjustment and/or core self-alignment, including during assembly, installation, and/or molding apparatus operation. Such a core lifter 40 constructed with a lifter bar coupling head 68 and ball 64 that couple together with a knuckle joint 70 configured to permit side-to-side relative movement between the ball 64 and head 68, preferably is constructed or configured with or to provide (a) a side-to-side spacing or gap 118 between the ribs 90, 92 of the lifter bar blade coupling head 68 and walls 97, 99 (FIG. 6) of the respective rib-receiving slots 96, 98 of the lifter bar blade coupling head-receiving channel 94 of the lifter bar blade coupling head socket 49 formed in the ball 64 and/or (b) a side-to-side spacing or gap 120 between the ribs 104, 106 that extend outwardly from the channel 94 formed in the ball 64 and the walls 87, 89 of respective rib-seating channels 82, 84 of head 68 as best depicted in FIG. 8 in order to enable the ball 64 to transversely float on the coupling head 68 of the lifter bar blade 41 when the ball 64 is coupled thereto by enabling side-to-side relative movement between the ball 64 and head 68 in a direction transverse to the longitudinal or lengthwise direction of the blade 41 or bar 46. When the ball 64 is received in the channel 124 and bearing race 126 formed in the base 58 thereby substantially constraining or preventing sideways, side-to-side or transverse movement of the ball 64 within the channel 124 and race 126 relative to the base 58, the construction of such a tolerance or misalignment compensating coupling joint 70 advantageously permits at least the head 68 of the lifter bar 46 and preferably also at least part of the elongate blade 41 of the bar 46 that extends outwardly from the head 68, to move relative to the ball 64 at least slightly in a side-to-side or sideways in direction that is generally transverse to the longitudinal core lifter bar blade centerline or core lifter bar central longitudinal axis 122. When the core lifter bar coupling and guide ball 64 is received in the guide shoe 66 of the coupler receiver 56 of the core lifter base 58, the play or tolerance(s) between the ball 46 and head 68 of the blade 41 from such a coupling joint 70 of tolerance and/or misalignment compensating construction produces such gaps 118 and/or 120 extending in a transverse direction between the ball 64 and lifter bar blade coupling head 68, such as depicted in FIG. 8, thereby advantageously providing a limited amount of side-to-side, sideways or transverse core lifter self-alignment, tolerance compensation, and misalignment adjustment by enabling the lifter bar blade 41 to transversely move relative to the ball 64 a limited amount relative to the central longitudinal lifter bar blade axis 122. During such transverse self-aligning, tolerance compensating and/or misalignment adjustment, the head 68 of the lifter bar blade 41 slidably rides along pin 108, which serves as a transverse self-aligning, tolerance compensating and/or misalignment adjustment guide that guides or constrains side-to-side or sideways movement of the head 68 relative to the ball 68 and core lifter base 58 in a direction generally transverse to the longitudinally extending lifter bar blade center axis 122.

FIGS. 2, 7 and 8 illustrate the core lifter base 58 and the guide shoe 66 of the lifter bar coupler receiver 56 of the base 58 in more detail that receives the bar-coupling and guide ball 64 of the ball-and-socket coupler 54 at the end of the blade 41 of the lifter bar 46 in an elongate recessed channel 124 of the guide shoe 66 of the receiver 56 formed in the body 61 of the base 58 that defines a generally U-shaped bearing race 126. With continued reference to FIGS. 2 and 7, the channel 124 or bearing race 126 has a rounded, preferably generally circular internal cross-section taken transverse to the longitudinal direction of the base 58 with the channel 124 or bearing race 126 having (a) an open mouth 128 at one end 67 of the base 58 through which the ball 64 is slidably inserted during assembly of the ball 64 and lifter bar 46 to the base 58, and (b) an elongate lifter bar guide slot 130 extending longitudinally along a top surface 63 of the body 61 of the base 58 that communicates with the channel 124 or bearing race 126 through which the lifter bar 46 extends and along which the blade 41 or bar 46 can be slidably guided when the ball 54 is received in the channel 124 or bearing race 126. As best shown in FIG. 7, bearing race 126 has (a) a concavely curved bottom or bottom surface that is at least partially spherical and preferably substantially spherical in contour, and a pair of opposed concavely curved sides or sidewalls that are each at least partially spherical and preferably substantially spherical in contour forming bearing race 126 complementary in shape or contour with that of the ball 64. If desired, the channel 124 or bearing race 126 can have an open mouth 128, 132 at both or opposite ends 67, 69 of the base 58 providing a ball-insertion entryway at either end of the channel 124 or bearing race 126 as depicted in FIG. 7.

As best shown in FIG. 7, the bearing race 126 and/or channel 124 preferably extends longitudinally or in a lengthwise direction relative to the base 58 substantially the length of the base 58 and the lifter bar or blade guide slot 130 preferably also extends longitudinally or in a lengthwise direction relative to the base 58 substantially the length of the base 58. In the preferred core lifter embodiment shown in the drawings, the channel 124 and/or bearing race 126 extends the entire length of the body 61 of the base 58, the lifter bar or blade guide slot 130 also extends the full length of the body 61 of the base 58, and the channel 124 and/or bearing race 126 has a lift bar coupling ball receiving mouth 128 and 132 at each end of the body 61 of the base 58. Such a channel 124, bearing race 126 and guide slot 130 construction advantageously enables the ball 64 and blade 41 of lifter bar 46 to translate in a longitudinal or lengthwise direction, e.g., fore-aft direction, along the base 58 during insertion of the ball 64 into the channel 124 or bearing race 126 during assembly of the lifter bar 46 to the base 58, during installation of an assembled core lifter 40 to the molding apparatus 42, as well as during use and operation of the assembled core lifter 40 during operation of the molding apparatus 42.

With continued reference to FIGS. 2, 7, and 8, the guide slot 130 is elongate, substantially straight, and extends between a pair of oppositely inwardly extending lifter bar guide arms 134, 136 each of which extend inwardly from a respective one of the sides 71, 73 of the base 58. As best shown in FIGS. 7-9, each one of the lifter bar blade guide arms 134, 136 has a respective elongate, generally straight, and substantially flat lifter bar blade guide bearing flat 138, 140 along which a respective side 87, 89 of a corresponding guide channel 82, 84 of the blade 41 of the lifter bar 46 can slidably ride during assembly, installation, self-alignment, core lifter use, and molding apparatus operation.

The core lifter bar blade guide arms 134, 136 extend toward one another but preferably are spaced apart from one another defining a lifter bar blade guide slot 130 therebetween that extends along respective upper portions of a lifter bar coupling ball receiving and guiding bearing race 126 having a generally circular transverse cross-section extending greater than 180 degrees, preferably greater than 285 degrees, and more preferably greater than about 300 degrees around the core lifter bar coupling ball 64 received therein, permitting the lifter bar coupling ball 64 to rotate in the bearing race 126 relative to the base 58 as well as translate or move along the bearing race 126 and the base 58 with the opposed lifter bar blade guide arms 134, 136 interfering with removal of the ball 64 outwardly through the guide slot 130 thereby preventing disengagement of the lifter bar 46 from the base 58. In the preferred core lifter embodiment shown in the drawings, the core lifter bar blade guide arms 134, 136 are spaced apart by the guide slot 130 and extend along respective upper portions of such a bearing race 126 that has a generally transverse circular cross-section that extends at least 235 degrees, at least 285 degrees, and at least 300 degrees around the ball 64 received in the bearing race 126 while permitting the ball 64 to rotate within the bearing race 126 while enabling the ball 64 the move along the bearing race 126. Preferably, the core lifter bar guide arms 134, 136 are spaced apart by the guide slot 130 extend alongside such a bearing race 126 having a generally transverse circular cross-section that extends at least 235 degrees, at least 285 degrees, and at least 300 degrees around the ball 64 received in the bearing race 126 and about a longitudinal centerline 158 of the race 126 that extends through the center point 154 of the ball 64 while permitting the ball 64 to rotate within the bearing race 126 while also substantially simultaneously enabling the ball 64 the move along the bearing race 126 with the arms 134, 136 interfering with the ball 64 being pulled out the guide slot 130.

As discussed in more detail below, longitudinal centerline 158 extends through the center point 154 of the core lifter bar coupling ball 64 also defining a longitudinal axis 158 of rotation of the ball 64 about the center point 154 and rotational axis 158 in a side-to-side direction transverse or generally perpendicular to the longitudinal or lengthwise direction of the base 58. As such, it should be readily apparent from FIGS. 1, 2, and 7-11, since the blade 41 is coupled to the ball 64 received in the bearing race 126 thereby coupling the lifter bar 46 to the base 58, the blade 41 and bar 46 pivots or otherwise moves side-to-side relative to the base 58 substantially in unison with side-to-side pivoting of the ball 64 about axis 156 within the bearing race 126 and translates in a fore-aft direction relative to the base 58 substantially in unison with fore-aft translation of the ball 64 along the bearing race 126. In addition, the ball 64 can pivot about axis 156 and translate substantially simultaneously within the bearing race 126 in a fore-aft longitudinal or lengthwise direction relative to the base 58 with the blade 41 and bar 46 also substantially simultaneously pivoting or moving side-to-side relative to the base 58 while substantially simultaneously translating in the fore-aft direction relative to the base 58 substantially simultaneous with the side-to-side pivoting and fore-aft movement of the ball 64 within or along the bearing race 126.

Figure 10:
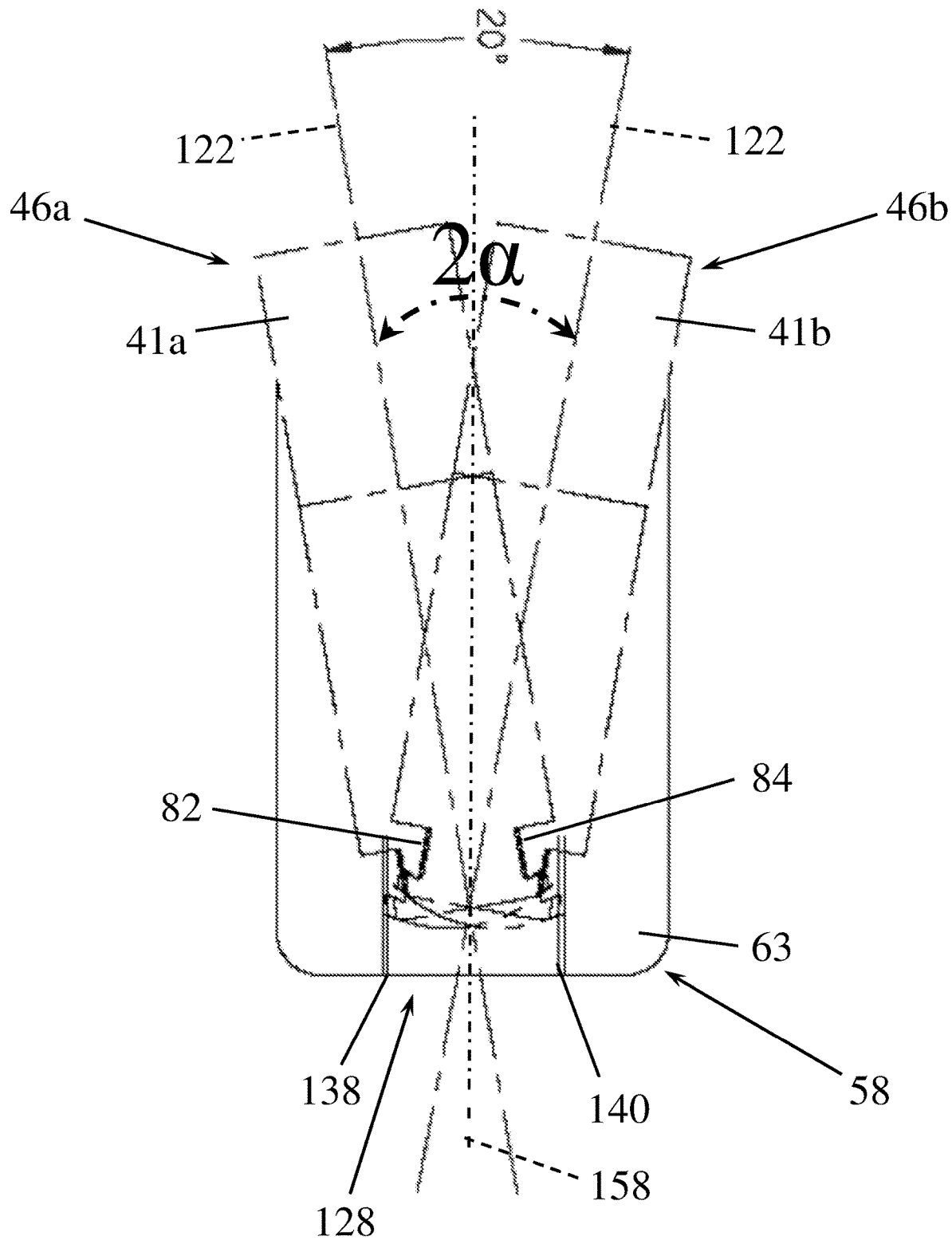
FIG. 10 is a top plan view of the core lifter assembly of FIG. 9 depicting side-to-side angular adjustment or self-alignment of angular range of up to ±10 degrees about the first axis extending along a longitudinal centerline of the bearing raceway that also extends through a center of the ball of the coupler assembly.

With reference to FIGS. 8-10, if desired, the space between the opposed lifter bar blade guide bearing flats 138 and 140 can be greater than the width of the blade 41 of the lifter bar 46 and/or wider than the space between opposed lifter bar blade sidewalls 86 and 88, but is no greater than three times lifter bar blade width, and preferably is no greater than two times lifter bar blade width, enabling the ball 64 to pivot in a side-to-side, sideways or transverse direction relative to the base 58 about the elongate longitudinally extending center axis 158 of the bearing race 126 an angular extent, α, of no greater than ±15° in either direction relative to the axis 158 before one of the lifter bar blade guide channel walls 87 and/or 89 and/or shoulders 81 and/or 83 abuts or stops against a respective adjacent one of the lifter bar blade guide bearing flats 138 and 140, such as in the manner depicted in FIG. 9. The space between the guide bearing flats 138 and 140 of the preferred core lifter embodiment shown in FIGS. 9 and 10 is greater than the width of the core blade or lifter bar 46 between the walls 87, 89 of the respective knuckle arm guide channels 82 and 84 and which can be and preferably is less than the width between the sidewalls 86 and 88 of the core blade or lifter bar 46 with one of the guide channel walls 87, 89 abutting or stopping against part of a respective adjacent one of the bearing flats 138 and/or 140 allowing an angular extent, α, of side-to-side, sideway or transverse pivoting or rotation of the blade 41 and ball 64 of the lifter bar 46 about longitudinal ball and bearing race center axis 158 of at least ±5° relative to the vertical central longitudinal base axis 135 and preferably no greater than about ±10° relative to the vertical central longitudinal base axis 135 as shown in FIG. 9. This arrangement permits side-to-side, sideways or transverse pivoting of the blade 41 of the lifter bar 46 about the longitudinal ball and bearing race center axis 158 forming an acute angular extent, α, between the vertical central longitudinal base axis 135 and the central longitudinal lifter bar blade axis 122 that can range between 0° and ±25° but which preferably can range or extend from axis 135 at least ±5° and preferably at least about ±10°, e.g., ±10°±2.5°.

In the preferred core lifter embodiment shown in FIGS. 9 and 10, the base 58, core lifter bar blade 41 and core lifter bar coupling ball 64 are configured to produce a core lifter 40 where the blade 41 pivots or rotates about side-to-side lifter bar pivot axis 158 an angular extent, α, of ±10° or a total angular extent of 20°. The lifter bar 46 is shown in FIG. 10 with the lifter bar 46a located in a first maximum outermost angular position when the blade 41a of the bar 46a is pivoted or rotated about axis 158 in one sideways or transverse direction and with the lifter bar 46b located in a second maximum outermost angular position when the blade 41b of the bar 46b is pivoted or rotated about axis 158 in an opposite sideways or transverse direction depicting a maximum angular extent, α, of about 20° about which the blade 41 of the bar 46 can pivot or rotate about axis 158. As previously discussed, side-to-side pivoting or rotation of the ball 64, blade 41 and bar 46 about axis 158 is limited by the lifter bar blade guide bearing flats 138 and 140, which respectively serve as hard stops against which a respective portion of the blade 41 abuts or contacts when reaching the maximum angular travel position in either direction.

With reference to FIGS. 7-11, the lifter bar blade guide bearing flats 138 and 140 also serve as a fore-aft lifter bar blade movement guide that can help guide the blade 41 and preferably the entire lifter bar 46 during fore-aft movement of the blade 41 and bar 46 along the guide slot 130 during fore-aft translation of the ball 64 along the channel 124 or bearing race 126 within the base 58 in a longitudinal or lengthwise direction relative to the base 58, including during lifter bar assembly to the base 58, during lifter bar self-adjustment relative to the molding apparatus 42 during core lifter installation, during core lifter use, and/or during mold cycling during molding apparatus operation. As depicted by FIGS. 8 and 9, the lifter bar blade guide bearing flats 138 and 140 also serve as lifter bar blade pivot abutments 145 and 147 against which a respective side or wall of the blade 41 of the lifter bar 46 abuts or stops when the ball 64 is pivoted in a side-to-side direction within the channel 124 or bearing race 126 toward one of the flats 138 or 140 about its longitudinal rotational axis 156.

As is best shown in FIG. 9, each one of the flats 138 and 140 are outwardly canted away from one another forming or defining an acute included angle therebetween with each one of the flats 138 and 140 thereby being outwardly beveled so as to prevent binding of the blade 41 of lifter bar 46 sliding along a respective one of the flats 138 or 140 by reducing static and dynamic friction therebetween. When the blade 41 of the lifter bar 46 is pivoted in a fore-aft direction about fore-aft pivot axis 156 (FIGS. 9 and 11), at least one of the stops 91 and/or 93 of corresponding shoulders 81 and 83 defined by guide channels 82 and 84 of the lifter bar blade coupling head 68 abuts or stops against at least a respective one of the stops 145 and/or 147 provided or defined by the lifter bar blade guide bearing flats 138 and/or 140 preventing the blade 41 and ball 64 from the lifter bar 46 from further pivoting or rotation. Such outwardly canted or outwardly beveled flats 138 and 140 also help provide or define a more positive fore-aft pivoting directional stop 145 and 147 when the stops 91 and 93 defined by lifter bar blade guide channel shoulders 81 and 83 abut or bear against respective flats 138 and 140 by providing a greater surface area of contact between the respective pairs of mating stops 91, 145 and 93, 147.

When the blade 41 of the lifter bar 46 is pivoted about the transverse fore-aft pivot axis 156, the blade 41 preferably rotates or pivots about the fore-aft lifter bar blade pivot axis 156 that extends generally horizontally and transversely through the ball 64 and the base 58 in a fore-aft direction such as depicted in FIG. 11. With continued reference to FIG. 11, the blade 41 of the lifter bar 46 of a core lifter 40 of the present invention can rotate or pivot about the fore-aft pivot axis 156 such that the angle, β, between the central longitudinal base axis 135 and the central longitudinal lifter bar blade axis 122 is no greater than 45°, preferably ±22.5° in the fore-aft direction forwardly or rearwardly of the central longitudinal base axis 135. Whether pivoted in the fore-aft direction forwardly or rearwardly about the fore-aft pivot axis 156, at least one of the recessed guide-channel forming shoulders 81 and 83 defined by guide channels 82 and 84 formed in the sides 86 and 88 of the blade 41 of the lifter bar 46 function as or define fore-aft pivot or rotation stops 91 and 93 that limit the angular extent, β, of pivoting or rotation of the blade 41 and ball 64 about the fore-aft pivot axis 156 in the manner depicted in FIG. 11.

In the preferred embodiment shown in FIG. 11, the lifter bar 46, including its ball 64 and blade 41, can pivot or rotate forwardly in the fore-aft direction relative to the central longitudinal base axis 135 such that the central longitudinal lifter bar blade axis 122° forms an acute included angle, β, therebetween of at least 5°, preferably at least 10°, and which can be as large as 20° as illustrated in FIG. 11. Although not shown in FIG. 11, the lifter bar 46, including its ball 64 and blade 41, can pivot or rotate rearwardly in the fore-aft direction relative to the central longitudinal base axis 135 such that the central longitudinal lifter bar blade axis 122° forms an acute included angle, β, therebetween of at least 5°, preferably at least 10°, and preferably which is at least about 20°. In one preferred core lifter embodiment, β, has a range of at least ±10° in the fore-aft direction depicted by arrow 105 in FIG. 11. In another preferred embodiment, β, has a range of at least ±15° in the fore-aft direction depicted by arrow 105 in FIG. 11. In still another preferred embodiment, β, has a range of at least about ±20°, e.g., ±20° ±5°.

With reference to FIGS. 8, 9, 11, and 12, the angle that the blades 41 of both core lifters 40 are forwardly angled toward one another is the release angle of the respective core lifters 40. Angle, β, is shown in FIG. 11 is a variable release angle, β, of the core lifter 40 of the invention depicting that the ordinarily fixed release angle the blade 41 of the lifter 40 extends forwardly relative to the lifter base is variably self-adjusting to accommodate misalignment(s) which can occur during opening and closing of mold halves 166, 168 and/or reciprocation of ejector plate assembly 60 during release of molded part 65 from lifter 40 and/or ejection of molded part 65 from the mold cavity 162. With reference to FIGS. 8, 9, 11, and 12, the blade 41 of each lifter 40 is forwardly angled in the direction of the longitudinal channel or bearing race centerline 158, which in turn is generally perpendicular to the transverse pivot axis 156 of the coupling ball 64 received in the channel 124 or bearing race 126 in the lifter base 58. With reference to FIGS. 8-12, variably adjustable lifter blade side angle, α, is an angle that is generally orthogonal or generally perpendicular to the variably adjustable release angle, β, and represents an angular range that lifter blade 41 can variably adjust toward one side or the opposite side as best depicted in FIGS. 9 & 10 during reciprocation of the lifter 40 during opening and closing of the mold halves 166, 168 during cycling of mold 164.

The substantially spherical outer profile of the ball 64 enables the lifter bar 46 of the core lifter 40 of the present invention to pivot about the fore-aft axis 156 extending longitudinally relative to the base 58 through the center point 154 pivot or pin 108 at least 10 degrees, preferably at least 15 degrees and more preferably at least 20 degrees in the release direction, e.g., in or along the direction of the bearing race 126. Where lacking a pin 108, the fore-aft axis extends through a center of the ball 64 generally perpendicular to the lengthwise extent of the lifter bar 46 and along a lengthwise fore-aft direction along the guide shoe 66 or bearing race 126.

In a preferred core lifter embodiment, the substantially spherical outer profile of the ball 64 enables the lifter bar 46 of the core lifter 40 to pivot about the fore-aft pivot axis 156 extending through the pivot or pin 108 at least ±10 degrees, preferably at least ±15 degrees and more preferably at least ±20 degrees in the release direction, e.g., in or along the direction of the guide shoe 66 or bearing race 126. The substantially spherical outer profile of the ball 64 also enables the lifter bar or core blade 41 of the core lifter 40 to tilt from side-to-side about a transverse axis extending longitudinally through the bearing race 126 and through the center of the ball 64 at least 5 degrees, preferably at least 10 degrees and more preferably at least 15 degrees generally transverse to the release direction, e.g., generally transverse to the lengthwise direction of the bearing race 126. In a preferred embodiment, the substantially spherical outer profile of the ball 64 enables the lifter bar or core blade 64 of the core lifter 40 to tilt from side-to-side about an axis extending longitudinally through the bearing race 126 and through the center of the ball 64 at least ±5 degrees, preferably at least ±10 degrees and more preferably at least ±15 degrees generally transverse to the release direction, e.g., generally transverse to the lengthwise direction of the bearing race 126. A lifter bar or core blade 46 of such a core lifter 40 of the present invention is better able to swivel, pivot, rotate and move side-to-side in adjusting at it slides in and along a guide slot formed in the mold that is an angled primary release direction slot of compound angle construction without binding.

The present invention advantageously is therefore directed to a core lifter 40 or 40' that is of fully articulating construction by being able to both tilt and swivel relative to the base 58 and which preferably also is of substantially self-aligning construction by further being able to slidably move in a fore-aft direction along the longitudinal or lengthwise direction of the base 58 while also being able to move side-to-side independently of tilting or swiveling. Such a core lifter 40 or 40' of the present invention is a fully articulating core lifter 40 or 40' by its core blade or lifter bar 46 or 46', and the core 48 or 48' carried thereby, being able to both tilt and swivel and preferably which also is of substantially self-aligning construction by the core blade or lifter bar 46 further being able to slidably move in a fore-aft direction while also being able to move side-to-side independently of tilting or swiveling during installation of such a core lifter 40 or 40' into a molding apparatus 42 and during use of the core lifter 40 or 40' during molding apparatus operation. The present invention therefore also is directed to a core lifter 40 or 40' that is of fully articulating construction by the core 48 or 48' of the lifter 40 or 40' and the core blade or lifter bar 46 or 46' carrying the core 48 or 48' being able to both tilt and swivel and preferably which also is of substantially self-aligning construction by the core 48 or 48' and core blade or lifter bar 46 or 46' further being able to slidably move in a fore-aft direction while also being able to move side-to-side independently of tilting or swiveling during core lifter installation and molding apparatus operation.

The present invention advantageously is therefore directed to an articulating, preferably fully articulating self-aligning core lifter 40 for a formable material forming apparatus that preferably is a formable material molding apparatus, e.g. plastic molding apparatus, which more preferably is a plastics injection molding apparatus, e.g., plastic injection mold. Such a lifter of the present invention is able to self-align relative to a slot of the molding apparatus and/or pocket in the undercut of the molding apparatus by being angularly adjustable or self-adjusting up to 20 degrees in the release direction as depicted in FIG. 11 and also being angularly adjustable or self-adjusting in any other 360-degree direction at least 5 degrees, e.g., ±5 degrees, and preferably at least 10 degrees, e.g., ±10 degrees without binding and without requiring a guided ejector system (preferably without using a guided ejector system).

Such a lifter of the present invention being able to self-align relative to a slot formed in a mold of the apparatus in which the core blade 46 is slidably received and/or pocket in the undercut of a mold of the apparatus by being angularly adjustable or self-adjusting up to 20 degrees in the release direction as depicted in FIG. 11 and being angularly adjustable or self-adjusting in any other direction between 10-25 degrees without binding and without requiring a guided ejector system (preferably without using a guided ejector system). In a preferred embodiment, such a lifter of the present invention self-aligns to or in the mold slot or pocket of the undercut by being angularly adjustable or self-adjusting up to ±20 degrees in the release direction and being angularly adjustable or self-adjusting in any other direction between ±10-25 degrees without binding and without requiring a guided ejector system (preferably without using a guided ejector system).

A core lifter 40 of the present invention also is scalable in core lifter, e.g., lifter bar or core blade, sizes or lengths of between 1 and 50 millimeters. Such a core lifter 40 can have a length or size less than 5 millimeters, preferably less than 2.5 millimeters, and more preferably less than 2 millimeters. Such a core lifter 40 is upwardly scalable to sizes or lengths greater than 40 millimeters, preferably greater than 50 millimeters, and more preferably greater than 60 millimeters depending on mold size and other factors.

FIGS. 14-23 illustrate another preferred embodiment of a floating and self-aligning core lifter 40" of the present invention that is a core lifter assembly 39" composed of an elongate core lifter bar 46" having an elongate core blade 41" of generally rectangular, e.g., square, cross-section having an actuator end 55" at its free end that can be configured with a core molding face 51", if desired, and an opposite end 52" configured to mate with a removable breakaway blade extension coupling 172 carrying coupling ball 46" that is movably received in core lifter anchor base 58". As best shown in FIG. 18A, the base 58" is anchored or fixed by at least one fastener 170 to an ejector plate assembly 60" of a plastic injection mold 164", with the elongate blade 41" extending upwardly through a lifter guide passageway 160" extending into or even through one or both of the mold halves 166", 168" so the free actuator end 55" of the blade 41" is disposed in a mold cavity 162 (not shown in FIG. 18A but see, e.g., FIGS. 12 & 13) formed between lower mold half 166" and the upper mold half 168" during molding of molded plastic component or part 65 (not shown in FIG. 18A but also see, e.g., FIGS. 12 & 13). The mold 164" shown in 18A also shows an ejector pin 165 having one end anchored to ejector plates 61a, 61b of anchor plate assembly 60" that reciprocates the ejector pin 165" and core lifter 40" substantially in unison with movement of one of the mold halves 168" relative to the other one of the mold halves 166" in mold opening and closing during each mold cycle of molded component or part making during operation of mold 164".

The removable breakaway blade extension coupling 172 is coupled at one end via a self-aligning sideways misalignment compensating floating coupling joint 180 that advantageously provides self-aligning misalignment compensation of the lifter 40" in a mold in a direction generally orthogonal to the lengthwise extent of the blade 41". The blade extension coupling 172 is coupled at an opposite end via coupling ball 46" being slidably, movably, pivotably and rotatively received in the generally cylindrical bearing race 126 formed by the channel 124 in the core lifter blade anchoring base 58".

The blade extension coupling 172 is of removable construction, advantageously enabling the extension to be replaced if it or the ball becomes worn or damaged. Blade extension coupling 172 also is of sacrificial breakaway construction because it is configured to fail before the blade 41" of the core lifter 40" fails during mold cycling to preserve the blade 41" and prevent damage to the mold. In other words, the coupling 172 is configured to fail should binding of the core lifter 40" of the invention begin to occur or binding actually occur to advantageously prevent damage or failure to both the blade 41" of the lifter 40" and parts of the mold, such as one or both mold halves, during mold cycling during mold operation. Such a replaceable sacrificial breakaway blade extension coupling 172 is formed of a controlled failure breakaway coupling ball carriage link 174 that carries the ball 64" and which has at least one and preferably a pair of spaced apart controlled failure regions 175, either one of which is configured to independently fail at a stress below a stress at which the blade 41" of the lifter 40" will fail or bind in the mold.

A core lifter 40" and core lifter assembly 39" of the present invention has a blade extension coupling 172 with a ball carriage link 174 configured to form a floating coupling joint 180 with the blade 41" of the lifter 40" with which it slidably engages that not only enables the blade extension coupling 172 to be removed from the blade 41", but which slidably floats to enable self-aligning transverse or orthogonal relative movement between the blade 41" and link 174 of the coupling 172. Floating coupling joint 180 is of side-to-side automatic misalignment compensating construction, i.e., side-to-side self-aligning construction, because the joint 180 is configured to allow one or both of the link 174 of the coupling 172 to move in a side-to-side or sideways direction relative to the blade 41" by permitting slidable relative orthogonal movement therebetween in real time during opening and closing of mold halves 166, 168 during operation of mold 164. Floating joint 180 is self-aligning by permitting relative movement between the blade 41" and ball 46" (and core lifter base 58" in which the ball 46" movably rides) in a direction generally orthogonal to the lengthwise extent of the blade 41" (thereby providing sideways or side-to-side misalignment compensation or sideways self-alignment).

Floating coupling joint 180 also is of sacrificial or breakaway controlled failure construction because at least part of the joint 180 is configured to controllably fail or break, e.g., breakaway, before any part of the blade 41" of lifter 40" extending outwardly from the joint 180 fails or binds in the mold 164. While part of the joint 180 formed by the blade 41" can be configured to provide controlled failure before the rest of the blade 41" extending outwardly from the joint 180 fails or binds in the mold 164, part of the joint 180 formed by the ball carriage link 174 of the blade extension coupling 172 is formed with at least one and preferably a plurality of spaced apart controlled failure regions 175 configured to be weaker than the blade 41" in order to fail to prevent breakage or binding of the blade 41" in real time during mold cycling during operation of mold 164.

With reference to FIG. 14, core lifter 40" has an elongate blade 41" that include an actuator end 55" that can be configured with a three-dimensionally contoured molding face 51" or molded component gripping face, if desired, and which is slidably coupled at an opposite end 52" to a replaceable blade extension coupling 172 carrying core lifter bar coupling ball 64" that slidably rides in core lifter base 58". Although not shown, when installed in a mold, an exterior surface of the bar 46" or blade 41", such as one or both of a front surface 85 and rear surface 87 of the bar 46" or blade 41", can be supported by a guide, such as a bearing, like a roller bearing, a fixed or stationary guide surface, or the like.

A blade extension coupling 172 constructed in accordance with the present invention has a breakaway ball carriage link 174 with one end carrying coupling ball 64" and an opposite end formed in which is formed one of a female and male coupler 176 that slidably mates with the other one of a male and female coupler 178 formed in coupling end 52" of the core lifter bar 46". The one of a female and male coupler 176 and the other one of the male and female coupler 178 slidingly mate as depicted in FIG. 15 to form self-aligning floating coupling joint 180. In a preferred embodiment, the female coupler 176 preferably is formed in an end of the link 174 of the blade extension coupling 172 opposite the ball 64" and the male coupler 178 is formed in the end 55" of blade 41" of lifter 40".

A core lifter 40" constructed in accordance with the present invention that is equipped with such a replaceable sacrificial breakaway blade extension coupling 172 of the invention thereby advantageously enabling quick, simple and easy removal and replacement of the blade extension coupling 172 when worn or broken. As discussed in more detail below, the breakaway ball carriage link 174 of such a replaceable blade extension coupling 172 of the present invention is configured not only to be removable or replaceable, but is also of sacrificial breakaway construction as it is formed with weaker breakaway failure regions 175 that form part of the female coupler 176 of the floating coupling joint 180 of the link 174 that are narrower in thickness or cross-sectional thickness.

Such narrower or narrowed sections of the link 174 of the blade extension coupling 172 that form part of female coupler 176 each form a breakaway failure region 175 each configured or designed to controllably fail or break during mold operation, e.g., during mold cycling, when subjected to a stress that is less than the stress which the blade 41" of the lifter 40" fails. In one preferred embodiment, each breakaway failure region 175 of link 174 is configured to fail at a force or stress at or less than which blade 41" will bind or begin to bind within one or both mold halves 166, 168 during operation of the mold 164. In another preferred embodiment, each breakaway failure region 175 of link 174 is configured to fail at a force or stress at or less than which blade 41" will fail within one or both mold halves 166, 168 during operation of the mold 164. In a preferred embodiment, each failure region 175 is configured to have an ultimate stress less than the ultimate stress of the blade 41". In another preferred embodiment, each failure region 175 is configured to have a yield stress less than the yield stress of the blade 41". In still another preferred embodiment, each breakaway failure region 175 of link 174 is configured to fail at a force or stress at or below which blade 41" will either fail or bind, e.g., begin to bind, within one or both mold halves 166, 168 during operation of the mold 164.

Each narrowed breakaway failure region 175 forms part of female coupler 176 of the breakaway coupler ball carriage link 174 of the blade extension coupling 172 that forms part of floating coupling joint 180 and is configured to fail before the blade 41" fails or binds to ensure one or the other failure regions 175 will fail before the blade 41" fails or binds during opening and closing of mold halves 166, 168 during mold cycling during operation of mold 164. By each breakaway region 175 being configured to ensure the link 174 of the coupling 172 will fail before the blade 41" of the lifter 40" fails advantageously preserves the blade 41" of the lifter 40", which can be and typically is the most expensive part of the lifter 40". By ensuring the link 174 of the coupling 172 will fail before the blade 41" of the lifter 40" can fail also advantageously helps protect parts of the mold, e.g., parts of mold halves 166, 168 in which the blade 41" is in contact with during mold operation thereby protecting those parts of the mold 164 from damage. In other words, should binding of core lifter 40" of the present invention ever begin to occur during mold operation, one or both of the failure regions 175 of the breakaway link 174 will instead fail thereby preventing binding of the blade 41" of the lifter 40" within the mold. With continued reference to FIGS. 16 & 17, each failure region 175 is defined by the region 175 being a reduced strength region, reduced thickness region, and/or a controlled failure initiation region.

The one of the female and male coupler 176 and the other one of the male and female coupler 178 form self-aligning breakaway floating coupling joint 180 that slidably couples the blade 41" or bar 46" to the coupling ball 64" received in elongate generally cylindrical lifter bar guide channel 124 of generally circular cross-section formed in lifter base 58" to slidably movably couple the blade 41" to the base 58". Since base 58" is fixed to an ejector plate of ejector plate assembly 60 of mold 164, the blade 41" is movably, e.g., slidably, anchored to ejector plate assembly 60 advantageously enabling the blade 41" and ball 46" of lifter 40" to operably cooperate to self-align and automatically adjust for misalignments between mold halves and/or ejector plate(s) during reciprocation of the ejector plate assembly 60 and opening and closing of mold halves 166, 168 in real time during each mold cycle during operation of mold 164.

As such, a core lifter 40" constructed in accordance with the present invention is equipped with a sacrificial, replaceable blade extension coupling 172 attached to main body 101 of blade 41" via self-aligning floating coupling joint 180. Floating coupling joint 180 enables the ball 64" and ball carriage linkage 174 to slidably float by being movable relative to the lifter blade 41", such as depicted by the arrows in FIGS. 18A & 18B thereby advantageously providing misalignment and/or tolerance compensation in a direction generally transverse to the lengthwise direction of the blade 41" during mold operation, e.g., during mold cycling.

With reference to FIGS. 14-18B, the free end 52" of the core lifter bar 64" is formed with a three-dimensionally contoured male coupling 182 slidably received in a three-dimensionally contoured female coupling 184 formed in the ball carriage linkage 174. With specific reference to FIGS. 19A & 19B, the male coupling 182 slidably registers with the female coupling 184 permitting self-aligning relative motion therebetween in a direction generally orthogonal to the longitudinal lifter bar center axis 122 of blade 41". When the male coupling 182 is in slidable registry with the female coupling 184, the slidably mated couplings 182, 184 define self-aligning floating coupling joint 180. In order so that the mated couplings 182, 184 can float or move relative to one another to accommodate misalignment or provide automatic self-alignment during mold cycling during mold operation, the mated couplings 182, 184 are configured to provide a clearance fit, preferably a sliding fit, therebetween.

With specific reference to FIGS. 15 & 16, a preferred floating coupling joint 180 is composed of a floating self-aligning dovetail joint 192 with the free end of the blade 41" or bar 46" having an outwardly extending male tongue 194 with a generally triangular enlarged head 204 received in a complementarily generally triangularly shaped female tongue-receiving groove 196 formed in the end of the ball carriage linkage 174 opposite the ball 64". The tongue 194 and tongue-receiving groove 196 are configured to provide a clearance fit therebetween, preferably a sliding fit therebetween, which enables the tongue 194 to slidably float within the groove 196 thereby providing self-alignment in a direction generally orthogonal, e.g., side-to-side core lifter bar self-alignment, to the lengthwise extent of the blade 41".

With additional reference to FIGS. 18A and 18B, these drawing figures show oppositely pointing arrows to depict self-aligning generally orthogonal or side-to-side relative movement between the blade extension coupling 172 and the blade 41" or bar 46" of core lifter 40" provided by floating dovetail joint 192 when core lifter 40" of the present invention is installed in a plastic injection mold 164. The floating dovetail joint 192 of the core lifter 40" is configured to provide floating self-alignment by enabling the blade 41" or bar 46" to move generally transversely or generally orthogonally, i.e. side-to-side or sideways, relative to the link 174 and ball 64" of blade extension coupling 174 and the core lifter anchoring base 58", as depicted by respective oppositely pointing directional arrows in FIGS. 18A and 18B. Such a floating joint construction advantageously accommodates or automatically compensates for misalignment of or between components of the mold 164, e.g., ejector plate assembly 60 and/or mold halves 166, 168, which can occur during cycling of the mold 164 during operation of mold 164. Such a side-to-side or sideways direction indicated by oppositely pointing arrows in FIGS. 18A & 18B is generally parallel to or with the transverse axis 156 defined in FIG. 8 that extends through the center 154 of ball 64" and is generally perpendicular to the longitudinal centerline 158 (FIGS. 8 & 11) of the channel 124 or bearing race 126 in the base 58" in which the ball 46" is slidably, pivotably and rotatively received. In other words, such a core lifter 40" of the present invention is equipped with floating dovetail joint 192 that advantageously provides automatic core lifter self-alignment in the side-to-side or sideways direction indicated by arrows in FIGS. 18A and 18B thereby advantageously accommodating misalignment(s) between the ejector plate assembly 60 to which the core lifter base 58" is fixed and one or both mold halves 166, 168 into which the core lifter blade 41" extends during opening and closing of one or both mold halves 166, 168 and molded part ejection or removal during operation of plastic injection mold 164.

With continued reference to FIGS. 18A and 18B, the oppositely pointing arrows depict the relative orthogonal or side-to-side relative movement that can occur between the core lifter blade 41" or bar 46" and the mold coupling ball module, ball, and base of core lifter 40" as a result of the floating dovetail joint 192 of core lifter 40" enabling slidable sideways or side-to-side relative movement to occur at the joint 192. In FIG. 18A, arrow on the blade 41" or bar 46" points in one direction (direction is generally orthogonal to the lengthwise extent of the blade 41" or bar 46" indicating relative motion of blade 41" or bar 46" in a side-to-side direction) and arrow on the ball coupling module points in an opposite direction (direction also is generally orthogonal to the lengthwise extent of the blade 41" or bar 46" indicating relative motion of ball coupling module in a side-to-side direction) to indicate side-to-side relative movement. Likewise, the same is depicted in FIG. 18B, but the arrows point in opposite directions from the arrows shown in FIG. 18A to show that relative orthogonal or side-to-side self-aligning floating movement between ball coupling module and blade 41" or bar 46" is bidirectional.

A core lifter 40" of the present invention equipped with floating dovetail joint 192 is configured to provide at least at least 0.0005 inches, preferably at least 0.001 inches, and more preferably at least 0.0015 inches of relative orthogonal, side-to-side, or sideways movement between (i) the base 58" and link 174 and ball 64" of the blade extension coupling 172, and (ii) the blade 41" or bar 46". Such a core lifter 40" of the present invention equipped with floating dovetail joint 192 is configured to provide at least at least 0.0005 inches, preferably at least 0.001 inches, and more preferably at least 0.0015 inches of relative orthogonal, side-to-side, or sideways movement between the blade 41" and link 174 of the extension blade coupling 172 at the dovetail joint. In a preferred embodiment, a self-aligning core lifter bar 40" of the present invention is equipped with a floating dovetail joint 192 configured to enable slidable relative sideways or side-to-side movement of at least 0.001 inches and preferably between 0.001 inches and 0.003 inches between the ball coupling module and the blade 41" and bar 46". This advantageously enables self-aligning core lifter bar 40" of the present invention to accommodate, self-align, or automatically compensate for misalignment that can occur during mold cycling, e.g., mold operation, between the ejector plate assembly 60 to which the core lifter base 58" is fixed and one or both mold halves 166, 168 into which the core lifter blade 41" or bar 46" extends that would ordinarily otherwise cause the core lifter blade or bar binding if a conventional core lifter bar incapable of such side-to-side or orthogonal relative movement were instead used.

With reference once again to FIGS. 15 and 16, the tongue 194 of self-aligning floating dovetail joint 192 forms or corresponds to the male coupling 182 of self-aligning floating coupling joint 180 and the tongue-receiving groove 196 of dovetail joint 192. The tongue 192 of the dovetail joint 180 is generally triangularly shaped and formed of a narrow or necked down root 198 where the tongue 192 projects from the end 52" of the blade 41" or bar 46" that has straight or flat sidewalls 200, 202 that diverges forming an enlarged head 204 with a generally flat or planar endwall 206. The tongue-receiving groove 196 has a generally triangular shape that is substantially complementary with that of the generally triangularly shaped tongue 192. The groove 196 of the dovetail joint 192 is defined by a pair of spaced apart groove defining arms 195, 197 between which mouth 208 is formed in an end wall 210 of the ball carriage link 174 in a plane where the arms 175, 177 terminate, in which the root 198 or part of the root 198 of the tongue 192 is slidably received when the blade extension coupling 172 is removably slidably coupled to the end 52" of the blade 41" or bar 46". The groove 196 is further defined by a pair of flat sidewalls 212, 214 which diverge from one another and both terminate at a bottom or bottom wall 216 of the groove 196.

To help enable forces to be transferred during mold and core lifter operation between the core lifter blade 41" or bar 46" and the blade extension coupling 172, the end 52" of the blade 41" or bar 46" is defined by a pair of shoulders 218, 220 spaced apart by the tongue 192 that respectively rest on spaced apart lands 222, 224 defining an end of the ball carriage link 174 of the ball coupling module 176. Lands 222, 224 are spaced apart by the mouth 208 of the groove 196. As with the floating dovetail joint 192, a clearance fit that preferably is a sliding fit is formed or provided between the shoulders 218, 220 of the blade 41" or bar 46" and the lands 222, 224 of the ball carriage link 174 enabling slidable relative movement therebetween in a direction generally orthogonal to the lengthwise extent of the blade 41" or bar 46".

With continued reference to FIGS. 16 & 17, each failure region 175 is defined by the region 175 being a reduced strength region, reduced thickness region, and/or a controlled failure initiation region at or along one or both of the arms 195, 197 of the link 174 which form dovetail groove 196. Each failure region 175 preferably includes a controlled failure initiation region 179 formed by or along a corresponding bottom corner 181, 183 where the respective groove sidewall 212, 214 of groove-forming arm 195, 197 adjoins groove bottom wall 216. During mold cycling operation, any start of binding of the core lifter blade 41" that causes the stress or force to approach a magnitude that would ordinarily lead to binding, failure or damage to the blade 41" and/or mold 164 instead causes one of the dovetail groove defining arms 195, 197 to fail in the failure region 175, more specifically in the controlled failure initiation region 179 at or adjacent a corresponding corner 181, 183 of the respective arm 195, 197. Each failure region 175, preferably each controlled failure initiation region 179, is configured to cause controllable failure when the stress or force reaches a predetermined threshold less than the stress or force the lifter bar 46" fails or binds in the molding apparatus. In a preferred embodiment, each failure region 175, preferably each controlled failure initiation region 179, is configured to cause controllable failure when the stress or force reaches a threshold of at least three-quarters the stress or force at which the lifter bar 46" fails or binds. In another preferred embodiment, each failure region 175, preferably each controlled failure initiation region 179, is configured to cause controllable failure when the yield stress or force reaches a threshold of at least 90% of the yield stress or force at which the lifter bar 46" fails or binds. In a further preferred embodiment, each failure region 175, preferably each controlled failure initiation region 179, is configured to cause controllable failure when the ultimate stress or force reaches a threshold of at least 90% of the ultimate stress or force at which the lifter bar 46" fails or binds.

In failing, the arm 195 or 197 cracks at or along the controlled failure initiation region 179 such that the controlled failure initiation region 179 preferably is a crack initiation region or crack former. Such a crack forming controlled failure initiation region 179 causes at last one of the groove defining arms 195, 197 to break away thereby preserving the blade 41" of the core lifter 40" also preventing damage to one or both mold halves 166, 168 of mold 164. After such a controlled failure event, the damaged or broken extension blade coupling 172 is removed and a new extension blade coupling 172 slidably attached to the male dovetail tongue 194 of the blade 41" readying the core lifter 40" for reuse.

With reference to FIGS. 15-18, the ball carriage link 174 of the blade extension coupling 172 has a necked down ball mount arch 185 that extends outwardly from the portion of the link 174 in which the female coupling 184 is formed. The ball mount arch 185 is necked down as it is narrower than the width or diameter of the portion of the link 174 in which the female coupling 184 is formed to provide clearance or clearance recess on opposite sides of the arch 185 to accommodate side-to-side pivoting of the blade 41" at or along angle, a (see, e.g., FIGS. 10 & 11) to angularly self-align or self-adjust in a sideways or direction generally orthogonal to the longitudinal blade centerline axis 122 (see FIGS. 9 & 10). The ball mount arch 185 has a generally rectangular arcuately concave ball seat 186 at its free end to which coupling ball 64" is immovably fixed, preferably with a layer of an adherent material 190 (FIGS. 16 & 17). The arcuately concave ball seat 186 is a rectangularly projecting concave arcuate ball mating surface having a shape substantially complementary to or with the spherical outer shape of the ball 64" when the ball 64" is received in the seat 186. The layer of adherent material 188 is used to join and immovably fix the ball 64" to the mount 185 by fixing the ball 64" to the seat 186. Adherent material 188 is one of an adhesive, a brazing material and a solder.

The coupling ball 64" is a round or spherical bearing that can be of metal or metallic construction, e.g., steel or stainless steel bearing, but preferably is a spherical carbide bearing 183 having increased surface hardness that reduces wear of the ball 64" riding in elongate cylindrical bearing race 126 formed by elongate cylindrical channel 124 in body 61" of core lifter base 58". With reference to FIGS. 16 and 17, a preferred adherent material 188 is a layer of solder 190 that is heated to until it flows and wicks along the surface of the seat 186 and the portion of the outer surface 102 of ball 64" disposed in the seat 186 joining the ball 64", preferably carbide bearing 183, to the seat 186 thereby immovably fixing the ball 64", preferably carbide bearing 183, to the mount 185 when the solder 190 cools and hardens, e.g., cures.

With reference to FIGS. 16-18, in between the female coupling 184 and necked down ball support arch 185 is a pair of generally flat or planar transverse pivot and swivel limiting stop shoulders 226, 228 spaced apart by the arch 185 with opposite sides of the arch 185 defining generally flat or planar lifter blade side-to-side pivoting and swivel stop flats 187, 189 one or both of which can stop against and/or slide along corresponding one of the elongate lifter blade guide flats 138, 140 bounding lifter blade guide slot 130 in top surface 63 of body 61 of core lifter anchor base 58" when the lifter blade 41" or bar 46" is disposed at one or both of a maximum side-to-side or sideways adjustment angle, α, and maximum degree of rotation about longitudinal lifter blade centerline or swivel axis 122 (FIGS. 8-10) that extends longitudinally through or along the center of the lifter blade 41". The width or space between the guide or stop flats 187, 189 less than the width, thickness or diameter of the body 101 of the blade 41" or bar 46" and preferably is no greater than one-half the width, thickness or diameter of the body 101 of the blade 41" or bar 46" to facilitate side-to-side pivoting and/or rotational swiveling of the blade 41" or bar 46" when the ball 64" received in the bearing race 126 formed by the channel 124 in the body 61 of the base 58.

In a preferred embodiment, floating coupling joint 180 includes not only the tongue 196 and groove 196 of the slidable or sliding floating dovetail joint 192, but also the shoulders 218, 220 of blade 41" or bar 46" and lands 222, 224 of ball carriage link 174. In a preferred embodiment, the floating coupling joint 180 is configured to provide at least at least 0.0005 inches, preferably at least 0.001 inches, and more preferably at least 0.0015 inches of relative orthogonal or side-to-side movement between the ball coupling module, ball and base 58" and the blade 41" or bar 46". In a preferred embodiment, a self-aligning core lifter bar 40" of the present invention is equipped with a floating coupling joint 180 configured to enable slidable relative movement of at least 0.001 inches and preferably between 0.001 inches and 0.003 inches between the ball coupling module and the blade 41" and bar 46".

In addition to a core lifter 40" of the present invention being able self-align via translation in a sideways or side-to-side direction by the floating coupling joint 180 enabling slidable sideways or side-to-side relative movement or translation of the blade 41" relative to the link 174 of the blade extension coupling 172, the ball 46" received in the bearing race 126 formed by the channel 124 in the core lifter base 58 and the blade 41" extending upwardly through the elongate lifter blade guide slot 130 in communication with the channel 124 permits rotational or swiveling self-alignment, pivoting side-to-side blade angular self-adjustment (α), as well as pivoting forward-rearward blade angular self-adjustment (β) all of which occur substantially simultaneously in real time during cycling of mold halves 166, 168 during operation of mold 164. As such, blade 41" of core lifter 40" of the present invention also self-aligns or self-adjusts the release angle, β, in accordance with that depicted in FIG. 11 within the angular ranges disclosed above with respect to FIG. 11, self-aligns or self-adjusts the sideways blade angle, α, within the angular ranges disclosed above with respect to FIGS. 8-10 and disclosed above with respect to FIGS. 8-10, and self-aligns or self-adjusts the blade 41" via rotation or swiveling about longitudinal centerline 122 or longitudinal swivel axis 152 of the blade 41" in accordance with the angular ranges and degrees of rotation described above with regards to FIGS. 8-11.

FIGS. 19-21 illustrate another preferred embodiment of a self-aligning core lifter 40''' of the present invention equipped with a lifter bar 46" that is an elongate cylindrical core lifter rod 250 with a detent 252 formed in it which receives a rotation limiting key 254 that limits rotation of the lifter rod 250 about a central longitudinal axis of the rod 250 during molding apparatus operation. Detent 252 preferably is a square or rectangular notch 256 with a rotation preventing flat 258 which receives a complementary shaped anti-rotation flat 260 of the key 254 that extends outwardly from a mount 262 of the key 254 configured to receive a fastener (not shown) to anchor or fix it to one of the mold halves 168" that reciprocates substantially in unison with the lifter bar rod 250 during ejection of a molded part 65" therefrom.

Such a preferred self-aligning core lifter 40''' of the present invention also can and preferably does include an elongate tubular guide sleeve 264 that preferably is generally cylindrical and which can be and preferably also is a generally cylindrical guide bearing 266 that is carried by the mold half 166" through which part of the core lifter bar rod 250 that remains fixed or does not move during reciprocation of ejector pin, movable mold half 168" and core lifter bar 40''' during molding apparatus operation. Such a guide sleeve 264 or tubular lifter rod bearing 266 helps slidably telescopically guide reciprocating movement of the lifter rod 250 without interfering with the aforementioned real time self-alignment thereof during molding apparatus operation.

Understandably, the present invention has been described above in terms of one or more preferred embodiments and methods. It is recognized that various alternatives and modifications may be made to these embodiments and methods that are within the scope of the present invention. Various alternatives are contemplated as being within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention as defined hereby and herein.

It is claimed:

1. A core lifter for a molding apparatus, the core lifter comprising:

(a) a core lifter base fixed to one part of the molding apparatus; and
(b) a lifter bar assembly comprised of (i) an elongate substantially straight lifter bar in operable cooperation with another part of the molding apparatus, (ii) a coupling carried by the lifter bar that couples the lifter bar to the lifter base, the coupling configured for enabling relative pivoting, rotational, and translational movement between the lifter bar and the base during molding apparatus operation, and (iii) a coupling joint operatively connecting the lifter bar to the coupling, the coupling joint configured for enabling relative translational movement between the lifter bar and the coupling during molding apparatus operation;
wherein the lifter base has a generally cylindrical channel formed in the lifter base and a pair of generally parallel oppositely facing guide flats comprising a slot formed in the lifter base disposed in communication with the generally cylindrical channel in the lifter base; and
wherein the coupling comprises (a) a ball received in the generally cylindrical channel in the lifter base, and (b) a portion disposed in the slot in the lifter base that is comprised of a flat facing one of the guide flats of the slot in the lifter base, the flat of the portion disposed in the slot in the lifter base configured to contact the one of the guide flats of the slot in the lifter base limiting (i) swiveling rotation of the lifter bar relative to the lifter base about a central longitudinal axis of the lifter bar, and (ii) side-to-side pivoting of the lifter bar relative to the lifter base about a central longitudinal axis of the generally cylindrical channel in the lifter base.

2. The core lifter of claim 1, wherein the generally cylindrical channel in the lifter base is elongate and substantially straight, wherein the slot in the lifter base in communication with the generally cylindrical channel in the lifter base also is elongate and substantially straight, and wherein the portion of the coupling extending through the slot in the lifter base has a generally rectangular cross-section extends, and wherein the ball of the coupling is pivotably, rotatively, and slidably received in the elongate substantially straight generally cylindrical channel in the lifter base.

3. The core lifter of claim 1, wherein the coupling joint comprises a breakaway coupling joint configured to controllably fail when subjected to a stress or force less than a stress or force that would cause failure of the lifter bar.

4. The core lifter of claim 1, wherein the coupling joint removably connects the coupling to the lifter bar enabling removal of the coupling from the lifter bar and replacement by attachment of a different coupling to the lifter bar.

5. The core lifter of claim 3, wherein the breakaway coupling joint is configured to fail when subjected to one of a yield and ultimate stress less than a corresponding one of a yield and ultimate stress of the lifter bar.

6. The core lifter of claim 1, wherein the coupling joint comprises a floating dovetail joint configured to enable translation of one of the lifter bar and coupling relative to the other one of the lifter bar and coupling during molding apparatus operation, the floating dovetail joint comprised of a three-dimensionally contoured failure region configured to fail when subjected to a stress or force less than a stress or force that would cause failure of the lifter bar.

7. The core lifter of claim 1, wherein the coupling joint is comprised of a floating dovetail joint configured for slidable relative translational movement between the lifter bar and coupling.

8. The core lifter of claim 1, wherein the ball is comprised of a carbide ball bearing fixed to the coupling by an adherent material comprised of solder.

9. The core lifter of claim 1, wherein the slot is formed in a generally planar top surface of the lifter base and defined by the guide flats, wherein the guide flats are generally planar and angled relative to one another defining an acute included angle therebetween, wherein the coupling further comprises an outwardly extending shoulder overlying one of the guide flats of the slot in the lifter base, and wherein the outwardly extending shoulder is configured to abut against part of the top surface of the lifter base to limit one of forward and rearward pivoting of the lifter bar in a direction generally parallel to the central longitudinal axis of the channel in the lifter base.

10. The core lifter of claim 1, wherein:
  (a)(i) the lifter base is elongate and has a top surface in which the slot is formed, (ii) the slot is elongate, substantially straight has a length, (iii) the guide flats are elongate, generally planar, and extend along opposite sides of the slot substantially the length of the slot, and (iv) the generally cylindrical channel is elongate, substantially straight, and has a central longitudinal axis;
  (b) the portion of the coupling disposed in the slot in the lifter base has a pair of the flats that are each generally planar and face oppositely outwardly generally away from each and toward a corresponding one of the guide flats of the slot in the lifter base;
  (c) each one of the flats of the portion of the coupling disposed in the slot in the lifter base configured for sliding contact with the corresponding one of the guide flats of the slot in the lifter base enabling each one of the flats of the portion of the coupling disposed in the slot in the lifter base to:
    (i) contact a corresponding one of the guide flats of the slot in the lifter base; and
    (ii) while in contact therewith, slide along the corresponding one of the guide flats of the slot in the lifter base generally in a lengthwise direction relative to the lifter base during translation of the ball in the generally cylindrical channel in the lifter base thereby enabling translational movement of the lifter bar relative to the lifter base generally in the lengthwise direction relative to the lifter base; and
  (d) the coupling has another portion extending outwardly beyond the slot in the lifter base that is comprised of a pair of oppositely outwardly extending shoulders respectively overlying a corresponding one of the generally parallel guide flats of the slot in the lifter base; and
  (e) each one of the shoulders are configured to contact a corresponding part of the top surface of the lifter base extending along opposite sides of the slot limiting forward and rearward pivoting of the lifter bar relative to the lifter base in a direction generally parallel to the central longitudinal axis of the cylindrical channel in the lifter base.

11. The core lifter of claim 1, wherein the lifter base is elongate and the generally cylindrical channel in the lifter base is elongate and extends longitudinally relative to the lifter base, wherein the coupling translates relative to the lifter base along the elongate generally cylindrical channel in the lifter base in a direction generally parallel to the elongate generally cylindrical channel in the lifter base, and wherein the coupling joint comprises a floating dovetail joint configured to permit relative translational movement between the lifter bar and coupling in a direction generally orthogonal to the elongate generally cylindrical channel in the lifter base.

12. The core lifter of claim 11, wherein the floating dovetail joint is comprised of an outwardly projecting generally triangular male tongue formed in the lifter bar that is slidably received in a generally triangular tongue-receiving female groove formed in the coupling permitting slidable relative movement between the lifter bar and coupling in the direction generally orthogonal to the channel formed in the lifter base.

13. The core lifter of claim 11, wherein the coupling has a pair of dovetail groove defining arms spaced apart by a dovetail groove bottom wall, the dovetail groove defining arms respectively having a pair of acutely inclined dovetail groove defining sidewalls that converge toward one another defining a generally triangular dovetail groove, the dovetail groove bottom wall forming respective dovetail groove corners with corresponding dovetail groove defining sidewalls, each dovetail groove defining arm comprising a controlled failure initiation region extending outwardly from a corresponding one of dovetail groove corners formed thereby with the dovetail groove bottom wall configured to fail when subjected to a force or stress less than a force or stress that would cause the lifter bar to fail during molding apparatus operation, wherein the lifter bar comprises a generally triangular dovetail tongue slidably receivable in the generally triangular dovetail groove of the coupling.

14. The core lifter of claim 1, wherein the molding apparatus has a pair of mold halves through which part of the lifter bar extends, one of the mold halves movable relative to the other one of the mold halves during opening and closing cycling of the mold halves during molding apparatus operation, wherein the lifter bar has a detent receiver formed therein, and further comprising a detent in operable communication with one of the mold halves and the lifter bar engaging the detent receiver to prevent rotation of the lifter bar relative to the mold halves during opening and closing of the mold halves during mold apparatus operation.

15. The core lifter of claim 14, wherein the lifter bar comprises an elongate generally cylindrical rod, the detent receiver is a notch formed in the lifter bar rod, and the detent comprises a key received in the notch in the lifter bar rod and engaged with the one of the mold halves.

16. The core lifter of claim 1, wherein the molding apparatus has a pair of mold halves through which part of the lifter bar extends, one of the mold halves movable relative to the other one of the mold halves during opening and closing cycling of the mold halves during molding apparatus operation, further comprising a tubular guide sleeve carried by one of the mold halves, and wherein a portion of the lifter bar telescopically extends through the tubular guide sleeve and is guided by the tubular guide sleeve during reciprocating relative motion therebetween during opening and closing of the mold halves during molding apparatus operation.

17. The core lifter of claim 16, wherein the lifter bar comprises an elongate generally cylindrical rod and the tubular guide sleeve comprises an elongate generally cylindrical sleeve fixed to the one of the mold halves that reciprocatingly guides the lifter bar rod during reciprocation of the rod during opening and closing of the mold halves during molding apparatus operation.

18. A core lifter for a molding apparatus, the core lifter comprising:
  (a) an elongate lifter base fixed to one part of the molding apparatus, the lifter base comprised of an elongate substantially straight generally cylindrical channel formed in the lifter base, the elongate generally cylindrical channel in communication with an elongate substantially straight slot formed in a top surface of the lifter base, the slot comprised of a pair of elongate guide flats with one of the guide flats extending along one side of the slot and the other one of the guide flats extending along an opposite side of the slot; and (b) a lifter bar assembly comprised of (1) a lifter bar coupling comprised of a lifter bar extension link having (i) a coupling ball disposed at one end of the lifter bar extension link, the coupling ball pivotably, rotatively, and slidably received in the channel in the lifter base enabling relative pivoting, rotating, and translational movement therebetween, and (ii) a floating coupling joint disposed at an opposite end of the lifter bar extension link, and (2) an elongate substantially straight lifter bar removably coupled by the floating coupling joint to the lifter bar extension link, the floating coupling joint enabling relative translational movement between the lifter bar and the lifter bar extension link;

wherein relative translational movement of the coupling ball along the channel in the lifter base moves the lifter bar relative to the base in a direction generally parallel to a lengthwise extent of the channel in the lifter base; and wherein the lifter bar extension link extends through the slot in the lifter base, the lifter bar extension link configured to (i) abut against one of the guide flats extending along one side of the slot when the lifter bar is pivoted in one side-to-side direction relative to the lifter base limiting pivoting of the lifter bar in the one side-to-side direction while allowing slidable relative movement along the one of the guide flats in a longitudinal direction relative to the lifter base during relative translational movement of the coupling ball in the channel in the lifter base in the longitudinal direction relative to the lifter base that also is generally parallel to the lengthwise extent of the channel in the lifter base, and (ii) abut against the other one of the guide flats extending along the other side of the slot when the lifter bar is pivoted in an opposite side-to-side direction relative to the lifter base limiting pivoting of the lifter bar in the opposite side-to-side direction while allowing slidable relative movement along the other one of the guide flats in the longitudinal direction relative to the lifter base during relative translational movement of the coupling ball in the channel in the lifter base in the longitudinal direction relative to the lifter base that also is generally parallel to the lengthwise extent of the channel in the lifter base; and wherein relative translational movement between the lifter bar and lifter bar extension link provided by the floating coupling joint moves the lifter bar relative to the lifter base in a direction generally orthogonal to the lengthwise extent of the channel in the lifter base.

19. A core lifter for a molding apparatus, the core lifter comprising:

(a) a lifter base adapted to be removably fixed to one part of the molding apparatus, the lifter base having (1) an elongate generally cylindrical channel formed in the lifter base, the generally cylindrical channel having a length, and (2) an elongate slot formed in a generally planar top surface of the lifter base, the slot overlying and in communication with the generally cylindrical channel along substantially the entire length of the channel, the slot disposed between a pair of elongate generally parallel generally planar guide flats respectively extending along opposite sides of the slot, the guide flats disposed at an angle relative to one another forming an acute included angle therebetween;

(b) a lifter bar assembly comprised of (1) an elongate substantially straight lifter bar having one end adapted for operable cooperation with another part of the molding apparatus, (2) a coupling comprising (i) a generally spherical coupling ball received in the generally cylindrical channel in the lifter base, the coupling ball configured for translation within the generally cylindrical channel relative to the lifter base along a path of travel in a longitudinal direction of the generally cylindrical channel during molding apparatus operation, and the coupling ball configured for pivoting and rotating movement within the generally cylindrical channel relative to the lifter base during molding apparatus operation, and (ii) a portion of the coupling passing through the slot in the lifter base and extending outwardly of the lifter base, the portion of the coupling passing through the slot in the lifter base comprised of a pair of oppositely outwardly facing generally planar flats configured for contacting a corresponding one of the generally planar guide flats extending along the slot in the lifter base to limit one of pivoting and rotating movement of the lifter bar relative to the lifter base, and (3) a coupling joint interconnecting an opposite end of the lifter bar with the coupling, the coupling joint configured to enable relative translation between the lifter bar and the coupling ball in a direction generally orthogonal to the path of travel of the coupling ball within the generally cylindrical channel in the lifter base.

\* \* \* \* \*